United States Patent
Kobayashi et al.

(10) Patent No.: US 7,722,996 B2
(45) Date of Patent: May 25, 2010

(54) POLYMER ELECTROLYTE FUEL CELL SYSTEM AND OPERATION METHOD THEREOF

(75) Inventors: Susumu Kobayashi, Ikoma (JP); Toshihiro Matsumoto, Takatsuki (JP); Takeshi Tomizawa, Ikoma (JP); Katsuzou Kokawa, Nara (JP); Teruhisa Kanbara, Toyonaka (JP)

(73) Assignee: Panasonic Corporation, Osaka (JP)

( * ) Notice: Subject to any disclaimer, the term of this patent is extended or adjusted under 35 U.S.C. 154(b) by 608 days.

(21) Appl. No.: 10/924,548

(22) Filed: Aug. 24, 2004

(65) Prior Publication Data

US 2005/0048338 A1 Mar. 3, 2005

(30) Foreign Application Priority Data

Aug. 25, 2003 (JP) .............................. 2003-299863

(51) Int. Cl.
H01M 8/00 (2006.01)
H01M 8/14 (2006.01)
H01M 8/04 (2006.01)

(52) U.S. Cl. ..................... 429/413; 429/408; 429/414; 429/436

(58) Field of Classification Search .................. 429/26, 429/30, 19, 20, 24, 13
See application file for complete search history.

(56) References Cited

U.S. PATENT DOCUMENTS

| | | | |
|---|---|---|---|
| 3,982,962 A | 9/1976 | Bloomfield | |
| 6,294,149 B1 * | 9/2001 | Autenrieth et al. | 423/648.1 |
| 6,329,090 B1 * | 12/2001 | McElroy et al. | 429/13 |
| 6,818,339 B1 * | 11/2004 | Sugawara et al. | 429/30 |
| 6,884,536 B1 * | 4/2005 | Hatoh et al. | 429/34 |
| 2002/0001586 A1 | 2/2002 | Cargnelli et al. | |
| 2002/0015867 A1 * | 2/2002 | Cargnelli et al. | 429/13 |
| 2006/0286437 A1 * | 12/2006 | Aihara et al. | 429/44 |

FOREIGN PATENT DOCUMENTS

| | | |
|---|---|---|
| EP | 1 120 844 A2 | 8/2001 |
| JP | 06-504403 A1 | 5/1994 |
| JP | 07-326376 | * 12/1995 |
| JP | 07326376 | * 12/1995 |
| JP | 07326376 A | 12/1995 |

* cited by examiner

*Primary Examiner*—Dah-Wei Yuan
*Assistant Examiner*—Angela J. Martin
(74) *Attorney, Agent, or Firm*—Panitch Schwarze Belisario & Nadel LLP

(57) ABSTRACT

A polymer electrolyte fuel cell system is disclosed, comprising a fuel cell having a predetermined power generation portion configured to operate at a predetermined temperature to generate an electric power using a fuel gas and an oxidizing gas supplied to said fuel cell, and a humidifier configured to humidify the fuel gas and the oxidizing gas, wherein the humidifier is configured to humidify the fuel gas and the oxidizing gas to allow the fuel gas and the oxidizing gas to have dew points higher than the predetermined temperature, the humidified fuel gas and oxidizing gas having the dew points higher than the operating temperature being supplied to the fuel cell.

26 Claims, 20 Drawing Sheets

POLYMER ELECTROLYTE FUEL CELL SYSTEM AND OPERATION METHOD THEREOF

BACKGROUND OF THE INVENTION

1. Field of the Invention

The present invention relates to a fuel cell system and an operation method thereof. More particularly, the present invention relates to a polymer electrolyte fuel cell system and an operation method thereof.

2. Description of the Related Art

In recent years, concern about environmental problems has been increasing on a global scale, under the influence of global warming due to an increase in carbon dioxide concentration or acid rain or the like due to an increase in emission of exhaust gases. So, in a field of power supply development, attention has been focused on a fuel cell system capable of energy change which is highly efficient and keeps the environment clean without emission of carbon dioxide. Among various fuel cell systems, particular attention has been paid to a polymer electrolyte fuel cell system that operates at a low temperature and has high output density, which is expected to be used as civil power supply, power supply for power-driven automobile, etc.

The polymer electrolyte fuel cell system is one type of fuel cell system that employs a membrane electrode assembly (hereinafter simply referred to as MEA) in which chemical reaction for power generation takes place. The polymer electrolyte fuel cell system typically includes a polymer electrolyte fuel cell stack (hereinafter simply referred to as stack) structured such that individual polymer electrolyte fuel cells (hereinafter simply referred to as cells) are stacked in predetermined number, and predetermined auxiliary equipment that operates the stack, which will be described later. Hereinbelow, construction of the cells, the stack, and the polymer electrolyte fuel cell system will be sequentially described.

The cells forming the stack are each provided with the MEA in which catalytic reaction for power generation takes place. The MEA includes a pair of catalyst layers (anode catalyst layer and cathode catalyst layer) provided on surfaces of both sides of a polymer electrolyte membrane that selectively transports hydrogen ions and formed to contain carbon powder carrying platinum-group metal catalyst thereon, and a pair of gas diffusion electrodes (anode gas diffusion electrode and cathode gas diffusion electrode) provided to sandwich the pair of catalyst layers between them and chiefly made of carbon fibers. The gas diffusion electrodes have both gas permeability and electron conductivity. Further, sealing gaskets are disposed to sandwich a peripheral portion of the polymer electrolyte membrane of the MEA, thereby forming a MEA-gasket assembly. The MEA-gasket assembly is sandwiched between an anode separator provided with a fuel gas passage through which a fuel gas (hydrogen or hydrogen-rich gas) flows and a cathode separator provided with an oxidizing gas passage through which an oxidizing gas (air) flows, thereby forming the cell.

As stated above, the stack is comprised of cells stacked in predetermined number. The reason why the stack is formed in the polymer electrolyte fuel cell system is that the electromotive force of the cell is low as approximately 0.6 to 0.8V in a rated operation range, although this depends on an output current density. So, by stacking cells to form the stack, a voltage sufficient to operate electronic equipment or the like is gained. Typically, this stack is formed by stacking cells of several tens to several hundreds. This stack generates heat according to the number of stacked cells, because the cells are generating heat during power generation. Since the density of heat generation of the stack is higher relative to a single cell, a cooling water passage is typically provided in every one to three cells to allow the stack to be forcibly cooled by using a cooling medium such as water or ethylene glycol. The use of the cooling medium allows the temperature of the stack generating heat to be kept in a suitable condition. So, three types of fluids, i.e., fuel gas, oxidizing gas, and water (or, e.g., ethylene glycol) or the like are supplied to the stack. A pair of (or plural pairs of) manifolds (common holes) are provided on the cathode separator and the anode separator for each of these three fluids. Each fluid is introduced from the manifold into grooves provided on the separator and branches to flow within the cell and the water cooling portion. For example, the fuel gas is introduced from a fuel gas supply manifold into a fuel gas passage of the anode separator. While flowing within the fuel gas passage, the fuel gas is consumed in catalytic reaction for power generation in the MEA. The excess fuel gas remaining unconsumed after power generation is exhausted through a fuel gas exhaust manifold. And, the cells and the water cooling portions are alternately stacked into a stack, which is then sandwiched between end plates with current collecting plates and insulating plates interposed between the stack and the end plates. Thereafter, these are fastened from both ends by fastening bolts, thereby manufacturing a typical stack.

The polymer electrolyte fuel cell system refers to a whole power generation system configured to operate the stack to thereby take out a predetermined electric power. Specifically, the polymer electrolyte fuel cell system comprises, as components configured to directly drive the stack, a reformer configured to convert available fuel precursor such as LPG, LNG, or gasoline into a fuel gas through a steam reforming reaction, a fuel gas supply device configured to supply the reformed fuel gas to the stack, an oxidizing gas humidifier configured to humidify air used as an oxidizing gas, an oxidizing gas supply device configured to supply the humidified oxidizing gas to the stack, a cooling water supply device configured to supply circulation cooling water into the stack, an electricity loading device configured to load an electric power, and the like. Typically, the fuel gas is humidified in such a manner that water is added to the fuel gas by a steam reforming process. Also, typically, the oxidizing gas is humidified in such a manner that total enthalpy heat exchange is conducted between the oxidizing gas (hereinafter referred to as a cathode exhaust gas) exhausted from the stack and the oxidizing gas supplied from an air supply device by utilizing water contained in the oxidizing gas exhausted from the stack to allow the oxidizing gas from the air supply device to be humidified to a desired state. This total enthalpy heat exchange is conducted using a total enthalpy heat exchange membrane that permits passage of water but does not permit passage of gases. As the total enthalpy heat exchange membrane, a polymer electrolyte membrane used in the cell (e.g., perfluorosulfonic acid) is suitably employed. And, the above components and the stack are connected to one another to be constructed into the polymer electrolyte fuel cell system.

Herein, the outline of a power generation principle of the cell in the polymer electrolyte fuel cell system will be described.

In the above constructed cell, the fuel gas is supplied to the fuel gas passage of the anode separator, while the oxidizing gas is supplied to the oxidizing gas passage of the cathode separator. Thereby, the fuel gas is exposed to a principal surface of the MEA on the anode catalyst layer side and the oxidizing gas is exposed to a principal surface of the MEA on the cathode catalyst layer side. At this time, the fuel gas flows through the fuel gas passage of the anode separator and further through the anode gas diffusion electrode and contacts the anode catalyst layer provided on the MEA. Through a catalytic reaction in the anode catalyst layer, the fuel gas is dissociated into hydrogen ions and electrons. The dissociated electrons travel through the anode gas diffusion electrode and are collected into the anode separator. Then, the electrons are supplied to electronic equipment or the like connected to the polymer electrolyte fuel cell system. Meanwhile, the dissociated hydrogen ions travel to the cathode catalyst layer through an inside of the polymer electrolyte membrane. In the cathode catalyst layer, the hydrogen ions are consumed in a catalytic reaction for generating water, along with the oxidizing gas that passed through the cathode gas diffusion electrode and reached the cathode catalyst layer and the electrons that traveled to the cathode separator via the electronic equipment connected to the polymer electrolyte fuel cell system, traveled through the cathode gas diffusion electrode and reached the cathode catalyst layer. Through the above series of catalytic reactions, the electrons are continuously derived from the fuel gas. Thereby, the cell functions as a battery.

The polymer electrolyte membrane exhibits a stable hydrogen ion transport ability under a sufficiently moist condition. To this end, in operation of the polymer electrolyte fuel cell system, it is necessary to supply water to moisten the polymer electrolyte membrane. Typically, this water is supplied by supplying the fuel gas and the oxidizing gas in humidified state to the cell. In order to allow the catalytic reactions to progress well, it is necessary to heat the stack up to a temperature of at least 60° C. or higher, more preferably, at 60 to 80° C. To this end, in the polymer electrolyte fuel cell, power generation operation is carried out while heating the stack at a temperature of 60 to 80° C.

In order to operate the cell properly, it is necessary to keep the polymer electrolyte membrane in a sufficiently moist state as stated above. In addition, it is necessary to inhibit "flooding" (phenomenon in which the anode catalyst layer and the cathode catalyst layer are closed by the water) from occurring on the anode catalyst layer and the cathode catalyst layer due to the water generated in the MEA. This is because, if the flooding occurs, the catalytic reaction in which the fuel gas is dissociated into hydrogen ions and electrons and movement of the dissociated hydrogen ions to the cathode side within the polymer electrolyte membrane are difficult to progress, thereby significantly reducing the amount of electric power generated in the cell.

Accordingly, there has been proposed a method in which, in order to inhibit occurrence of the flooding, a pressure loss (pressure drop) is applied between supply (inlet) portion and exhaust (outlet) portion of the fuel gas and between supply portion and exhaust portion of the oxidizing gas so that dew points of the fuel gas and the oxidizing gas are always kept at not higher than an operating temperature of the stack, thereby exhausting excess water outside the cell (e.g., Japanese Laid-Open Patent Application Publication No. 04-502749). This will be described specifically. Since water absorbing ability of gases increases with decreasing pressure, it is possible to effectively exhaust water generated within the cell through the catalytic reaction outside the cell by setting pressures of gases existing at positions closer to the exhaust portions of the fuel gas and the oxidizing gas lower. That is, since the water generated within the cell may evaporate into the fuel gas and the oxidizing gas by keeping the fuel gas and the oxidizing gas at dew points not higher than the stack operating temperature, it is possible to exhaust the excess water from the cell along with excess fuel gas and oxidizing gas. In this case, since the water easily permeates the polymer electrolyte membrane, it is possible to exhaust excess water outside the cell along with excess fuel gas by keeping the fuel gas at a dew point not higher than the stack operating temperature so that the water generated on the cathode side is diffused through the polymer electrolyte membrane and then evaporates into the fuel gas. The pressure drop of the fuel gas or the oxidizing gas may be realized by providing an orifice in the supply portion of the gas, by extending the gas passage, by changing passage cross-sectional area, by increasing a friction coefficient of at least part of an inner surface of the gas passage, or setting a flow rate of the fuel gas within the passage higher than the amount of the fuel gas dissociated into hydrogen ions and electrons on the anode side.

In accordance with the above described conventional method in which the fuel gas and the oxidizing gas are always kept at the dew points not higher than the stack operating temperature, it is possible to effectively exhaust the water generated on the cathode side outside the cell, and to inhibit the flooding in which the anode catalyst layer and the cathode catalyst layer are closed by the water. In other words, the catalytic reactions can progress smoothly in both the anode catalyst layer and the cathode catalyst layer, and a proper amount of electric power can be generated in the cells.

SUMMARY OF THE INVENTION

However, inventors found that the above conventional operation method has a fatal drawback in the use of a rated operation of the stack under low current density for the purpose of higher power generation efficiency of the stack (in particular, in stationary cogeneration system). If the dew points of the fuel gas and the oxidizing gas are not higher than operating temperatures of all power generation portions within the stack, the polymer electrolyte membrane corresponding to the portions of the MEA which are exposed to such fuel gas and oxidizing gas become dry and thereby are damaged with an elapse of time, thereby leading to short life. In this case, since movement amount of the hydrogen ions generated in the catalytic reaction, through the polymer electrolyte membrane, decreases with an elapse of time due to the damage to the membrane, the amount of the electric power generated in the stack correspondingly decreases with an elapse of time.

The present invention has been developed under the circumstances, and an object of the present invention is to provide a polymer electrolyte fuel cell system for use in a rated operation under low current density, which is capable of supplying an electric power stably over a long period of time, and an operation method thereof.

In order to achieve the above object, in accordance with one aspect of the present invention, there is provided a polymer electrolyte fuel cell system comprising a fuel cell having a predetermined power generation portion configured to operate at a predetermined temperature to generate an electric power using a fuel gas and an oxidizing gas supplied to the fuel cell; and a humidifier configured to humidify the fuel gas and the oxidizing gas, wherein the humidifier is configured to humidify the fuel gas and the oxidizing gas to allow the fuel gas and the oxidizing gas to have dew points higher than the predetermined temperature, the humidified fuel gas and oxidizing gas having the dew points higher than the predetermined temperature being supplied to the fuel cell. In such a construction, since the fuel gas and the oxidizing gas in excessively steam-saturated state are supplied to an inside of the cell, and thereby, a polymer electrolyte membrane provided within the cell is sufficiently humidified, the membrane is completely inhibited from drying. Consequently, the polymer electrolyte fuel membrane is inhibited from being damaged after an elapse of time, and the system is capable of always supplying a stable voltage.

In this case, the predetermined power generation portion may be a portion where the fuel gas and the oxidizing gas supplied to the fuel cell is first consumed in an electrochemical reaction for generating the electric power. In such a construction, since the polymer electrolyte membrane provided within the cell is effectively and sufficiently humidified, the polymer electrolyte fuel membrane is substantially inhibited from being damaged after an elapse of time, and the system is capable of always supplying a stable voltage.

In the above system, a range of the dew points may be determined by an upper limit dew point that does not cause flooding in the fuel cell and a lower limit dew point of the predetermined temperature. In such a construction, it is possible to inhibit the polymer electrolyte membrane from being damaged with an elapse of time more effectively.

In the above system, a range of the dew points may be not lower than 50° C. and not higher than 70° C. In such a construction, it is possible to inhibit the polymer electrolyte membrane from being damaged with an elapse of time more effectively.

In the above system, the humidifier may be configured to humidify the fuel gas and the oxidizing gas using a substance exhausted from the fuel cell to allow the fuel gas and the oxidizing gas to have the dew points higher than the predetermined temperature. In such a construction, since the substance exhausted from the fuel cell contains water, the fuel gas and the oxidizing gas supplied to the stack become excessively steam-saturated by total enthalpy heat exchange between the substance and the fuel gas and the oxidizing gas.

In the above system, the humidifier may be configured to humidify the fuel gas and the oxidizing gas using a mixture containing a substance exhausted from the fuel cell and water to allow the fuel gas and the oxidizing gas to have the dew points higher than the predetermined temperature. In such a construction, the fuel gas and the oxidizing gas supplied to the stack become easily excessively steam-saturated by total enthalpy heat exchange between the substance containing a large amount of water and the fuel gas and oxidizing gas.

In the above system, the substance exhausted from the fuel cell may be at least one of the fuel gas and the oxidizing gas exhausted from the fuel cell. In such a construction, since the fuel gas or the oxidizing gas exhausted from the fuel cell contains water, the fuel gas and the oxidizing gas supplied to the stack become excessively steam-saturated.

The above system may further comprise a water condenser configured to perform condensation of the fuel gas and the oxidizing gas exhausted from the fuel cell to obtain water, wherein the water obtained by the water condenser may be used as the water of the mixture. Thereby, it is possible to construct a polymer electrolyte fuel cell system with improved water utilization efficiency.

In the above system, the humidifier includes a total enthalpy heat exchanger and a heater capable of heating the total enthalpy heat exchanger, wherein the substance or the mixture and the fuel gas and the oxidizing gas are supplied to the total enthalpy heat exchanger and subjected to total enthalpy heat exchange between the substance or the mixture and the fuel gas and the oxidizing gas, and the total enthalpy heat exchanger is heated by the heater to allow the fuel gas and the oxidizing gas to be humidified to have the dew points higher than the predetermined temperature. In such a construction, the fuel gas and the oxidizing gas are humidified suitably.

In the above system, the heater may be configured to heat the total enthalpy heat exchanger using heat generated by combusting the fuel gas or the fuel gas exhausted from the fuel cell. In such a construction, since heat obtained by combusting the fuel gas or the fuel gas exhausted from the cell has a high temperature, the total enthalpy heat exchanger is efficiently heated. In addition, all of the fuel gas supplied to the stack is not consumed in power generation, but a part of it is exhausted from the stack. Since the exhausted fuel gas is re-used, it is possible to effectively utilize the fuel gas.

In the above system, the heater may be configured to heat the total enthalpy heat exchanger using heat generated by catalytically combusting the fuel gas or the fuel gas exhausted from the fuel cell and the oxidizing gas or the oxidizing gas exhausted from the fuel cell. In such a construction, it is possible to heat the total enthalpy heat exchanger efficiently by catalytic combustion. That is, it is possible to efficiently gain the fuel gas and the oxidizing gas in excessively steam-saturated state.

In the above system, the fuel cell may be configured to operate at the predetermined temperature obtained by flowing a heat medium within the fuel cell to generate the electric power, and the heater may be configured to heat the total enthalpy heat exchanger using heat of the heat medium exhausted from the fuel cell. In such a construction, it is possible to construct a polymer electrolyte fuel cell system with improved heat utilization efficiency.

The above system may further comprise a reformer configured to generate the fuel gas from a precursor of the fuel gas, wherein the heater may be configured to heat the total enthalpy heat exchanger using heat generated by combusting the precursor. In such a construction, since a part of the fuel gas precursor is used to heat the total enthalpy heat exchanger in advance, it is possible to reduce the amount of the exhausted fuel gas.

The above system may further comprise a reformer configured to generate the fuel gas from a precursor of the fuel gas, wherein the heater may be configured to heat the total enthalpy heat exchanger using waste heat exhausted from the reformer. In such a construction, since the waste heat exhausted from the reformer has a high temperature, the total enthalpy heat exchanger is efficiently heated. In addition, since the re-use of the waste heat can improve heat utilization efficiency, it is possible to construct a polymer electrolyte fuel cell system with high power generation efficiency.

In the above system, the heater may be configured to directly heat the total enthalpy heat exchanger. In such a construction, heating efficiency of the total enthalpy heat exchanger is improved. Consequently, energy required to heat the total enthalpy heat exchanger can be minimized.

In the above system, the heater may be configured to indirectly heat the total enthalpy heat exchanger. In such a construction, the temperature of the total enthalpy heat exchanger being heated varies gradually. Consequently, it is possible to control heating temperature of the total enthalpy heat exchanger with high precision.

In the above system, the fuel cell and the humidifier may be integrated, and the integrated fuel cell and humidifier may be entirely thermally insulated. In such a construction, heat loss generated in the total enthalpy heat exchanger being heated can be minimized. Consequently, it is possible to generate the fuel gas and oxidizing gas in excessively steam-saturated state easily and efficiently.

In accordance with another aspect of the present invention, there is provided a method of operating a polymer electrolyte fuel cell system including: a fuel cell having a predetermined power generation portion configured to operate at a predetermined temperature to generate an electric power using a fuel gas and an oxidizing gas supplied to the fuel cell; and a humidifier configured to humidify the fuel gas and the oxidizing gas, the method comprising the steps of: humidifying the fuel gas and the oxidizing gas by the humidifier to allow the fuel gas and the oxidizing gas to have dew points higher than the predetermined temperature; and supplying the humidified fuel gas and oxidizing gas having the dew points higher than the predetermined temperature to the fuel cell. In such a construction, since the fuel gas and the oxidizing gas in excessively steam-saturated state are supplied to the inside of the cell, it is possible to sufficiently humidify the polymer electrolyte membrane provided within the fuel cell, and to thereby completely inhibit the membrane from drying. Consequently, the polymer electrolyte membrane is inhibited from being damaged after an elapse of time, and the system is capable of always supplying a stable voltage.

The above and further objects and features of the invention will more fully be apparent from the following detailed description with accompanying drawings.

DETAILED DESCRIPTION OF THE PREFERRED EMBODIMENTS

Hereinafter, embodiments of the present invention will be described with reference to the drawings.

Embodiment 1

In a first embodiment of the present invention, a polymer electrolyte fuel cell system comprising a reformer is configured to generate excessively humidified fuel gas and oxidizing gas using a part of waste heat exhausted from the reformer and to supply these excessively humidified gases to a fuel cell.

Figure 1:
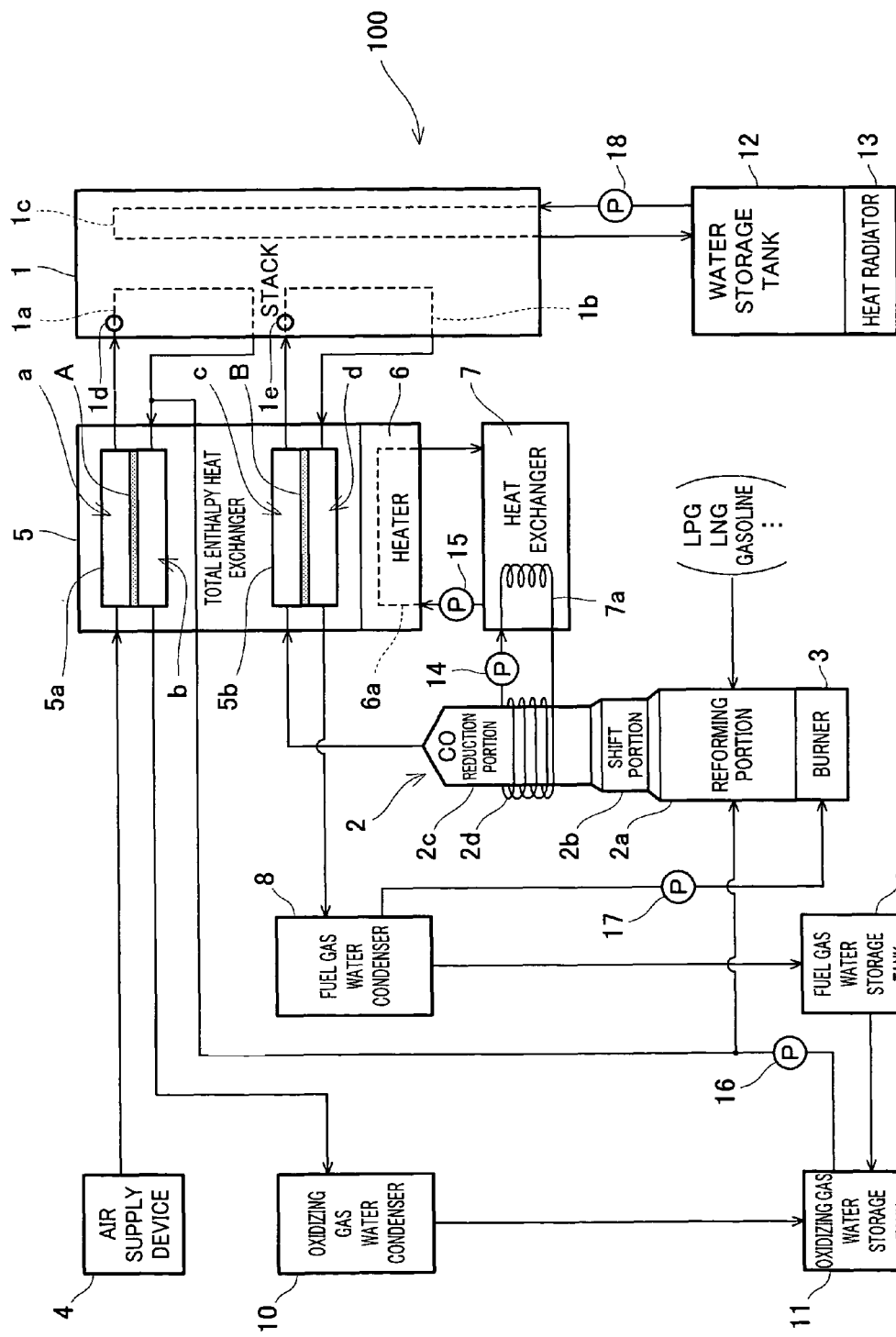
FIG. 1 is a block diagram schematically showing a construction of a polymer electrolyte fuel cell system according to a first embodiment of the present invention.

FIG. 1 is a block diagram schematically showing a construction of the polymer electrolyte fuel cell system according to the first embodiment of the present invention.

First of all, the construction of the polymer electrolyte fuel cell system according to the first embodiment will be described with reference to FIG. 1.

Referring now to FIG. 1, a polymer electrolyte fuel cell system 100 of the first embodiment comprises a polymer electrolyte fuel cell stack 1 (hereinafter referred to as stack 1) configured to generate an electric power using a fuel gas and an oxidizing gas supplied to a pipe 1a and a pipe 1b, respectively, a reformer 2 including a reforming portion 2a, a shift portion 2b, and a CO reduction portion 2c and configured to reform a fuel gas precursor such as a city gas or a liquefied propane to thereby generate a fuel gas for use in power generation, a reformer burner 3 configured to heat the reformer 2 up to a temperature required for a reforming reaction and to keep the reformer 2 at the temperature, an air supply device 4 configured to supply the oxidizing gas for use in power generation to the stack 1, a total enthalpy heat exchanger 5 configured to humidify and heat the fuel gas and the oxidizing gas supplied to the stack 1 by total enthalpy heat exchange with an anode exhaust gas and a cathode exhaust gas exhausted from the stack 1, a heater 6 configured to heat the total enthalpy heat exchanger 5 up to a temperature higher than an operating temperature of a predetermined power generation portion in the stack 1, a heat exchanger 7 configured to heat the heater 6 using the waste heat radiated from the CO reduction portion 2c, a fuel gas water condenser 8 configured to perform condensation of the fuel gas, i.e., the anode exhaust gas, exhausted from the stack 1 through the total enthalpy heat exchanger 5, a fuel gas water storage tank 9 that stores the water obtained by the fuel gas water condenser 8, an oxidizing gas water condenser 10 configured to perform condensation to obtain the water from the oxidizing gas, i.e., the cathode exhaust gas exhausted from the stack 1 through the total enthalpy heat exchanger 5, and an oxidizing gas water storage tank 11 that stores the water obtained by the oxidizing gas water condenser 10.

The polymer electrolyte fuel cell system 100 further comprises a cooling water storage tank 12 that stores cooling water for keeping the stack 1 generating heat during power generation operation at a predetermined temperature, and a heat radiator 13 configured to radiate heat from the cooling water stored in the cooling water storage tank 12 to thereby cool the cooling water.

The polymer electrolyte fuel cell system 100 further comprises a pump 14 configured to send a heat medium filled within a pipe 2d spirally attached to an outer surface of the CO reduction portion 2c to an inside of a pipe 7a provided within the heat exchanger 7, a pump 15 configured to send a heat medium stored in the heat exchanger 7 to an inside of a pipe 6a provided within the heater 6, a pump 16 configured to send the water stored in the oxidizing gas water storage tank 11 to the reforming portion 2a and a pipe connecting the stack 1 to the total enthalpy heat exchanger 5 and configured to allow the cathode exhaust gas to flow therethrough, a pump 17 configured to send the anode exhaust gas cooled in the fuel gas water condenser 8 to the reformer burner 8, and a pump 18 configured to send the water stored in the cooling water storage tank 12 to the inside of a pipe 1c provided within the stack 1.

Here, a construction of the total enthalpy heat exchanger 5 will be described.

As shown in FIG. 1, the total enthalpy heat exchanger 5 includes a cathode humidifying circuit 5a configured to humidify and heat the oxidizing gas, and an anode humidifying circuit 5b configured to humidify and heat the fuel gas.

The cathode humidifying circuit 5a has an oxidizing gas introducing region a into which the oxidizing gas is introduced, and a cathode exhaust gas introducing region b into which the cathode exhaust gas is introduced. And, the oxidizing gas introducing region a is separated from the cathode exhaust gas introducing region b by a cathode total enthalpy heat exchange membrane A. As the cathode total enthalpy heat exchange membrane A, a polymer electrolyte membrane similar to the polymer electrolyte membrane used in the stack 1 is used. The cathode humidifying circuit 5a is capable of adjusting the oxidizing gas introduced into the oxidizing gas introducing region a to have predetermined temperature and humidity by total enthalpy heat exchange through the cathode total enthalpy heat exchange membrane A between the oxidizing gas introduced into the oxidizing gas introducing region a and the cathode exhaust gas introduced into the cathode exhaust gas introducing region b.

The anode humidifying circuit 5b has a fuel gas introducing region c into which the fuel gas is introduced, and an anode exhaust gas introducing region d into which the anode exhaust gas is introduced. And, the fuel gas introducing region c is separated from the anode exhaust gas introducing region d by an anode total enthalpy heat exchange membrane B. As the anode total enthalpy heat exchange membrane B, a polymer electrolyte membrane similar to the polymer electrolyte membrane used in the stack 1 is used. The anode humidifying circuit 5b is capable of adjusting the fuel gas introduced into the fuel gas introducing region c to have predetermined temperature and humidity by total enthalpy heat exchange through the anode total enthalpy heat exchange membrane B between the fuel gas introduced into the fuel gas introducing region c and the anode exhaust gas introduced into the anode exhaust gas introducing region d.

The total enthalpy heat exchanger 5 is equipped with the heater 6. The heater 6 operates so that the temperature of the entire total enthalpy heat exchanger 5 is heated up to a temperature higher than an operating temperature of predetermined power generation portion in the stack 1.

A pipe extending from the oxidizing gas water storage tank 11 through the pump 16 is connected to a predetermined position of the pipe connecting the stack 1 to the total enthalpy heat exchanger 5 and configured to allow the cathode exhaust gas to flow therethrough as described above. The polymer electrolyte fuel cell system 100 is capable of sending the water stored in the oxidizing gas water storage tank 11 to the inside of the pipe through which the cathode exhaust gas flows.

An operation of the polymer electrolyte fuel cell system according to the first embodiment will be described with reference to FIG. 1.

In the polymer electrolyte fuel cell system 100 constructed as shown in FIG. 1, the fuel gas precursor such as LPG, LNG, gasoline or city gas, is supplied to the reforming portion 2a of the reformer 2. The fuel gas precursor is reformed in the reforming portion 2a and supplied to the shift portion 2b. The fuel gas precursor is shifted in the shift portion 2b, and then the resulting fuel gas is supplied to the CO reduction portion 2c. CO (carbon monoxide) is removed from the fuel gas in the CO reduction portion 2c, and after that, the fuel gas is exhausted from the reformer 2. At this time, the reformer 2 is heated by the reformer burner 3 up to a temperature required to reform the fuel gas precursor into the fuel gas and kept at the temperature. In brief, in the reformer 2, the fuel gas precursor is reformed under predetermined temperature condition and thereby the fuel gas for use in power generation is generated.

The fuel gas generated in the reformer 2 is introduced into the fuel gas introducing region c of the anode humidifying circuit 5b provided in the total enthalpy heat exchanger 5. The fuel gas in the fuel gas introducing region c is adjusted to have a dew point higher than the operating temperature of the predetermined power generation portion in the stack 1 by total enthalpy heat exchange with the anode exhaust gas exhausted from the stack 1 and introduced into the anode exhaust gas introducing region d. The reason why the fuel gas is thus adjusted is that the anode exhaust gas contains water sufficient for the total enthalpy heat exchange between the water generated in the reforming portion 2a of the reformer 2 and the water generated by power generation in the stack 1, and that the total enthalpy heat exchanger 5 is heated by the heater 6 up to a temperature higher than the operating temperature of the predetermined power generation portion in the stack 1. As used herein, the predetermined power generation portion in the stack 1 refer to portions of the stack 1 to which the fuel gas and the oxidizing gas are supplied. More specifically, the predetermined power generation portion in the stack 1 is conceptually, as shown in FIG. 1, supply portions 1d and 1e of the stack 1 to which the fuel gas and the oxidizing gas are supplied, and is a portion (region) where the fuel gas and the oxidizing gas are first consumed in an electrochemical reaction through the polymer electrolyte membrane. Hereinafter, this portion (region) is expressed as the predetermined power generation portion. And, as used herein, the operating temperature of the predetermined power generation portion in the stack 1 is a cell temperature of the predetermined power generation portion generating an electric power. The cell temperature approximates the temperature of cooling water in the predetermined power generation portion, and therefore is virtually the temperature of the cooling water for cooling the stack 1 in the predetermined power generation portion.

The temperature of the cooling water can be easily measured by a temperature detector such as thermistor. The temperature of the cooling water in the predetermined power generation portion is expressed as operating temperature.

Here, how to heat the total enthalpy heat exchanger 5 will be described. The reformer 2 has three sections, i.e., the reforming portion 2a (reaction temperature=600 to 800° C.), the shift portion 2b (reaction temperature=250 to 300° C.), and the CO reduction portion 2c (reaction temperature=150 to 200° C.). The heater 6 is heated by the waste heat radiated from the CO reduction portion 2c. Thereby, the heater 6 heats the total enthalpy heat exchanger 5. More specifically, primary heat medium (suitably, silicon oil or the like for temperature requirement) filled within the pipe 2d attached to the outer surface of the CO reduction portion 2c by welding is heated by the waste heat radiated from the CO reduction portion 2c, and then the pump 14 operates to cause the primary heat medium to be guided to the inside of the pipe 7a of the heat exchanger 7 at a predetermined flow rate. Thereby, a secondary heat medium (suitably water for easier handling) within the heat exchanger 7 is heated up to a temperature, for example, 78° C. in a case where the operating temperature of the predetermined power generation portion in the stack 1 is 70° C.). And, by flowing the secondary heat medium having such a temperature into the pipe 6a provided in the heater 6, the heater 6 indirectly heats the total enthalpy heat exchanger 5, thereby allowing the total enthalpy heat exchanger 5, i.e., the cathode humidifying circuit 5a and the anode humidifying circuit 5b to be kept at desired temperatures. The temperature of the heater 6 is controlled in such a manner that the pump 14 controls circulation amount of the primary heat medium so that the secondary heat medium becomes constant.

After the fuel gas has been humidified and heated in the fuel gas introducing region c to be adjusted to have a dew point higher than the operating temperature of the predetermined power generation portion in the stack 1, the adjusted fuel gas is guided from the fuel gas introducing region c into the stack 1. The fuel gas flows through a fuel gas passage 1b provided within the stack 1, and is guided to the anode exhaust gas introducing region d of the anode humidifying circuit 5b in the total enthalpy heat exchanger 5. As described above, the anode exhaust gas guided to the anode exhaust gas introducing region d contains sufficient water required for total enthalpy heat exchange, and therefore, is suitably used to humidify the fuel gas. Thereafter, the anode exhaust gas used in total enthalpy heat exchange in the total enthalpy heat exchanger 5 is guided to the fuel gas water condenser 8. The anode exhaust gas is cooled in the fuel gas water condenser 8, and thereby water is obtained from the anode exhaust gas. This water is stored in the fuel gas water storage tank 9. The water stored in the fuel gas water storage tank 9 is sent to the oxidizing gas water storage tank 1 to be described later. After cooled, the dry anode exhaust gas is supplied to the reformer burner 3 by the pump 17, and combusted in the reformer burner 3.

Meanwhile, to gain the oxidizing gas required for power generation operation of the stack 1, the oxidizing gas is supplied to the total enthalpy heat exchanger 5. Specifically, the oxidizing gas is supplied by the air supply device 4 to the oxidizing gas introducing region a of the cathode humidifying circuit 5a in the total enthalpy heat exchanger 5. The oxidizing gas in the oxidizing gas introducing region a is adjusted to have a dew point higher than the operating temperature of the predetermined power generation portion in the stack 1 by total enthalpy heat exchange with the cathode exhaust gas exhausted from the stack 1 and introduced into the cathode exhaust gas introducing region b, as in the case of the fuel gas. Since the pipe extending from the oxidizing gas water storage tank 11 through the pump 16 is connected to the predetermined position of the pipe connecting the stack 1 to the total enthalpy heat exchanger 5 and configured to allow the cathode exhaust gas to flow therethrough as shown in FIG. 1, water from the oxidizing gas water storage tank 11 is added to the cathode exhaust gas exhausted from the stack 1, through the extending pipe. The reason why the water is added to the cathode exhaust gas exhausted from the stack 1 is that the cathode exhaust gas exhausted from the stack 1 does not sufficiently contain water required for total enthalpy heat exchange in the total enthalpy heat exchanger 5. Such water may be added to the cathode exhaust gas as liquid into the pipe within which the cathode exhaust gas flows. In this manner, the oxidizing gas suitable for use in power generation is generated. The adjusted oxidizing gas is guided from the oxidizing gas introducing region a to the stack 1. The oxidizing gas flows through an oxidizing gas passage 1a provided within the stack 1. The water is added to the cathode exhaust gas remaining unconsumed after the reaction of power generation, which has passed through the oxidizing gas passage 1a and has been exhausted from the stack 1, and then the cathode exhaust gas is guided to the cathode exhaust gas introducing region b provided in the cathode humidifying circuit 5a of the total enthalpy heat exchanger 5. The cathode exhaust gas in the cathode exhaust gas introducing region b is used for total enthalpy heat exchange with the fuel gas in the total enthalpy heat exchanger 5. Thereafter, the cathode exhaust gas remaining unconsumed after total enthalpy heat exchange is exhausted from the total enthalpy heat exchanger 5 and guided to the oxidizing gas water condenser 10. The cathode exhaust gas is cooled in the oxidizing gas water condenser 10, and thereby water is obtained from cathode exhaust gas. This water is stored in the oxidizing gas water storage tank 11. The water stored in the oxidizing gas water storage tank 11 is used for the reforming reaction in the reforming reaction 2b of the reformer 2 or addition to the cathode exhaust gas exhausted from the stack 1. The cathode exhaust gas cooled in the oxidizing gas water condenser 10 is released to atmosphere.

While generating an electric power, the stack 1 generates heat. So, in order to keep the temperature of the stack 1 constant, the pump 18 is operated so that the cooling water stored in the cooling water storage tank 12 is circulated through a cooling water passage 1c provided within the stack 1. In other words, the pump 18 operates so that the cooling water outflows from the cooling water storage tank 12 and returns to the tank 12 through the cooling water passage 1c provided within the stack 1. The cooling water within the water storage tank 1, which has increased its temperature by heat generation in the stack 1, is cooled down by the hear radiator 13 to a predetermined temperature.

The polymer electrolyte fuel cell system 100 operates as described above and thereby a predetermined electric power is generated in a power output terminal (not shown in FIG. 1) of the stack 1. And, a user can operate electronic equipment, etc by connecting an external connection terminal electrically connected to the output terminal of the stack 1 to a power supply terminal of the electronic equipment, etc.

In the polymer electrolyte fuel cell system 100 constructed as described above, when the operating temperature of the predetermined power generation portion in the stack 1 is, for example, 70° C., the temperature of the total enthalpy heat exchanger 5 is kept at 78° C. using the waste heat from the CO reduction portion 2c as a heat source, and the dew points of the fuel gas and the oxidizing gas are thereby adjusted to be 72° C. So, water condensation occurs within the stack 1 in which the operating temperature of the predetermined power generation portion is kept at 70° C., thereby completely inhibiting the polymer electrolyte membrane in the MEA from drying. That is, it is possible to inhibit the polymer electrolyte membrane from being damaged after an elapse of time, and hence to inhibit reduction of life. Consequently, it is possible to achieve the polymer electrolyte fuel cell system employed in a rated operation at a low current density, which can supply an electric power stably over a long period of time under the condition in which the polymer electrolyte membrane used in the stack 1 can always contain required and sufficient water.

Embodiment 2

A polymer electrolyte fuel cell system comprising a reformer according to a second embodiment of the present invention is configured to generate excessively humidified fuel gas and oxidizing gas using heat gained by partially combusting a combustible gas such as the anode exhaust gas or the fuel gas precursor, and to supply these excessively humidified gases to the fuel cell.

Figure 2:
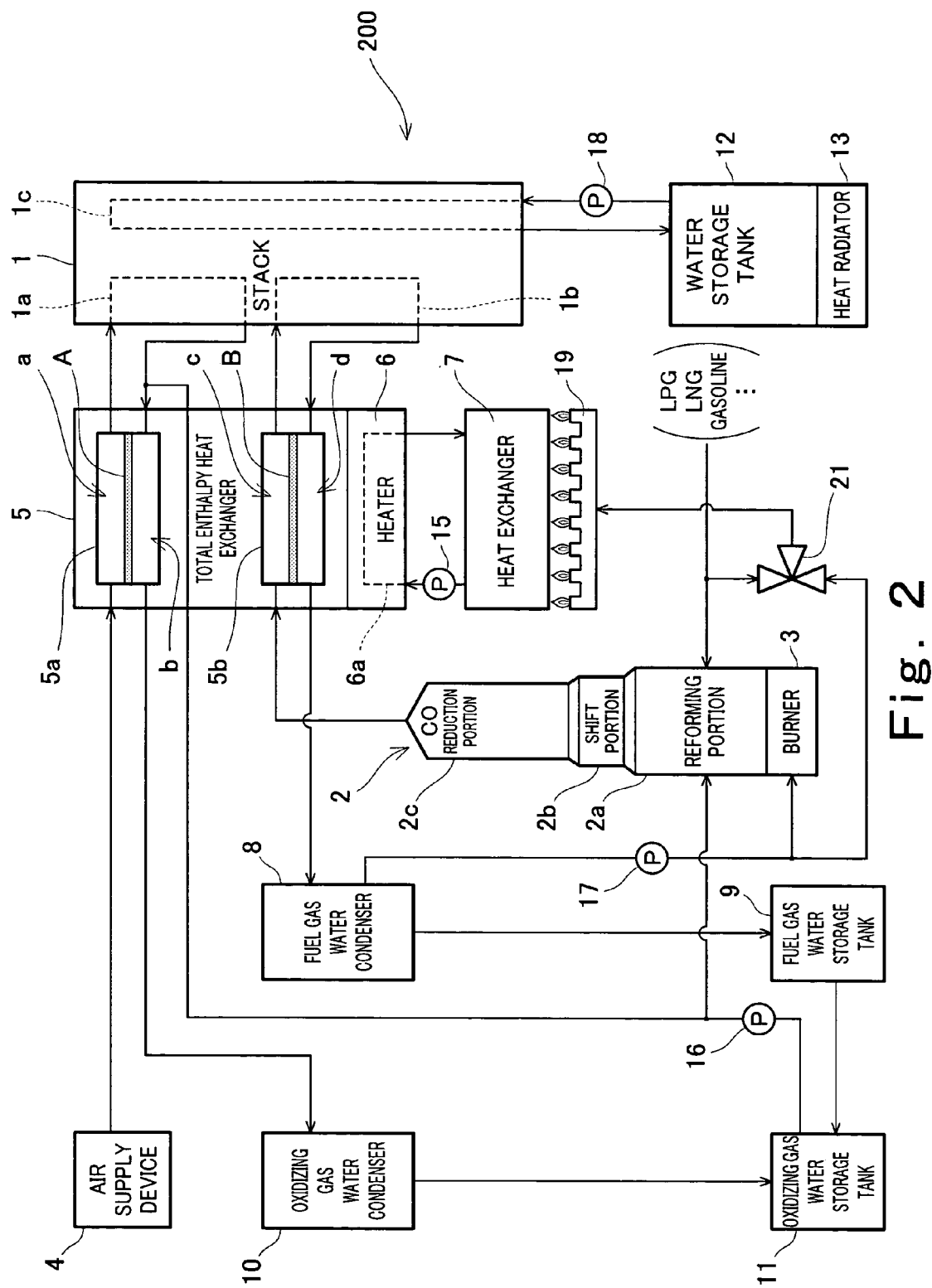
FIG. 2 is a block diagram schematically showing a construction of a polymer electrolyte fuel cell system according to a second embodiment of the present invention.

FIG. 2 is a block diagram schematically showing a construction of a polymer electrolyte fuel cell system according to a second embodiment of the present invention.

Referring to FIG. 2, a polymer electrolyte fuel cell system 200 according to a second embodiment of the present invention includes a heat exchanger burner 19 configured to heat the heat exchanger 7. The total enthalpy heat exchanger 5 is heated in such a manner that the fuel gas precursor such as LPG, LNG, gasoline, or city gas, or a part of the combustible gas such as the anode exhaust gas exhausted from the fuel gas water condenser 8 is supplied to the heat exchange burner 19 and combusted therein to heat a heat medium within the heat exchanger 7, and the heated heat medium is supplied to the heater 6 equipped on the total enthalpy heat exchanger 5. Specifically, as shown in FIG. 2, in the polymer electrolyte fuel cell system 200 according to the second embodiment, a pipe connected to a position of a pipe connecting an inlet (not shown in FIG. 2) into which the fuel gas precursor is supplied, to the reforming portion 2a of the reformer 2, and a pipe connected to the pipe extending from the fuel gas water condenser 8 through the pump 17 are connected to a three-way valve 21, and the three-way valve 21 is connected to the heat exchanger burner 19 through a pipe. By properly operating the three-way valve 21, the fuel gas precursor or the anode exhaust gas is supplied to the heat exchanger burner 19 through the pipe. In the construction in FIG. 2 in which the heat exchanger burner 19 is installed, the pipe 2d, the pump 14, and the pipe 7a in the polymer electrolyte fuel cell system 100 in FIG. 1 are omitted. In other respects, the second embodiment is identical to the first embodiment.

In the polymer electrolyte fuel cell system 200 of the second embodiment constructed as described above, most of the fuel gas precursor is consumed in the reformer 2, and a part of the fuel gas precursor is consumed to heat the heat medium in the heat exchanger burner 19. In a case where the anode exhaust gas is supplied to the heat exchanger burner 19, the anode exhaust gas is consumed in each of the reformer burner 3 and the heat exchanger burner 19. Since the heat gained by the heat exchanger burner 19 has a high temperature, the total enthalpy heat exchanger 5 is heated efficiently. And, all of the fuel gas supplied to the stack 1 is not consumed for power generation, but a part of it is exhausted as the anode exhaust gas and consumed to heat the total enthalpy heat exchanger 5, thereby resulting in improved utilization efficiency of the fuel gas. The amount of the anode exhaust gas exhausted from the stack 1 contains 20 to 30% of the fuel gas supplied to the stack 1 (e.g., the amount of the anode exhaust gas is 20% when the fuel utilization ratio is 80%), and typically combusted in the reformer 2 for re-use without being discarded. Since the anode exhaust gas exhausted from the stack 1 contains a large amount of water, it is difficult to gain a high combustion temperature by combustion of the anode exhaust gas, and therefore the anode exhaust gas is low in quality for use as a combustion gas. However, in the second embodiment, since the anode exhaust gas is cooled in the fuel gas water condenser 8, its quality is improved for use as the combustion gas. In other words, high combustion temperature is gained in the heat exchanger burner 19. It should be appreciated that no problem arises when the anode exhaust gas is used to heat the heat medium without the use of the fuel gas water condenser 8.

In the second embodiment, in the case of using the anode exhaust gas, since a part of the anode exhaust gas exhausted from the fuel gas water condenser 8 is used to heat the heat exchanger 7, the anode exhaust gas required to keep the temperature of the reformer 2 sometimes becomes deficient. In this case, the fuel gas precursor is supplied to the reformer burner 3 to compensate for deficiency of the anode exhaust gas. This increases reforming efficiency of the reformer 2.

In contrast to the configuration of first embodiment, the reformer 2 and the heat medium in the heat exchanger 7 are heated independently, and hence heating for them is independently controlled. For example, even when the reformer 2 is in thermally imbalance state in start or stop, the fuel gas and the oxidizing gas to be supplied to the stack 1 are independently humidified. Therefore, total control is easier.

While the fuel gas generated in the reformer 2 may be used to heat the heat medium in the heat exchanger 7, the fuel gas precursor or the anode exhaust gas is advantageously consumed for increasing total power generation efficiency if such as gas is only intended to be combusted in the heat exchanger burner 19, since the fuel gas is an energy source higher in quality than the fuel gas precursor before reforming. In a case where high-pressure hydrogen is used as, for example, a typical fuel for automobile use, a part of the fuel gas is inevitably used to heat the heat medium, because of the absence of the reformer 2. This will be described later in a fifth embodiment. However, in that case, it is advantageous that a fuel (e.g., gasoline) other than the high-pressure hydrogen is loaded to heat the heat medium and combusted.

Embodiment 3

A polymer electrolyte fuel cell system comprising a reformer according to a third embodiment of the present invention is configured to generate excessively humidified fuel gas and oxidizing gas using heat by catalytically combusting the anode exhaust gas and the cathode exhaust gas which have been cooled in the fuel gas water condenser and the oxidizing gas water condenser, respectively, and to supply these excessively humidified gases to the fuel cell.

Figure 3:
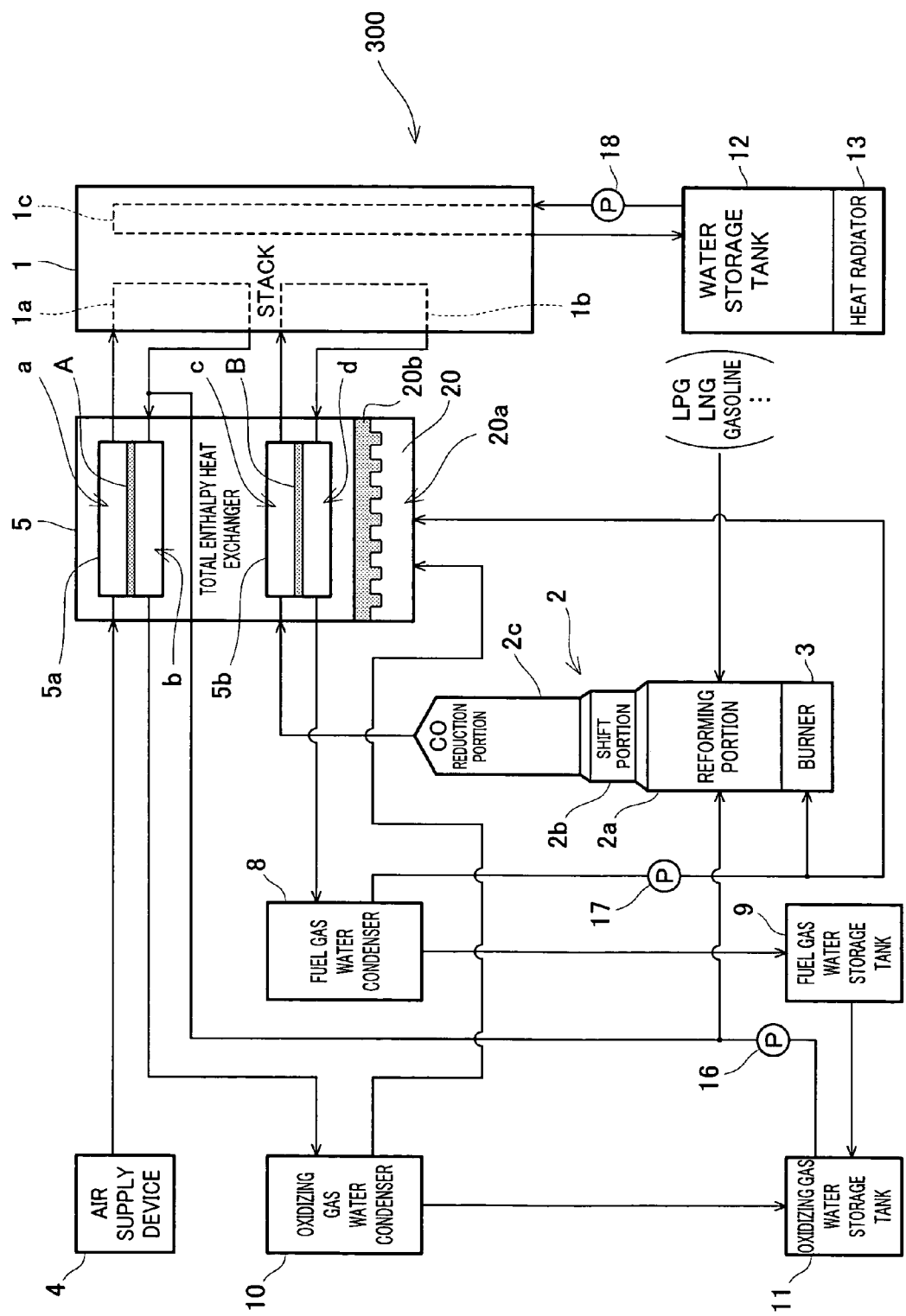
FIG. 3 is a block diagram schematically showing a construction of a polymer electrolyte fuel cell system according to a third embodiment of the present invention.

FIG. 3 is a block diagram schematically showing a construction of a polymer electrolyte fuel cell system according to a third embodiment of the present invention.

Referring to FIG. 3, a polymer electrolyte fuel cell system 300 according to a third embodiment includes a catalytic combustion heater 20 equipped on the total enthalpy heat exchanger 5 to directly heat the total enthalpy heat exchanger 5. The catalytic combustion heater 20 has a catalytic combustion region 20a into which the anode exhaust gas and the cathode exhaust gas are introduced, and a catalytic combustion plate 20b in which the anode exhaust gas and the cathode exhaust gas are catalytically combusted. As used herein, the catalytic combustion region 20a refers to a space into which the anode exhaust gas and the cathode exhaust gas are introduced. And, the catalytic combustion plate 20b refers to a reaction portion where the anode exhaust gas and the cathode exhaust gas introduced into the catalytic combustion region 20a are catalytically combusted. It should be appreciated that the catalytic combustion plate 20b is required to have a surface area sufficient to perform catalytic combustion. To this end, as shown in FIG. 3, the catalytic combustion plate 20 has a convex and concave surface. Also, as a material forming the catalytic combustion plate 20b, a material typically used as a catalytic combustion base, such as molded cogelite, is suitable. A catalyst layer chiefly made of platinum-group metal is formed on a surface of the catalytic combustion base such as the molded cordierite and then sintered, thereby forming the catalytic combustion plate 20b.

In order to drive the catalytic combustion heater 20, the polymer electrolyte fuel cell system 300 of the third embodiment is provided with a pipe extending from a position of the pipe connecting the fuel gas water condenser 8 to the reformer burner 3 to the catalytic combustion region 20a, and a pipe extending from the oxidizing gas water condenser 10 to the catalytic combustion region 20a, and configured to supply the anode exhaust gas and the cathode exhaust gas exhausted from the stack 1 to the catalytic combustion heater 20 through these pipes. In the construction in FIG. 3 in which the catalytic combustion heater 20 is installed, the pipe 2d, the pumps 14 and 15, the pipe 7a, the heat exchanger 7, the pipe 6a, and the heater 6 are omitted. In other respects, the third embodiment is identical to that of the first embodiment.

In the polymer electrolyte fuel cell system 300 of the third embodiment constructed as described above, a part of the anode exhaust gas which has been exhausted from the stack 1 and cooled in the fuel gas water condenser 8, and the cathode exhaust gas which has been exhausted from the stack 1 and cooled in the oxidizing gas water condenser 10 are introduced into the catalytic combustion region 20a of the catalytic combustion heater 20, and catalytically combusted therein to directly heat the anode humidifying circuit 5b and the cathode humidifying circuit 5a. The combustion temperature of the catalytic combustion heater 20 is controlled by controlling the amount of the anode exhaust gas or the cathode exhaust gas to be introduced into the catalytic combustion region 20a so that the temperature of the total enthalpy heat exchanger 5 becomes constant. It is necessary to set the operating temperature of the total enthalpy heat exchanger 5 by 5 to 10° C. higher than the operating temperature of the predetermined power generation portion in the stack 1, and the anode exhaust gas and the cathode exhaust gas can be catalytically combusted within this temperature range. Since the anode exhaust gas and the cathode exhaust gas are catalytically combusted in the catalytic combustion plate 20b equipped on the total enthalpy heat exchanger 5, it is possible to heat the total enthalpy heat exchanger 5 extremely efficiently. In addition, since the amount of the anode exhaust gas and the cathode exhaust gas consumed for catalytic combustion is small, power generation efficiency of the entire polymer electrolyte fuel cell system 300 is not degraded. Further, since the catalytic combustion heater 20 can be easily small-sized, the entire polymer electrolyte fuel cell system 300 can be small-sized by integrating the catalytic combustion heater 20 with the stack 1. A mixture gas of excess anode exhaust gas and cathode exhaust gas, remaining unconsumed after the reaction in the catalytic combustion heater 20, is exhausted outside the catalytic combustion heater 20.

While in the third embodiment, the anode exhaust gas and the cathode exhaust gas are supplied to the catalytic combustion heater 20, the fuel gas exhausted from the reformer 2 and the oxidizing gas supplied by the air supply device 4 may alternatively be supplied to the catalytic combustion heater 20, instead of the anode exhaust gas and the cathode exhaust gas, respectively. In another alternative, a combination of the anode exhaust gas and the oxidizing gas, or a combination of the fuel gas and the cathode exhaust gas may be employed. In such a configuration, also, effects in the third embodiment are also obtained.

Embodiment 4

A polymer electrolyte fuel cell system comprising the reformer according to a fourth embodiment of the present invention is configured to generate excessively humidified fuel gas and oxidizing gas using heat of cooling water which has cooled the stack generating an electric power and has thereby increased its temperature, and to supply these excessively humidified gases to the fuel cell.

Figure 4:
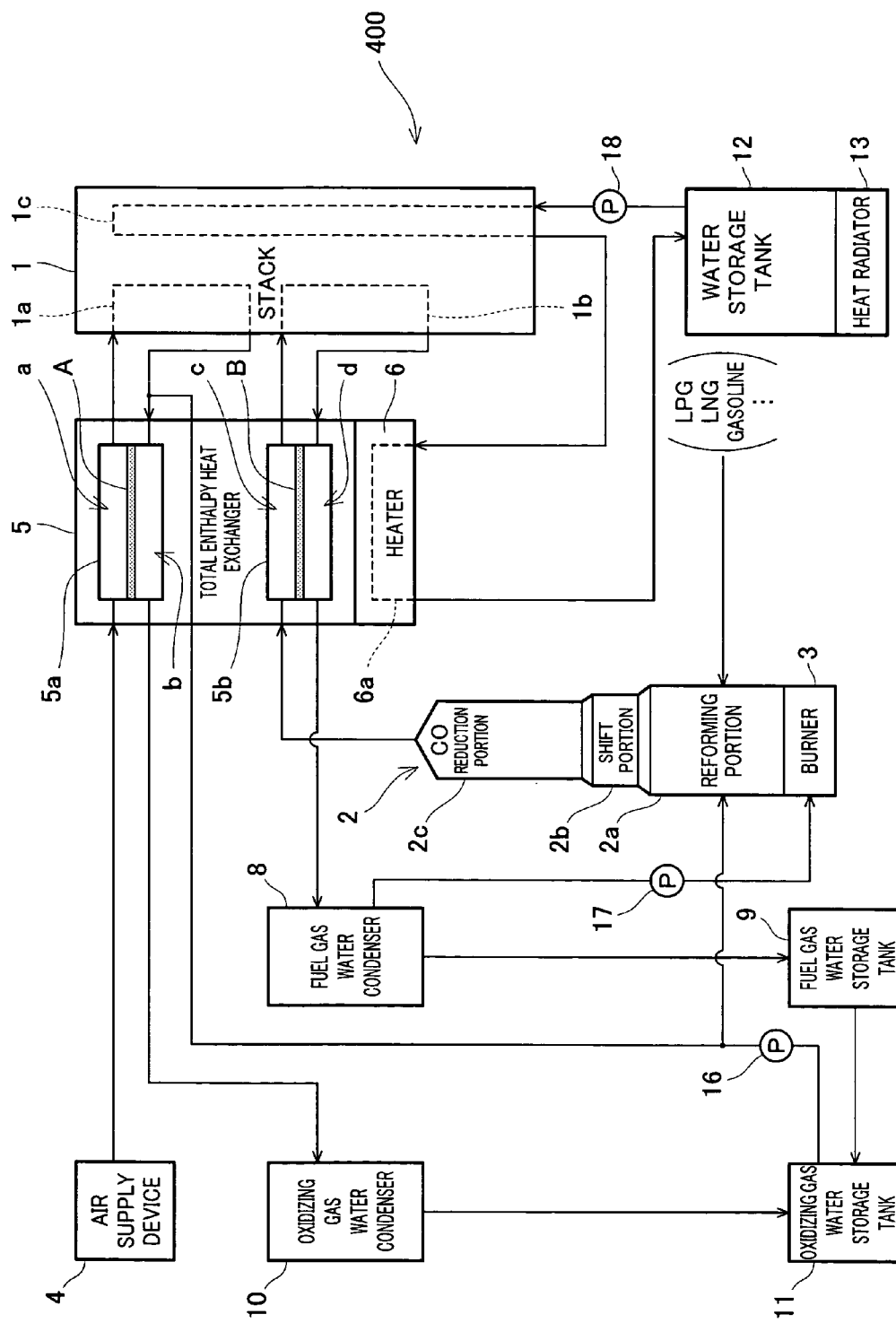
FIG. 4 is a block diagram schematically showing a construction of a polymer electrolyte fuel cell system according to a fourth embodiment of the present invention.

FIG. 4 is a block diagram schematically showing a construction of a polymer electrolyte fuel cell system according to a fourth embodiment of the present invention.

Referring to FIG. 4, a polymer electrolyte fuel cell system 400 according to a fourth embodiment of the present invention is constructed in a way that, in order to heat the total enthalpy heat exchanger 5 by the heat of the cooling water that has cooled the stack 1 generating an electric power and has thereby increased its temperature, an exit-side end portion of the cooling water passage 1c within the stack 1 is connected to one end of the pipe 6a of the heater 6 through a pipe, and the other end of the pipe 6a is connected to the cooling water storage tank 12 through a pipe, and the cooling water that has been exhausted from the stack 1 and has increased its temperature is supplied to the heater 6 through these pipes. Since the total enthalpy heat exchanger 5 is heated using the heat of the cooling water which has been exhausted from the stack 1 and has increased its temperature, the pipe 2d, the pumps 14 and 15, the heat exchanger 7 and the pipe 7a in the polymer electrolyte fuel cell system 100 in FIG. 1 are omitted. In other respects, the fourth embodiment is identical to the first embodiment.

In the polymer electrolyte fuel cell system 400 constructed as described above, the cooling water that has been exhausted from the stack 1 and has increased its temperature is guided to heat the heater 6, and the heated heater 6 indirectly heats the anode humidifying circuit 5b and the cathode humidifying circuit 5a of the total enthalpy heat exchanger 5. The temperature of the heater 6 is controlled by controlling the amount of cooling water that returns to the cooling water storage tank 12 so that the temperature of the total enthalpy heat exchanger 5 becomes constant. Also, it is necessary to set the operating temperature of the total enthalpy heat exchanger 5 by 5 to 10° C. higher than the operating temperature of the predetermined power generation portion in the stack 1. Herein, the total enthalpy heat exchanger 5 can be sufficiently heated, because the temperature of the cooling water exhausted from the stack 1 becomes sufficiently high because of the heat generated by power generation in the stack 1. In accordance with the fourth embodiment, the heat of the cooling water that has cooled the stack 1 and thereby increased its temperature is used to heat the total enthalpy heat exchanger 5, a load placed on the heat radiator 13 decreases, and consequently, it is possible to construct a polymer electrolyte fuel cell system with high energy utilization efficiency. In addition, because of the absence of the pipe 2d, the heat exchanger 7, the heat exchanger burner 19, the catalytic combustion heater 20, and the like, the entire system can be simplified. Consequently, it is possible to construct an inexpensive polymer electrolyte fuel cell system.

Embodiment 5

A polymer electrolyte fuel cell system comprising a hydrogen supply means such as hydrogen tank without a reformer according to a fifth embodiment of the present invention is configured to generate excessively humidified fuel gas and oxidizing gas using heat gained by combusting a part of combustible gas such as the anode exhaust gas or the fuel gas (hydrogen), and to supply these excessively humidified gases to the fuel cell.

Figure 5:
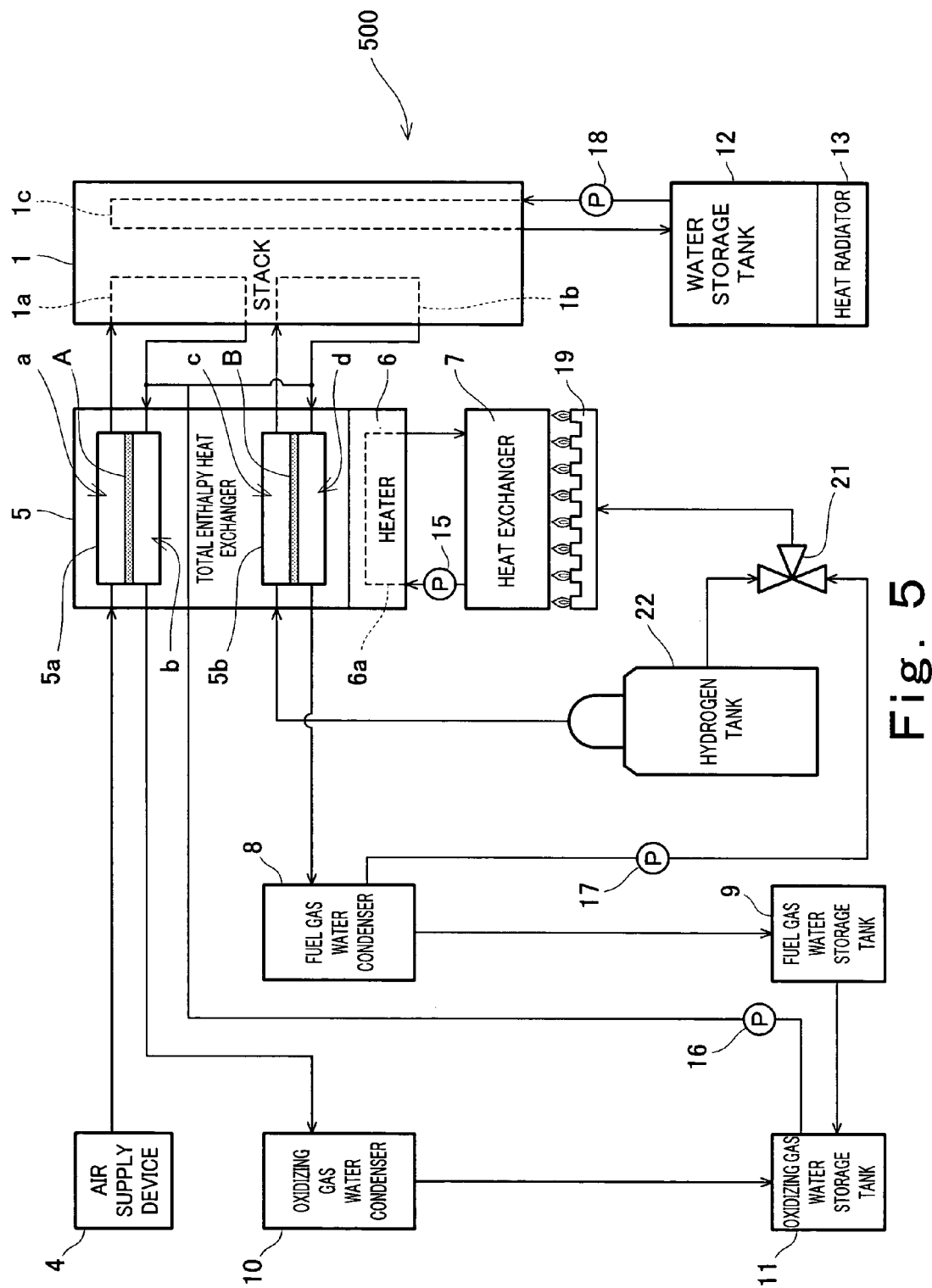
FIG. 5 is a block diagram schematically showing a construction of a polymer electrolyte fuel cell system according to a fifth embodiment of the present invention.

FIG. 5 is a block diagram schematically showing a construction of a polymer electrolyte fuel cell system according to a fifth embodiment of the present invention.

Referring to FIG. 5, a polymer electrolyte fuel cell system 500 according to the fifth embodiment is substantially identical in construction to the polymer electrolyte fuel cell system 200 of the second embodiment. In the polymer electrolyte fuel cell system 500, the combustible gas is supplied to the heat exchanger burner 19 and combusted therein to heat the heat exchanger 7, and the heated heat exchanger 7 heats the heat exchanger 6, thereby heating the total enthalpy heat exchanger 5 up to a predetermined temperature. The polymer electrolyte fuel cell system 500 is equipped with a hydrogen tank 22 capable of supplying hydrogen, instead of the reformer 2 installed in the first to fourth embodiments. In the polymer electrolyte fuel cell system 500, power generation operation is carried out in the stack 1 using the hydrogen supplied from the hydrogen tank 22. The total enthalpy heat exchanger 5 is heated in such a manner that a part of the combustible gas such as the hydrogen supplied from the hydrogen tank 22 or the anode exhaust gas exhausted from the fuel gas water condenser 8 is supplied to the heat exchange burner 19 and combusted therein to heat a heat medium within the heat exchanger 7, and the heated heat medium is supplied to the heater 6 equipped on the total enthalpy heat exchanger 5. Specifically, as shown in FIG. 5, in the polymer electrolyte fuel cell system 500, a pipe connected to a hydrogen inlet (not shown in FIG. 5) of the hydrogen tank 22 is connected to the pipe extending from the fuel gas water container 8 through the pump 17 through the three-way valve 21, and the three-way valve 21 is connected to the heat exchanger burner 19 through a pipe. And, by operating the three-way valve 21, the hydrogen or the anode exhaust gas is supplied to the heat exchanger burner 19 through the pipe.

In the fifth embodiment, the fuel gas is supplied from the hydrogen tank 22 to the stack 1. In this case, hydrogen supplied from the hydrogen tank 22 to the stack 1 is typically dry. When the dry hydrogen is supplied to the stack 1 as the fuel gas, the anode exhaust gas exhausted from the stack 1 contains a part of water generated by power generation in the stack 1 but does not sufficiently contain water required for total enthalpy heat exchange in the anode humidifying circuit 5b of the total enthalpy heat exchanger 5. Accordingly, in the fifth embodiment, water stored in the oxidizing gas water storage tank 11 is supplied to the pipe connecting the stack 1 to the total enthalpy heat exchanger 5 and configured to allow the cathode exhaust gas to flow therethrough, and the pipe connecting the stack 1 to the total enthalpy heat exchanger 5 and configured to allow the anode exhaust gas to flow therethrough. To this end, in the polymer electrolyte fuel cell system 500, the pipe extending from the oxidizing gas water storage tank 11 through the pump 16 is connected to the pipe connecting the stack 1 to the total enthalpy heat exchanger 5 and configured to allow the cathode exhaust gas to flow therethrough, and to the pipe connecting the stack 1 to the total enthalpy heat exchanger 5 and configured to allow the anode exhaust gas to flow therethrough. In this construction, water sufficient for total enthalpy heat exchange in the total enthalpy heat exchanger 5 is added to the anode exhaust gas exhausted from the stack 1. In the construction in FIG. 5 in which the hydrogen tank 22 is installed, the reformer 2, the pipe through which the water stored in the oxidizing gas water storage tank 11 is supplied to the reforming portion 2a of the reformer 2, and the pipe through which the anode exhaust gas cooled in the fuel gas water condenser 8 in the polymer electrolyte fuel cell system in FIG. 2 are omitted. In other respect, the fifth embodiment is identical to the second embodiment.

In the polymer electrolyte fuel cell system 500 thus constructed, in a case where hydrogen is supplied to the heat exchanger burner 19, most of the hydrogen is consumed for power generation in the stack 1, but a part of the hydrogen is consumed to heat the heat medium in the heat exchanger burner 19. Also, in a case where the anode exhaust gas is supplied to the heat exchanger burner 19, all of the anode exhaust gas is consumed in the heat exchanger burner 19. Since the heat gained by combustion of the hydrogen or the anode exhaust gas in the heat exchange burner 19 has a high temperature, the total enthalpy heat exchanger 5 is efficiently heated. Also, as in the second embodiment, all of hydrogen supplied to the stack 1 is not consumed for power consumption but a part of it is exhausted as the anode exhaust gas, and the exhausted anode exhaust gas is used to heat the total enthalpy heat exchanger 5. This increases utilization efficiency of hydrogen. Although the anode exhaust gas exhausted from the stack 1 is low in quality because of a large quantity of water contained therein, a high combustion temperature is gained in the heat exchanger burner 19 because the anode exhaust gas is cooled in the fuel gas water condenser 8 in the fifth embodiment. In addition, since the hydrogen tank 22 is used as a fuel gas supply source in the fifth embodiment, the polymer electrolyte fuel cell system 500 can be made movable. The movable polymer electrolyte fuel cell system 500 is suitable for use as a fuel cell system equipped in automobile.

Embodiment 6

A polymer electrolyte fuel cell system comprising the hydrogen supply means such as the hydrogen tank without the reformer according to a sixth embodiment of the present invention is configured to generate excessively humidified fuel gas and oxidizing gas using heat gained by catalytically combusting the anode exhaust gas and the cathode exhaust gas which have been cooled in the fuel gas water condenser and the oxidizing gas water condenser, respectively, and to supply these excessively humidified gases to the fuel cell.

Figure 6:
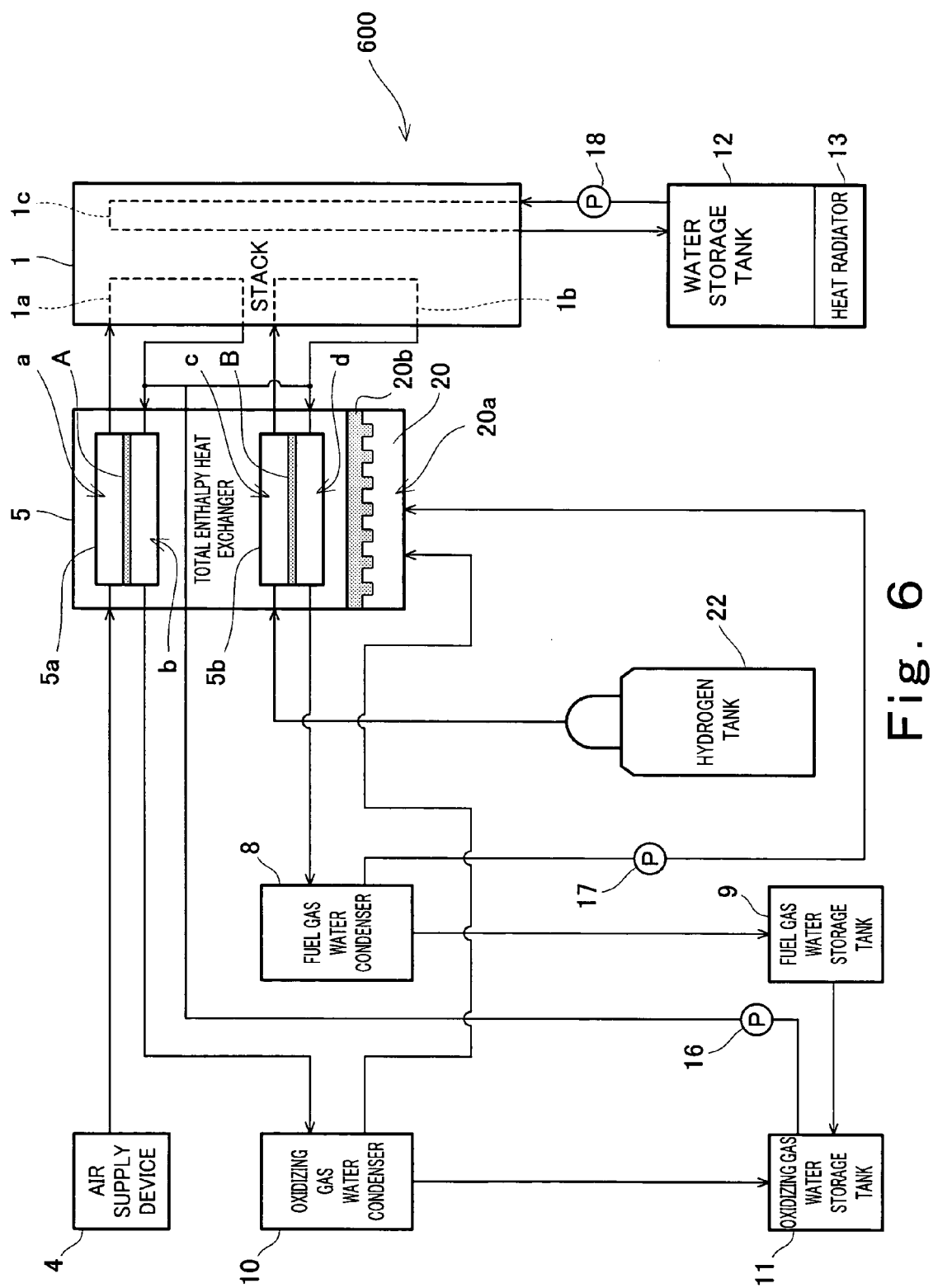
FIG. 6 is a block diagram schematically showing a construction of a polymer electrolyte fuel cell system according to a sixth embodiment of the present invention.

FIG. 6 is a block diagram schematically showing a construction of a polymer electrolyte fuel cell system according to a sixth embodiment of the present invention.

Referring to FIG. 6, a polymer electrolyte fuel cell system 600 according to the sixth embodiment is substantially identical in construction to the polymer electrolyte fuel cell system 300 of the third embodiment. In the polymer electrolyte fuel cell system 600, the cathode exhaust gas cooled in the oxidizing gas water condenser 10 and the anode exhaust gas cooled in the fuel gas water condenser 8 are supplied to the catalytic combustion heater 20 and catalytically combusted therein to heat the catalytic combustion heater 20, and the heated catalytic combustion heater 20 heats the total enthalpy heat exchanger 5 up to a predetermined temperature. As in the case of the construction of the fifth embodiment, the polymer electrolyte fuel cell system 600 is equipped with the hydrogen tank 22 capable of supplying hydrogen, instead of the reformer 2. Specifically, in the polymer electrolyte fuel cell system 600, power generation is carried out in the stack 1 using hydrogen supplied from the hydrogen tank 22. Also, as in the fifth embodiment, in the polymer electrolyte fuel cell system 600, the water stored in the oxidizing gas water storage tank 11 is added to the anode exhaust gas and the cathode exhaust gas exhausted from the stack 1. To this end, the pipe extending from the oxidizing gas water storage tank 11 through the pump 16 is connected to the pipe connecting the stack 1 to the total enthalpy heat exchanger 5 and configured to allow the cathode exhaust gas to flow therethrough and to the pipe connecting the stack 1 to the total enthalpy heat exchanger 5 and configured to allow the anode exhaust gas to flow therethrough.

In the construction in FIG. 6 in which the hydrogen tank 22 is installed, the reformer 2, the pipe through which the water stored in the oxidizing gas water storage tank 11 is supplied to the reforming portion 2a of the reformer 2, and the pipe through which the anode exhaust gas cooled in the fuel gas water condenser 8 is supplied to the reformer burner 3 in the polymer electrolyte fuel cell system 300 in FIG. 3 are omitted. In other respect, the sixth embodiment is identical to the third and fifth embodiments.

In the polymer electrolyte fuel cell system 600 of the sixth embodiment constructed as described above, as in the third embodiment, the anode exhaust gas which has been exhausted from the stack 1 and cooled in the fuel gas water condenser 8, and the cathode exhaust gas which has been exhausted from the stack 1 and cooled in the oxidizing gas water condenser 10 are introduced into the catalytic combustion region 20a of the catalytic combustion heater 20, and catalytically combusted therein to directly heat the anode humidifying circuit 5b and the cathode humidifying circuit 5a. The combustion temperature of the catalytic combustion heater 20 is controlled by controlling the amount of the anode exhaust gas or the cathode exhaust gas to be introduced into the catalytic combustion region 20a. Since the anode exhaust gas and the cathode exhaust gas are catalytically combusted in the catalytic combustion plate 20b equipped on the total enthalpy heat exchanger 5, it is possible to heat the total enthalpy heat exchanger 5 extremely efficiently. Since the amount of the anode exhaust gas and the cathode exhaust gas consumed for catalytic combustion is small, power generation efficiency of the entire polymer electrolyte fuel cell system 600 is not substantially degraded. That is, in such a construction, the effects in the third and fifth embodiments are also obtained.

While in the sixth embodiment, the anode exhaust gas and the cathode exhaust gas are supplied to the catalytic combustion heater 20 as in the third embodiment, the hydrogen supplied by the hydrogen tank 22 and the oxidizing gas supplied by the air supply device 4 may alternatively be supplied to the catalytic combustion heater 20, instead of the anode exhaust gas and the cathode exhaust gas, respectively. In another alternative, a combination of the anode exhaust gas and the oxidizing gas, or a combination of the hydrogen and the cathode exhaust gas may be employed. In such a configuration, also, effects in the sixth embodiment are also obtained.

Embodiment 7

A polymer electrolyte fuel cell system comprising the hydrogen supply means such as the hydrogen tank without the reformer according to a seventh embodiment of the present invention is configured to generate excessively humidified fuel gas and oxidizing gas using heat of cooling water that has cooled the stack generating an electric power and has thereby increased its temperature and to supply these excessively humidified gases to the fuel cell.

Figure 7:
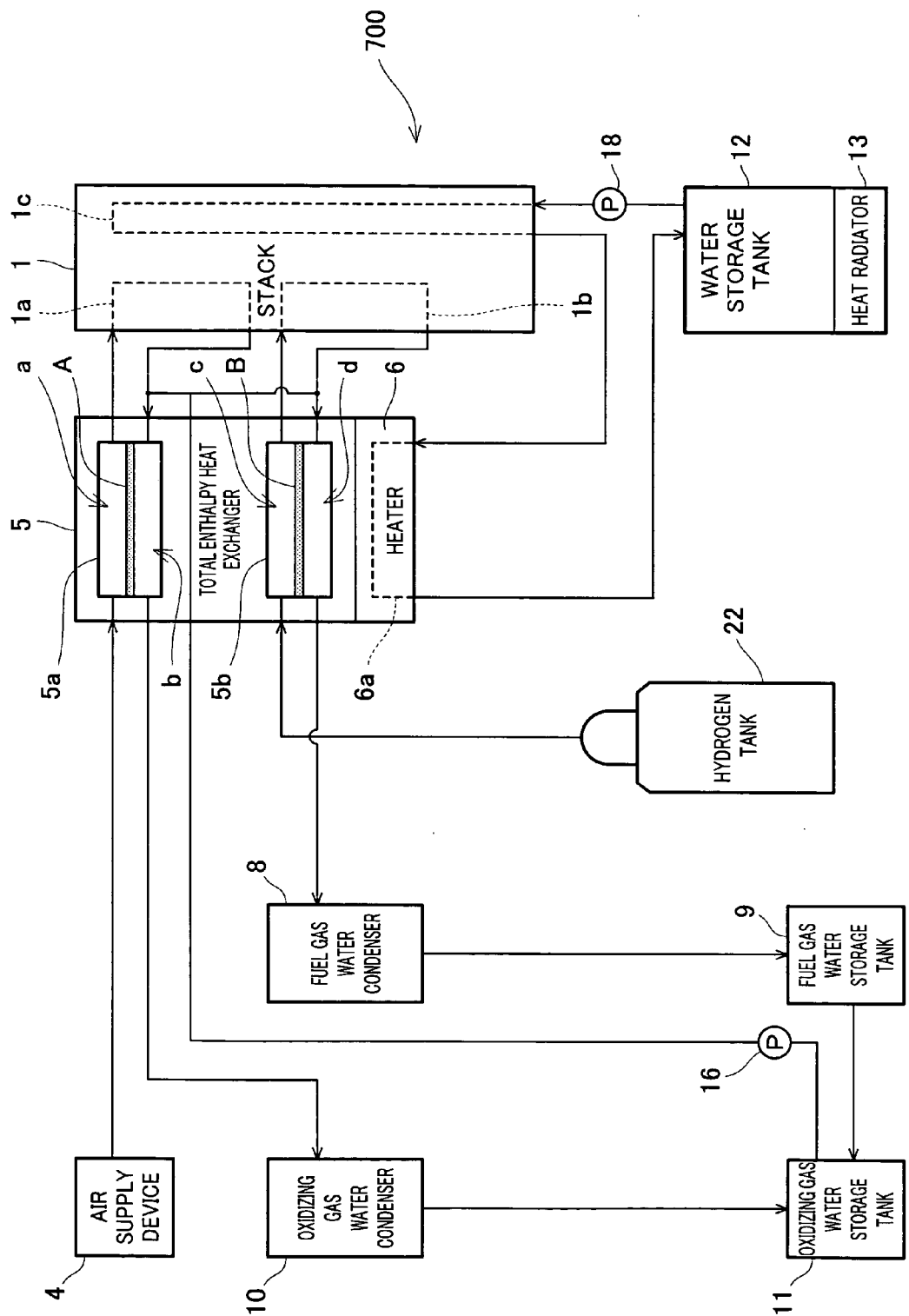
FIG. 7 is a block diagram schematically showing a construction of a polymer electrolyte fuel cell system according to a seventh embodiment of the present invention.

FIG. 7 is a block diagram schematically showing a construction of a polymer electrolyte fuel cell system according to a seventh embodiment of the present invention.

Referring to FIG. 7, a polymer electrolyte fuel cell system 700 according to the seventh embodiment is substantially identical in construction to the polymer electrolyte fuel cell system 400 of the fourth embodiment. In the polymer electrolyte fuel cell system 700, the cooling water that has cooled the stack 1 generating an electric power and has thereby increased its temperature is introduced into the pipe 6a of the heater 6 to heat the heater 6, and the heated hater 6 heats the total enthalpy heat exchanger 6 up to a predetermined temperature. As in the constructions of the fifth and sixth embodiments, the polymer electrolyte fuel cell system 700 is equipped with the hydrogen tank 22 capable of supplying hydrogen, instead of the reformer 2. Specifically, in the polymer electrolyte fuel cell system 700, power generation is also carried out in the stack 1 using hydrogen supplied from the hydrogen tank 22. Also, as in the fifth and sixth embodiments, in the polymer electrolyte fuel cell system 700, the water stored in the oxidizing gas water storage tank 11 is added to the anode exhaust gas and the cathode exhaust gas exhausted from the stack 1. And, the water is added to the anode exhaust gas and the cathode exhaust gas exhausted from the stack 1 in the same manner as described in the fifth and sixth embodiments. In the construction in FIG. 7 in which the hydrogen tank 22 is installed, the reformer 2, the pipe through which the water stored in the oxidizing gas water storage tank 11 is supplied to the reforming portion 2a of the reformer 2, and the pipe through which the anode exhaust gas cooled in the fuel gas water condenser 8 is supplied to the reformer burner 3, and the pump 17 used to supply the anode exhaust gas to the burner 3 in the polymer electrolyte fuel cell system 400 in FIG. 4 are omitted. In other respect, the seventh embodiment is identical to the fourth, fifth and sixth embodiments.

In the polymer electrolyte fuel cell system 700 of the seventh embodiment constructed as described above, as in the fourth embodiment, the cooling water which has been exhausted from the stack 1 and has increased its temperature is introduced to heat the heater 6, and the heated heater 6 indirectly heats the anode humidifying circuit 5b and the cathode humidifying circuit 6a of the total enthalpy heat exchanger 5. The temperature of the heater 6 is controlled by controlling the amount of cooling water that returns to the cooling water storage tank 12 so that the temperature of the total enthalpy heat exchanger 5 becomes constant. In the seventh embodiment, as in the fourth embodiment, since the heat of the cooling water that has cooled the stack 1 and has thereby increased its temperature is used to heat the total enthalpy heat exchanger 5, a load placed on the heat radiator 13 decreases, and consequently, it is possible to construct a polymer electrolyte fuel cell system with high energy utilization efficiency. In addition, since the construction of the polymer electrolyte fuel cell system can be simplified, it is possible to construct an inexpensive polymer electrolyte fuel cell system. That is, in such a construction, the effects in the fourth, fifth, and sixth embodiments are also obtained.

Embodiment 8

In an eighth embodiment of the present invention, the polymer electrolyte fuel cell systems 100 through 700 described in the first through seventh embodiments are altered in such a way that the stack 1 is integrated with the total enthalpy heat exchanger 5, and the integrated stack 1 and total enthalpy heat exchanger 5 are entirely covered with a heat insulator to allow heat radiation from the fuel gas and the oxidizing gas exhausted from the total enthalpy heat exchanger 5 to decrease.

In accordance with the eighth embodiment, when the fuel gas and the oxidizing gas adjusted by the total enthalpy heat exchanger 5 to have dew points higher than the operating temperature of the power generation portion in the stack 1 are supplied to the stack 1, heat radiation from the pipes connecting the total enthalpy heat exchanger 5 to the stack 1 and configured to allow the fuel gas and the oxidizing gas to flow therethrough is inhibited by the heat insulator. Thereby, the adjusted fuel gas and oxidizing gas are supplied to the stack 1 in the same conditions. That is, since the MEA and the polymer electrolyte membrane are sufficiently and effectively humidified, the polymer electrolyte fuel cell systems 100 through 700 can be constructed to operate stably over a long time period. In addition, since heating loss generated in heating the total enthalpy heat exchanger 5 is minimized, it is possible to generate the fuel gas and the oxidizing gas in excessively steam-saturated state in the total enthalpy heat exchanger 5 easily and efficiently.

Example 1

Using a stack formed by stacking 30 cells, a test was conducted to research effects of the amount of water contained in the fuel gas and the oxidizing gas on a cell life characteristic.

Figure 8:
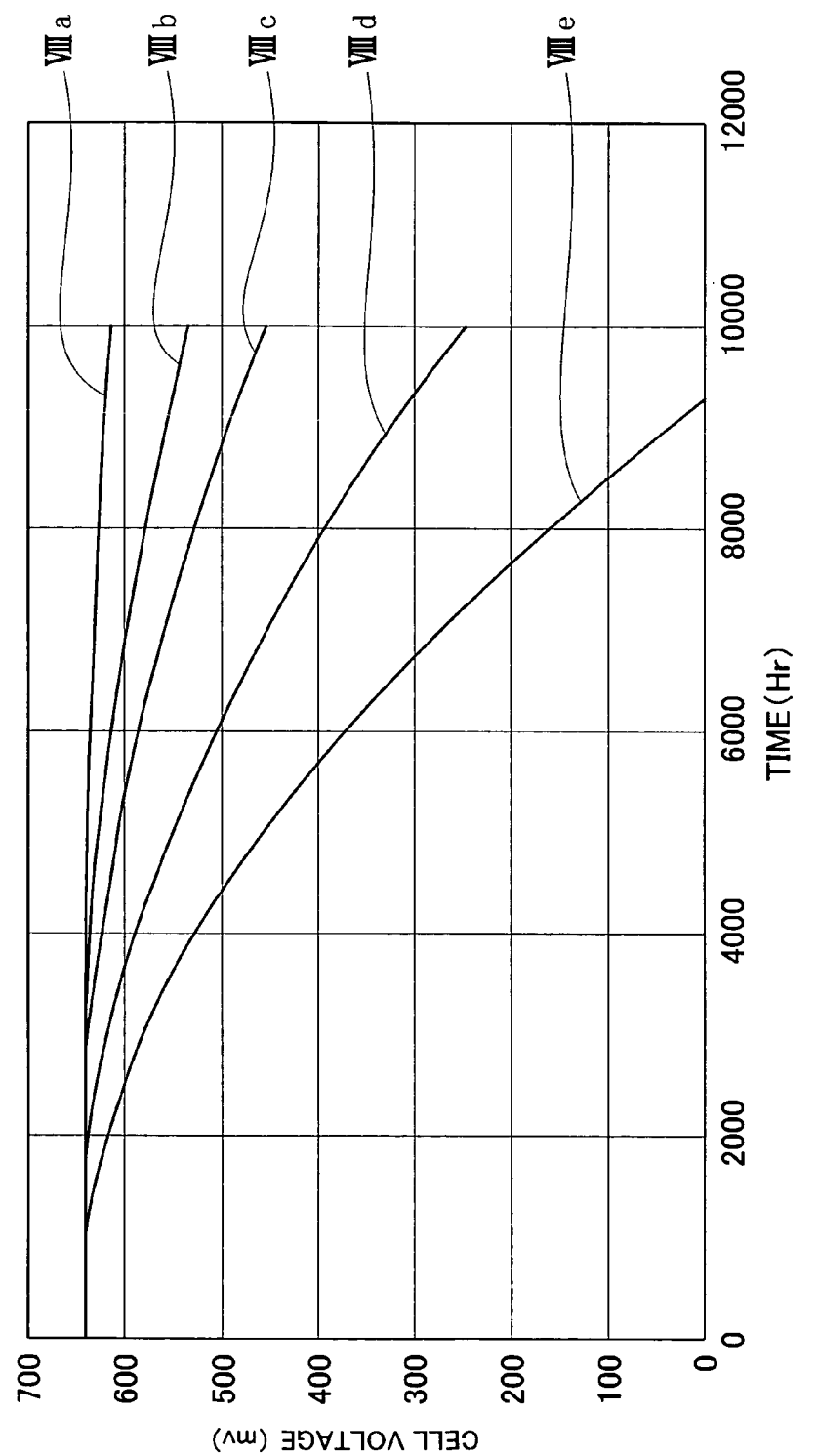
FIG. 8 is a graph showing a cell life characteristic under the condition in which a stack is operated at a current density of 0.7 $A/cm^2$.
Figure 9:
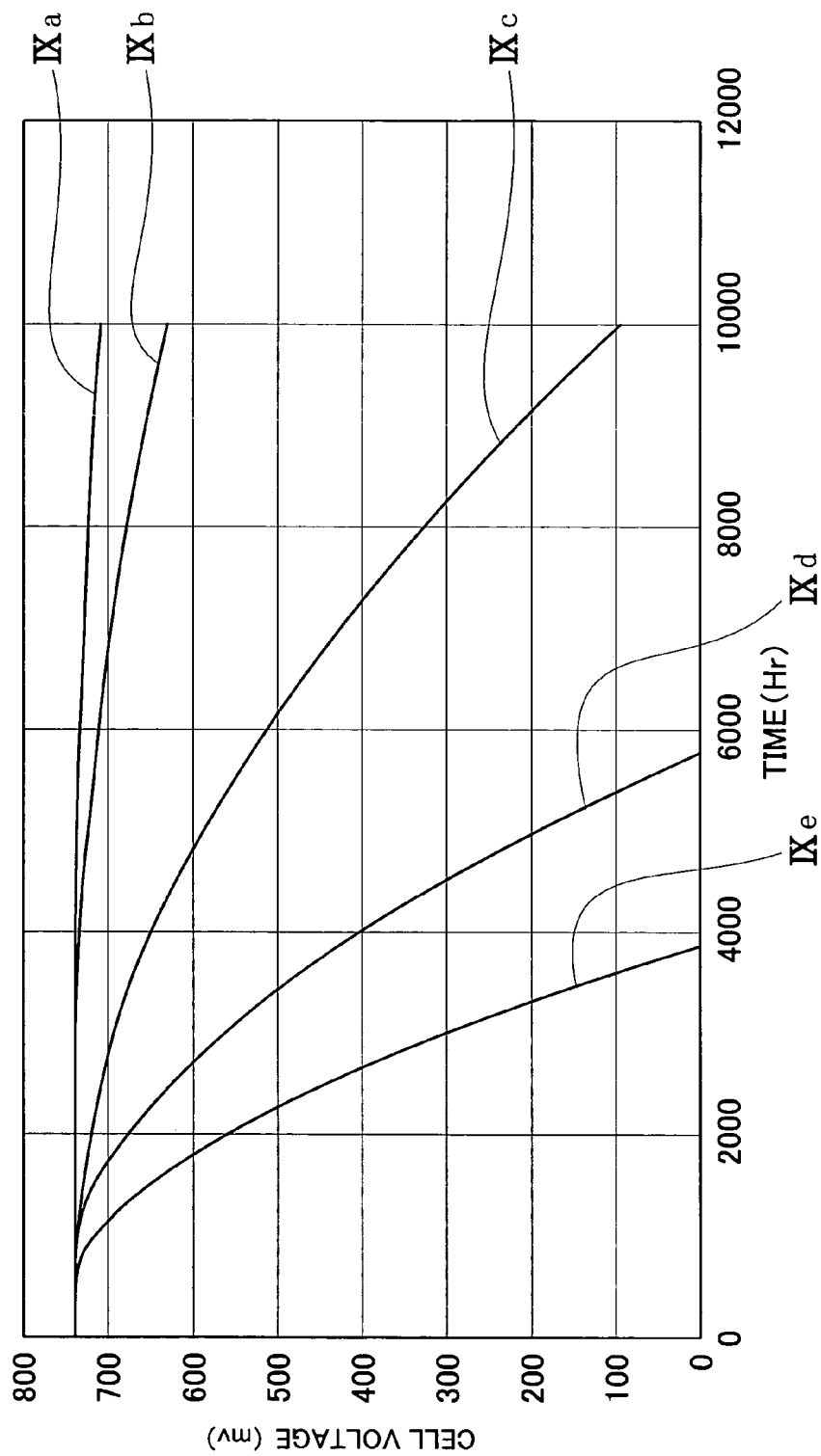
FIG. 9 is a graph showing a cell life characteristic under the condition in which the stack is operated at a current density of 0.2 $A/cm^2$.

FIG. 8 is a graph showing a cell life characteristic under the condition in which the stack is operated at a current density of 0.7 A/cm$^2$. FIG. 9 is a graph showing a cell life characteristic under the condition in which the stack is operated at a current density of 0.2 A/cm$^2$. In the graphs in FIGS. 8 and 9, abscissa axis represents operation time (Hr) and ordinate axis represents average value (mV) of a cell voltage of each cell. In this test, in operation of the stack, a fuel utilization ratio (Uf) was set to 75%, an air utilization ratio (Uo) was set to 40%, and the operating temperature of the predetermined portion in the stack was set to 70° C.

The cell life characteristic in FIG. 8 is obtained under the following setting, regarding the dew point (Tda) of the fuel gas and the dew point (Tdc) of the oxidizing gas: Tda=Tdc=60° C. (curve VIIIa), Tda=Tdc=64° C. (curve VIIIb), Tda=Tdc=66° C. (curve VIIIc), Tda=Tdc=68° C. (curve VIIId), and Tda=Tdc=70° C. (curve VIIIe). And, the cell life characteristic in FIG. 9 is obtained under the following setting: Tda=Tdc=74° C. (curve IXa), Tda=Tdc=72° C. (curve IXb), Tda=Tdc=68° C. (curve IXc), Tda=Tdc=65° C. (curve IXd), and Tda=Tdc=60° C. (curve IXe)

As should be apparent from FIG. 8, it was found that, when the stack was operated at a high current density (0.7 A/cm$^2$), more desirable cell life characteristic was obtained when the dew points of the fuel gas and the oxidizing gas are lower than the operating temperature of the predetermined power generation portion in the stack. On the other hand, as should be apparent from FIG. 9, it was found that when the stack was operated at a low current density (0.2 A/cm$^2$), more desirable cell life characteristic was obtained when the dew points of the fuel gas and the oxidizing gas were higher than the operating temperature of the predetermined power generation portion in the stack. From this, it has been revealed that in an installed cogeneration system or the like which performs rated-operation at a low current density for the purpose of increased power generation efficiency, a desirable cell life characteristic is obtained by setting the dew points of the fuel gas and the oxidizing gas higher than the operating temperature of the predetermined portion in the stack.

Subsequently, in order to analyze the above phenomenon in detail, a test was conducted to research a cause of reduction of the life of the stack.

Figure 10:
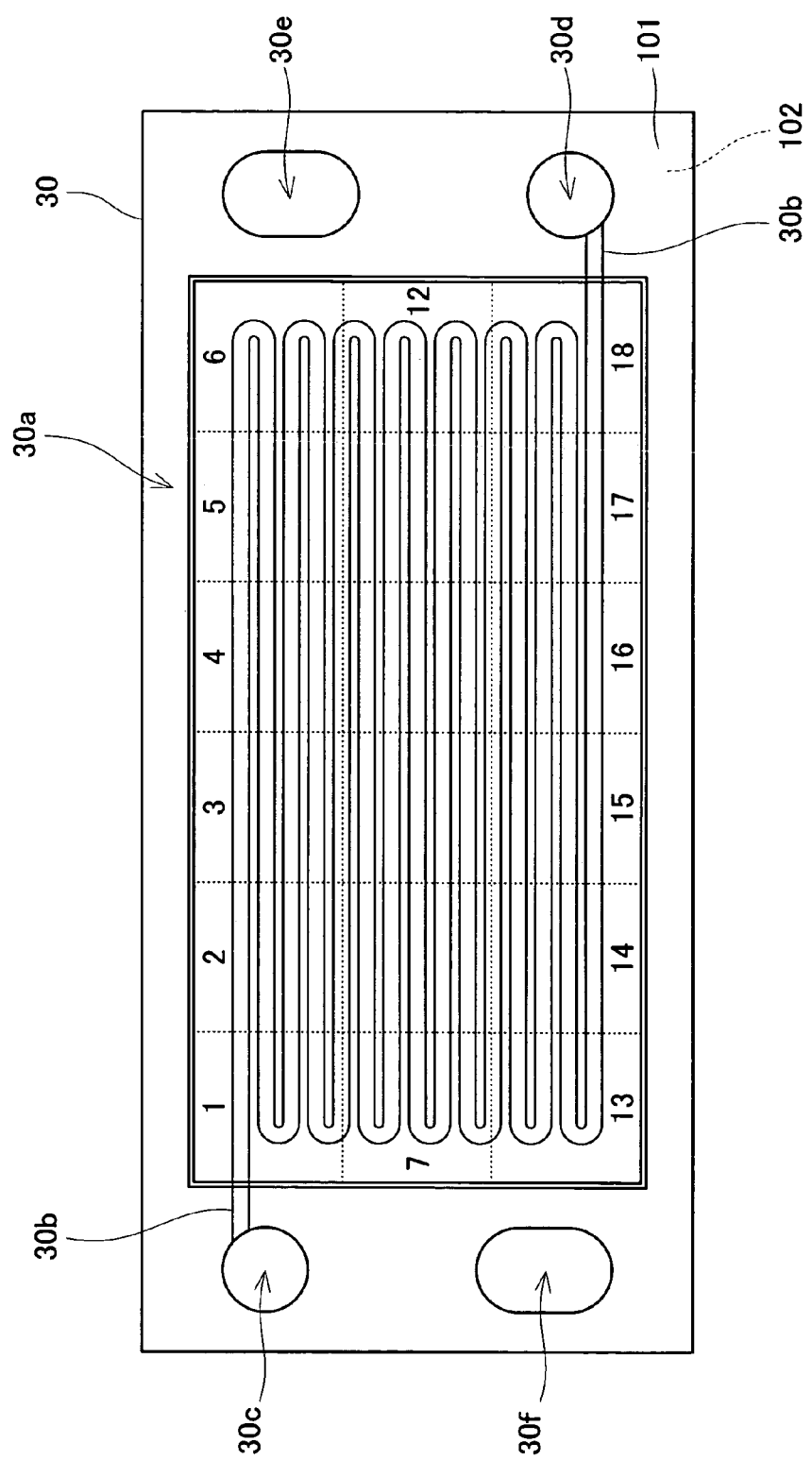
FIG. 10 is a schematic view explaining a test method to research a cause of reduction of life of the stack.

FIG. 10 is a schematic view explaining a test method for researching a cause of reduction of life of the stack (cell). In FIG. 10, a state of a MEA unit 30 that supports a MEA 30a taken out from the stack (cell) is shown. A fuel gas contact path 30b represents a path in which the fuel gas introduced through a fuel gas supply hole 30c or 30d contacted a first principal surface 101 of the MEA 30a. In addition, on a second principal surface 102 of the MEA 30a, there exists an oxidizing gas contact path (not shown) similar to the fuel gas contact path 30b, in which the oxidizing gas introduced through an oxidizing gas supply hole 30e or 30f contacted the second principal surface 102.

This test was carried out by repeating intermittent operation in such a manner that, after operating the stack at 70° C. for 2000 consecutive hours, the operation was stopped, and one cell was extracted from the stopped stack, followed by re-operation at 70° C. for 2000 consecutive hours. Then, MEA was extracted from each extracted cell, and was cut into 18 pieces (No. 1 through No. 18) as shown in FIG. 10. The cause of reduction of life of the stack was researched in such a manner that for each of the MEA pieces, a cell unloaded voltage was measured and external appearance was observed to identify a position of damaged MEA and a cause of damage. As a flow pattern of the fuel gas and oxidizing gas in operation of the stack, a flow pattern 1 in which the fuel gas flows from the fuel gas supply hole 30c to 30d and the oxidizing gas flows from the oxidizing gas supply hole 30e to 30f, and a flow pattern 2 in which the fuel gas flows from the fuel gas supply hole 30d to 30c and the oxidizing gas flows from the oxidizing gas supply hole 30f to 30e, were both employed. As used herein, the cell unloaded voltage refers to a cell voltage under no load state, and typically is approximately 0.98V per cell in an initial state. It is believed that reduction of the cell unloaded voltage is caused by the damage to the polymer electrolyte membrane in the MEA.

Figure 11:
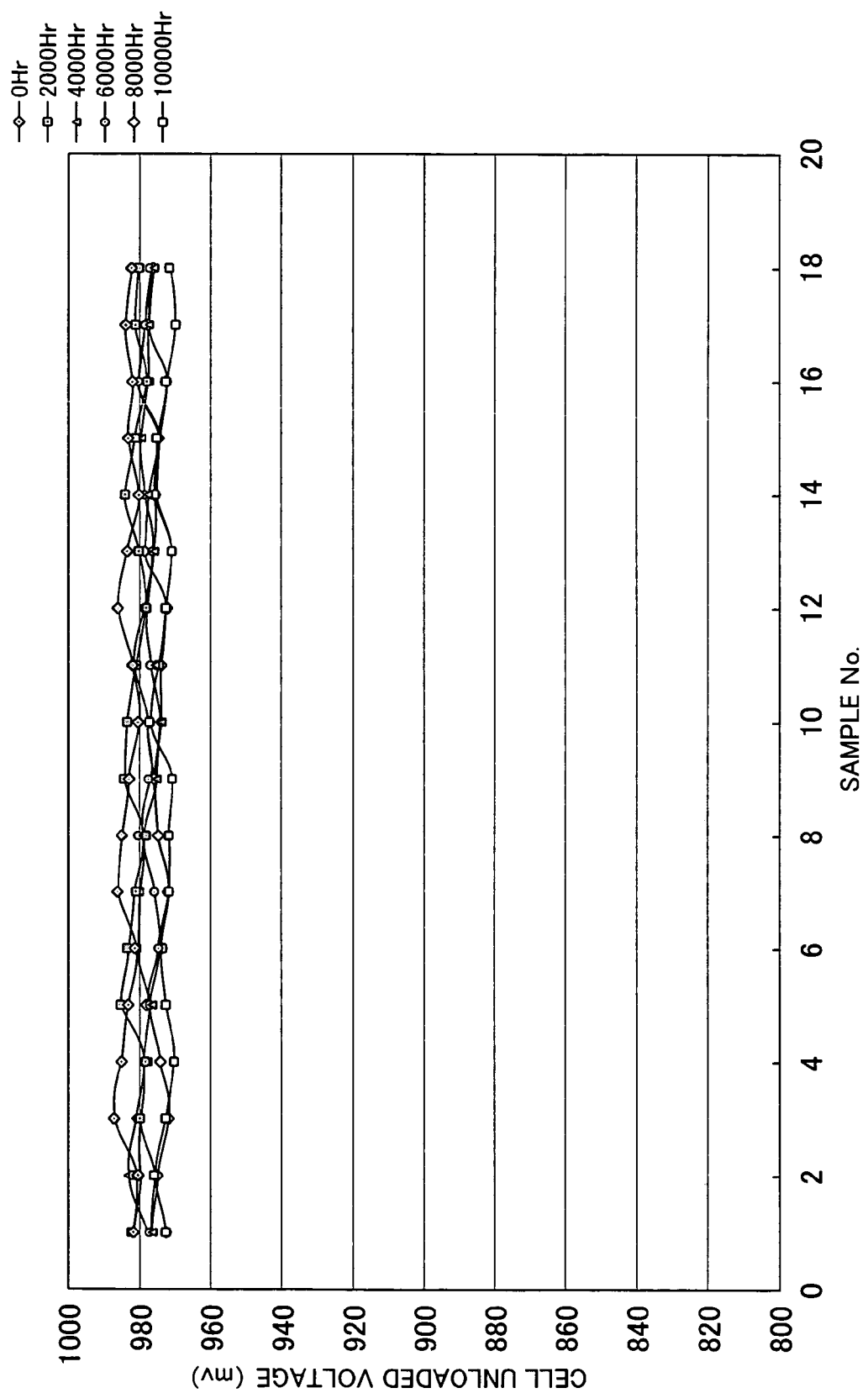
FIG. 11 is a graph showing a test result obtained by researching a cause of reduction of life of the stack under the condition in which the stack is operated at a current density of 0.7 $A/cm^2$ (Tda=Tdc=68° C., flow pattern 1)
Figure 12:
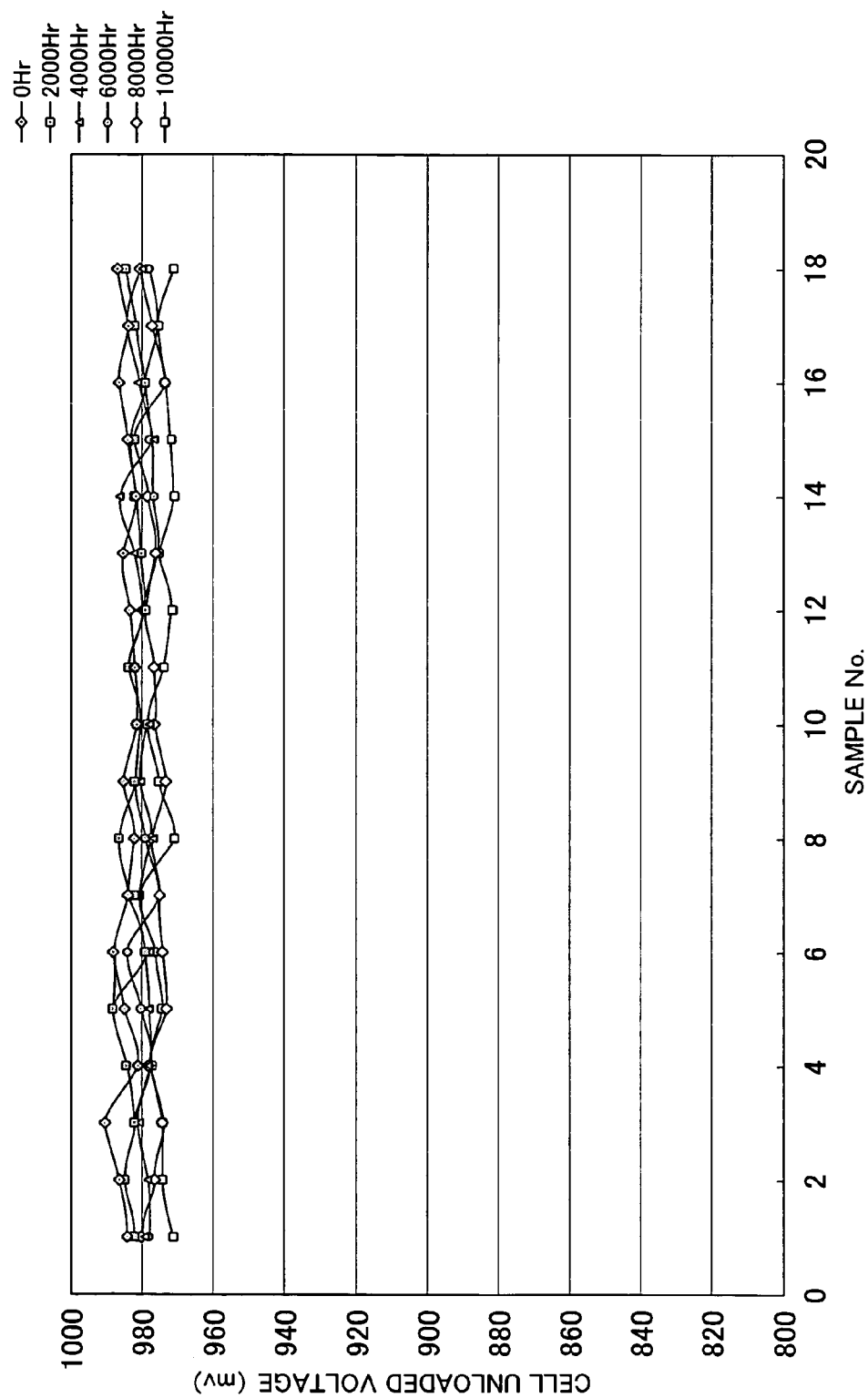
FIG. 12 is a graph showing a test result obtained by researching a cause of reduction of life of the stack under the condition in which the stack is operated at a current density of 0.7 $A/cm^2$ (Tda=Tdc=60° C., flow pattern 1)
Figure 13:
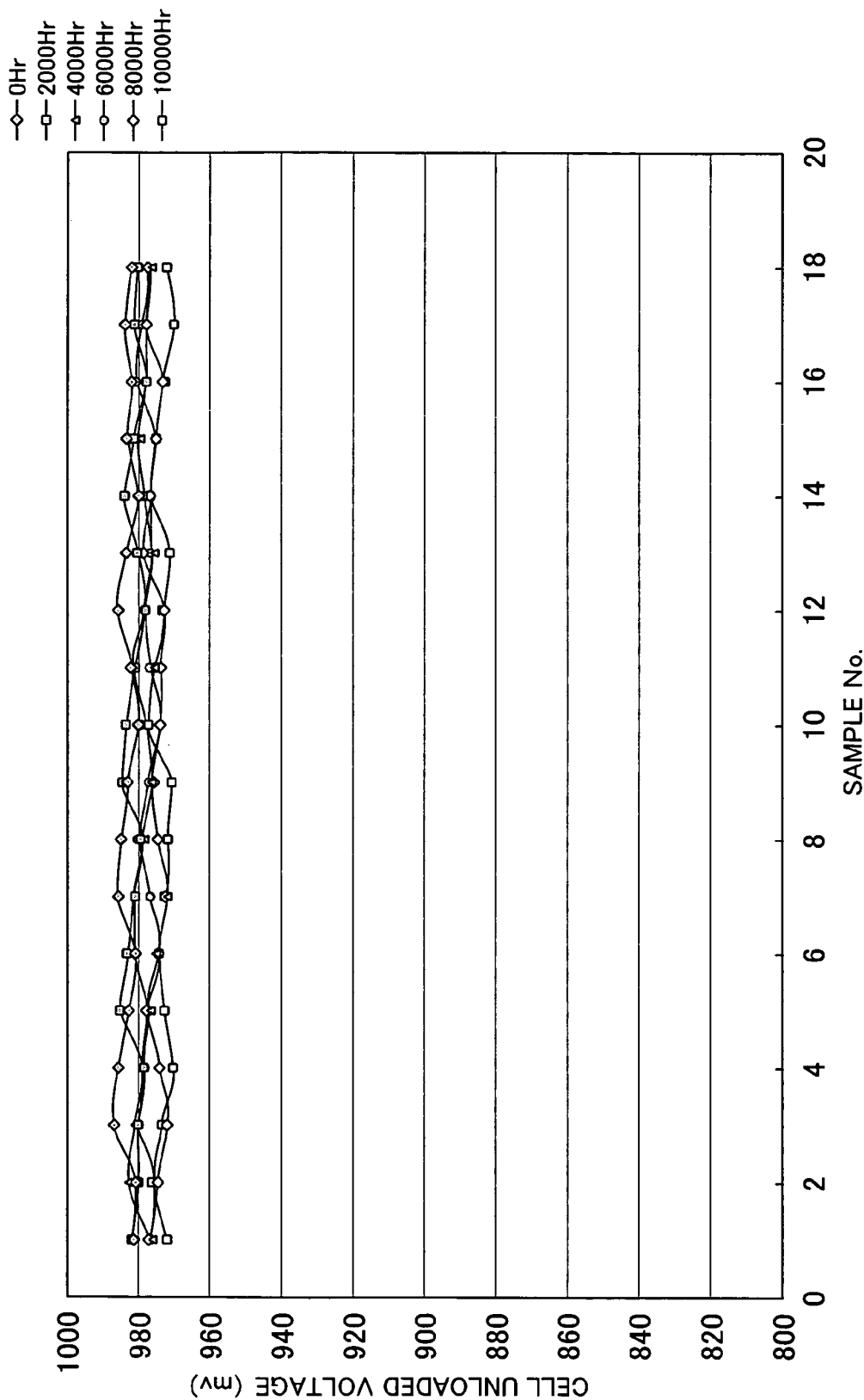
FIG. 13 is a graph showing a test result obtained by researching a cause of reduction of life of the stack under the condition in which the stack is operated at a current density of 0.2 $A/cm^2$ (Tda=Tdc=72° C., flow pattern 1)
Figure 14:
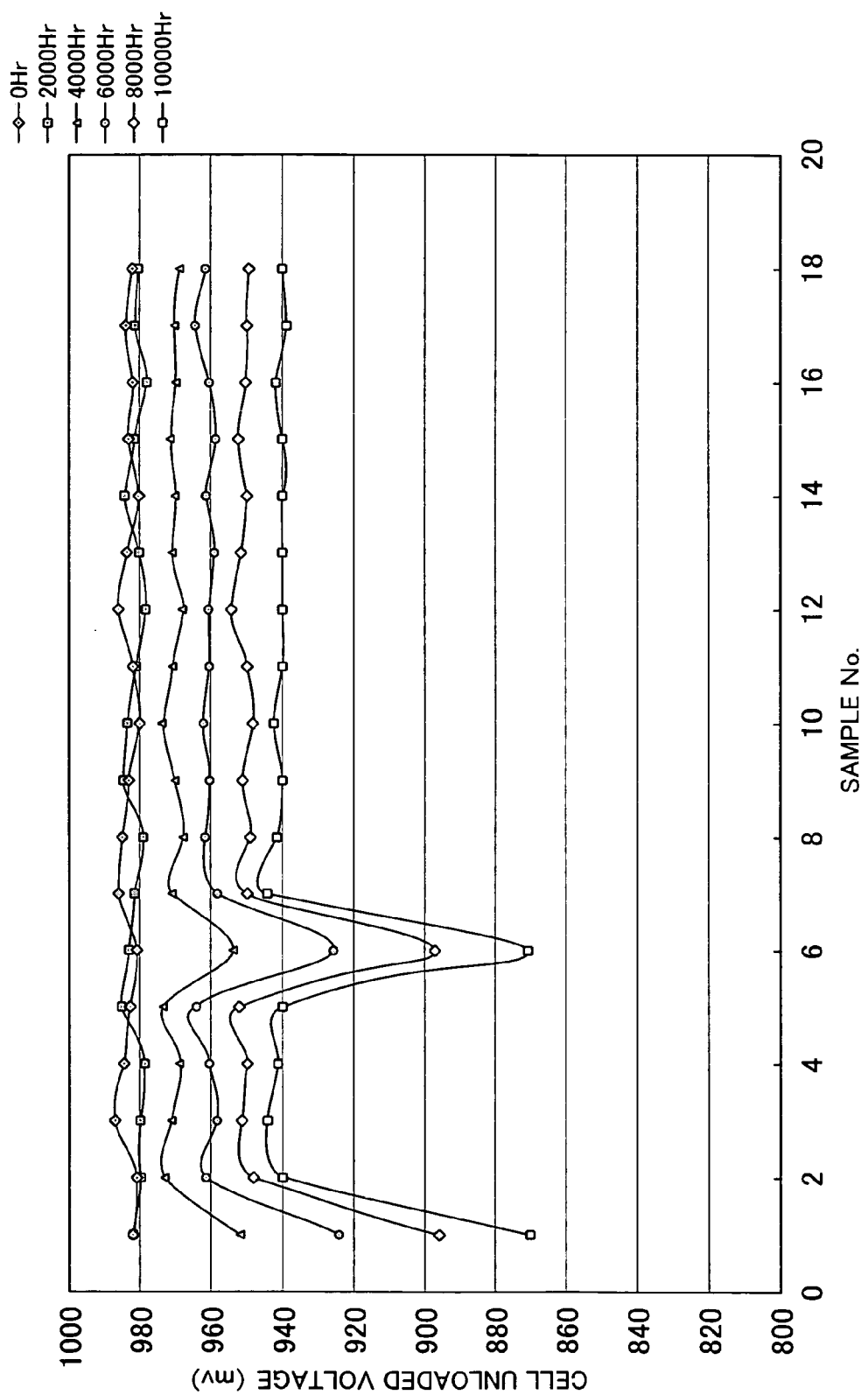
FIG. 14 is a graph showing a test result obtained by researching a cause of reduction of life of the stack under the condition in which the stack is operated at a current density of 0.2 $A/cm^2$ (Tda=Tdc=70° C., flow pattern 1)
Figure 15:
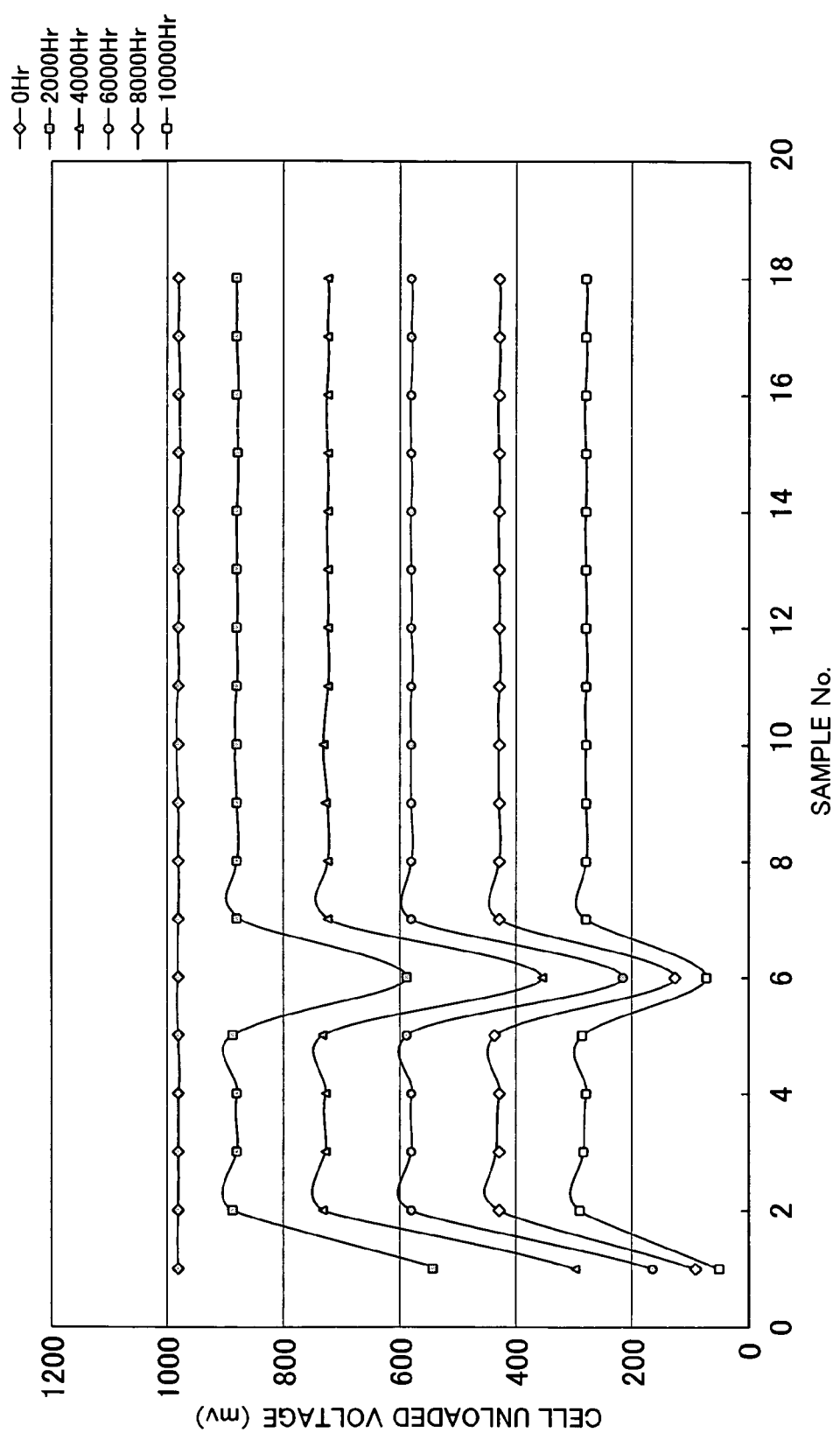
FIG. 15 is a graph showing a test result obtained by researching a cause of reduction of life of the stack under the condition in which the stack is operated at a current density of 0.2 $A/cm^2$ (Tda=Tdc=68° C., flow pattern 1)
Figure 16:
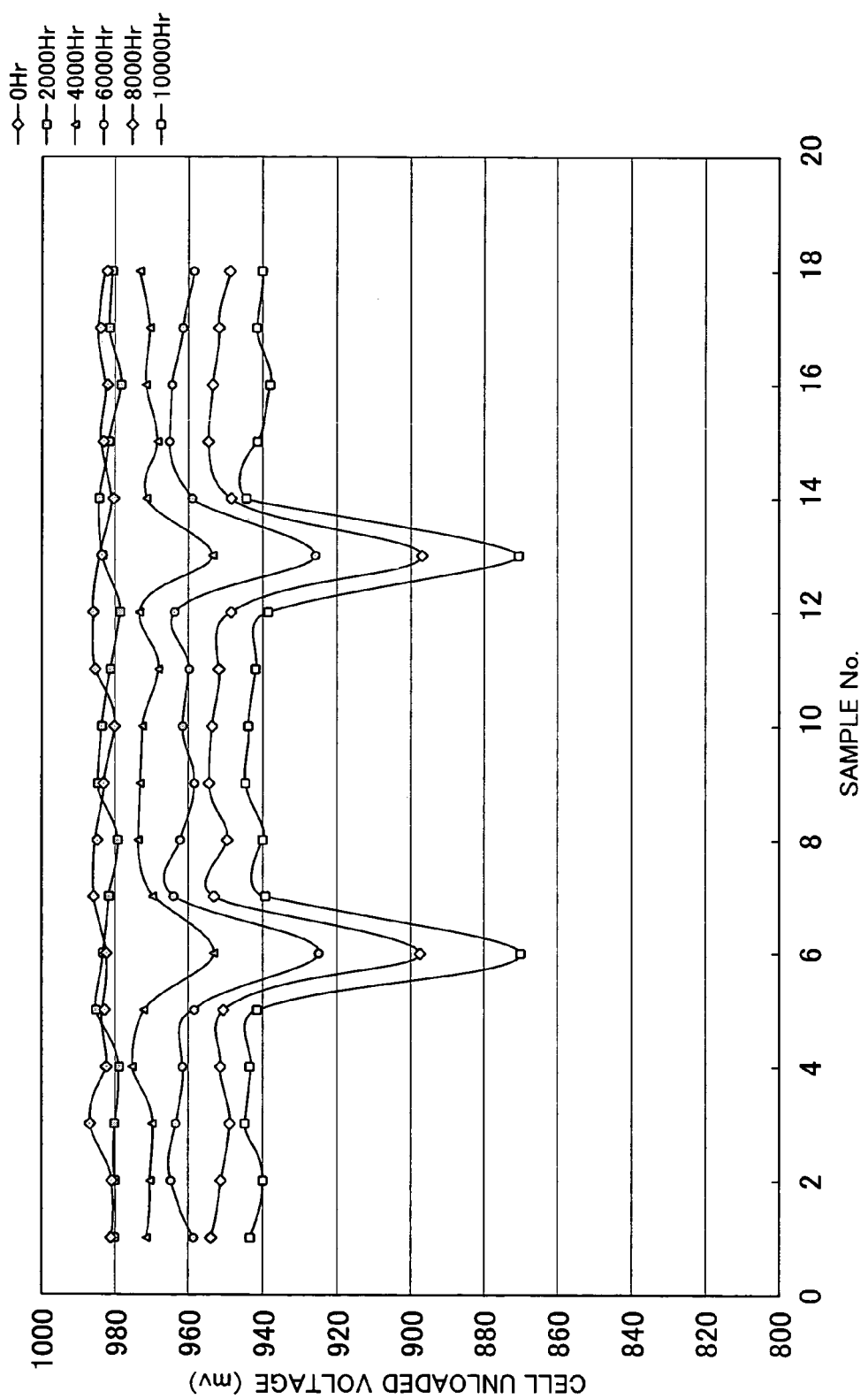
FIG. 16 is a graph showing a test result obtained by researching a cause of reduction of life of the stack under the condition in which the stack is operated at a current density of 0.2 $A/cm^2$ (Tda=Tdc=70° C., flow pattern 2)

FIGS. 11 through 16 are graphs showing test results of research of the cause of reduction of the stack. FIG. 11 shows a test result obtained under the condition in which the stack is operated at a current density of 0.7 A/cm$^2$ (Tda=Tdc=68° C.: flow pattern 1). FIG. 12 shows a test result obtained under the condition in which the stack is operated at a current density of 0.7 A/cm$^2$ (Tda=Tdc=60° C.: flow pattern 1). FIG. 13 shows a test result obtained under the condition in which the stack is operated at a current density of 0.2 A/cm$^2$ (Tda=Tdc=72° C.: flow pattern 1). FIG. 14 shows a test result obtained under the condition in which the stack is operated at a current density of 0.2 A/cm$^2$ (Tda=Tdc=70° C.: flow pattern 1). FIG. 15 shows a test result obtained under the condition in which the stack is operated at a current density of 0.2 A/cm$^2$ (Tda=Tdc=68° C.: flow pattern 1). FIG. 16 shows a test result obtained under the condition in which the stack is operated at a current density of 0.2 A/cm$^2$ (Tda=Tdc=70° C.: flow pattern 2). In FIGS. 11 through 16, test results of curves (operation time=0 h, 2000 h, 4000 h, 6000 h, 8000 h, and 10000 h) are illustrated. In graphs shown in FIGS. 11 through 16, abscissa axis represents a sample number shown in FIG. 10 and ordinate axis represent a cell unloaded voltage (mV).

Hereinbelow, the test results will be described with reference to the drawings.

As can be seen from FIGS. 11 and 12, regarding sampled 18 MEA pieces, reduction of the cell unloaded voltage was not observed after a long-time operation, when the fuel gas and the oxidizing gas are relatively dry (Tda=Tdc=60° C. see FIG. 12) or relatively moist (Tda=Tdc=68° C. see FIG. 11) relative to a saturated steam amount at the operating temperature of the predetermined power generation portion in the stack, when the current density was 0.7 A/cm$^2$. It is considered that reduction of life of the cell occurring at a current density of 0.7 A/cm$^2$ is caused by time-lapse flooding in which gas permeation is inhibited by time-lapse progress of a moist state (time-lapse progress of a hydrophilic state) of the anode catalyst layer and the cathode catalyst layer or the anode gas diffusion electrode or the cathode diffusion electrode, rather than physical damage to the MEA or the polymer electrolyte membrane.

On the other hand, as can be seen from FIGS. 13 to 16, when the current density was 0.2 A/cm$^2$, reduction of the cell unloaded voltage was not observed after a long-time operation under an operating condition (Tda=Tdc=72° C. see FIG. 13) in which the amount of water contained in the fuel gas and the oxidizing gas exceeds a saturated steam amount at the operating temperature of the predetermined power generation portion in the stack, but reduction of the cell unloaded voltage was locally or entirely observed in the MEA under other operating conditions (Tda=Tdc=70° C. see FIGS. 14 and 16, Tda=Tdc=68° C. see FIG. 15). And, it was confirmed that reduction degree of the cell unloaded voltage was larger when the amount of water contained in the fuel gas and the oxidizing gas was smaller (see FIG. 15). At this time, external appearances of the sampled 18 MEA pieces were observed carefully, and as a result, physical damage to the MEA or the polymer electrolyte fuel cell due to deficiency of water contained in the fuel and the oxidizing gas was observed. It was found that the damaged pieces were samples No. 1 and No. 6 in FIGS. 14 and 15 and samples No. 6 and No. 13 in FIG. 16, which were in the vicinity of the supply holes through which the fuel gas and the oxidizing gas are supplied to the stack.

From the above test results, it was revealed that in the polymer electrolyte fuel cell system operated at a low current density, the MEA or the polymer electrolyte membrane is physically damaged by operating the stack under the condition in which the fuel gas and the oxidizing gas are in a dry state not more than the saturated steam amount at the operating temperature of the predetermined power generation portion in the stack, thereby leading to short life of the stack (cell). Since the amount of water generated in power generation depends on a current density, the flooding, rather than drying of the MEA or the polymer electrolyte membrane, causes reduction of the life of the cell when the polymer electrolyte fuel cell system is operated under a high current density, and it is therefore desirable to set the dew points of the fuel gas and the oxidizing gas lower than the operating temperature of the predetermined power generation portion in the stack so that the water generated in power generation is eliminated. Conversely, it has been revealed that, rather than the flooding, drying of the MEA or the polymer electrolyte membrane causes reduction of life of the cell, when the polymer electrolyte fuel cell system is operated at a low current density.

As described above, the damaged portions of the MEA or the polymer electrolyte membrane concentrate on the vicinity of the supply holes through which the fuel gas and the oxidizing gas are supplied to the stack. This is due to the fact that portions located in the vicinity of the supply holes of the fuel gas and the oxidizing gas tend to become dry on both electrodes in the stack (cell). Specifically, on the cathode side, the water generated by the catalytic reaction for power generation causes the oxidizing gas to become excessively steam-saturated as it is closer to the exhaust hole while flowing from the supply hole to the exhaust hole. On the anode side, the fuel gas and the supplied steam are consumed in the catalytic reaction for power generation. But, since the excess water generated on the cathode side is diffused through the polymer electrolyte membrane, the rate at which the fuel gas is consumed is higher than the rate at which the supplied steam is consumed, and consequently, the fuel gas becomes excessively steam-saturated as it is closer to the exhaust hole while flowing from the supply hole to the exhaust hole. It was concluded that the water contained in the fuel gas and the oxidizing gas is required to be already excessively steam-saturated in the supply holes into the stack, and thereby dry portions do not exist over the entire region of the MEA, thus inhibiting reduction of life of the stack.

How the MEA or the polymer electrolyte membrane is destroyed in the case where the fuel gas and the oxidizing gas are dry has not yet become clear. Inventors presume that damage to the MEA or the polymer electrolyte membrane is associated with the way in which the heat is generated in the MEA and cooled. Hereinbelow, consideration of how the MEA or the like is destroyed will be explained.

The MEA or the like is cooled by heat transfer cooling performed by cooling the separator through the anode gas diffusion electrode and the cathode gas diffusion electrode as a good heat conductor and by heat exchange cooling using the water generated in the catalytic reaction or the steam such that these are in cooperation with each other. Specifically, the heat generated in the MEA is primarily removed by the water contained in the MEA or in contact with the MEA, and secondarily removed by the cooling water after transferred to the anode gas diffusion electrode, the cathode gas diffusion electrode, and separator. That is, the water or the steam functions as cooling heat medium (cooling medium) within the stack. Since specific heat of the fuel gas and the oxidizing gas is by far smaller than that of water, function as a cooling medium may be negligible.

The polymer electrolyte membrane having a thickness of approximately 30 to 50 μm typically functions as a hydrogen-ion conductor and exhibits some fuel gas (hydrogen) permeability. The amount of fuel gas permeation decreases as the amount of water contained in the polymer electrolyte membrane increases. In other words, permeation of the fuel gas is inhibited by the water contained in the membrane. So, when the polymer electrolyte fuel cell system is operated while supplying the dry fuel gas and oxidizing gas adjusted to have dew points not higher than the operating temperature of the predetermined power generation portion in the stack, heat generated by the catalytic reaction for power generation and heat generated by the catalytic combustion due to permeation of the fuel gas coexist in the polymer electrolyte membrane.

The power generation efficiency of the cell is given by a numeric value obtained by dividing an actual cell voltage by a theoretical electromotive force (1.48V). By way of example, when a cell voltage is 0.74V, power generation efficiency of the cell is 50%. And, heat generated in the catalytic reaction for power generation is equal to that obtained by subtracting the power generation efficiency from the total energy amount. In the above case, the heat generated in the catalytic reaction is 50% of the total energy. However, when the fuel gas that permeates the polymer electrolyte membrane is catalytically combusted on the cathode side, all of the resulting energy is converted into heat. For this reason, in an environment in which the heat generated in the catalytic reaction for power generation and the heat generated in the catalytic combustion, i.e., in power generation with the fuel gas and the oxidizing gas supplied in a dry state, the amount of generated heat is more relative to the amount of electric power generated in the stack (cell). That is, in the dry portions of the MEA, the amount of generated heat increases and these dry portions are insufficiently cooled. And, what is worse, the MEA becomes drier in the dry portions, and therefore, permeation of the fuel gas is facilitated with an elapse of time, and the resulting excessively generated heat causes the polymer electrolyte membrane to be damaged.

In a case where, in a region of the MEA, the dew points of the fuel gas and the oxidizing gas which contact the MEA region are approximately equal to the operating temperature of the predetermined power generation portion in the stack (i.e., temperature of cooling water in the predetermined power generation portion), i.e., lower than the temperature of the MEA region generating an electric power, the water which contacts or is contained in the polymer electrolyte membrane may be vaporized to be dissolved into the fuel gas and the oxidizing gas. In other words, water is taken out from the polymer electrolyte membrane. While the water taken out from such a small portion may be compensated directly by water generated in this small portion or indirectly by excess water in other portions of the MEA moving to this small portion, drying of this region of the polymer electrolyte membrane tends to progress when the rate at which the water is taken out is higher than the rate at which the water is compensated.

In the stack (cell), the water generated by the catalytic reaction for power generation on the cathode side causes the supplied oxidizing gas to become excessively steam-saturated as it is closer to the exhaust hole while flowing from the supply hole to the exhaust hole. On the anode side, the fuel gas and the supplied steam are consumed in the catalytic reaction for power generation. But, since the excess water on the cathode side is easily diffused through the polymer electrolyte membrane, the rate at which the fuel gas is consumed is higher than the rate at which the supplied steam is consumed, and consequently, the oxidizing gas becomes excessively steam-saturated as it is closer to the exhaust hole.

From these viewpoints, in the MEA regions located in the vicinity of the supply holes of the fuel gas and the oxidizing gas, the dew points of the fuel gas and the oxidizing gas are equal to the operating temperature of the predetermined power generation portion in the stack but is lower than the temperature of the MEA regions, the fuel gas and the oxidizing gas into which steam contained in the MEA regions may be dissolved are continuously supplied, and excess water from upstream side is not supplied to these regions unlike in other regions in the MEA, drying unavoidably progresses.

It is therefore necessary to set the dew points of the supplied fuel gas and oxidizing gas higher than the operating temperature of the predetermined power generation portion in the stack, i.e., make the fuel gas and the oxidizing gas excessively steam-saturated state. Thereby, dry portions do not exist over the entire region of the MEA. This makes it possible to inhibit the MEA from being degraded with an elapse of time.

The amount of steam contained in the supplied fuel gas and oxidizing gas is desirably such that, from an experiment result of the graph in FIG. 14, the fuel gas and the oxidizing gas are set to have dew points higher than the operating temperature of the predetermined power generation portion in the stack, i.e., the fuel gas and the oxidizing gas are excessively steam-saturated, because the steam is deficient if the dew points are equal to the operating temperature. This is because the temperature of the MEA generating an electric power is slightly higher than the operating temperature of the stack.

Example 2

Using a 1 kw polymer electrolyte fuel cell system having a specification different from that of the system of the example 1, supply and exhaust of the fuel gas, the oxidizing gas, and the water supplied to the polymer electrolyte fuel cell system were actually measured. The specification of the polymer electrolyte fuel cell system used in the example 2 was such that an electrode area was 169 $cm^2$, the number of stage of stacked cells was 50, and a rated current density was 0.2 $A/cm^2$. In addition, as basic operating conditions, hydrogen generated by a steam reforming process and containing 20% carbon dioxide was used, and air was used as the oxidizing gas. Further, the dew points of the fuel gas and the oxidizing gas were set to 64° C. In this case, a fuel utilization ratio was 75% and an air utilization ratio was 50%.

Theoretically, in the polymer electrolyte fuel cell system constructed as described above, supply and exhaust of substances are as follows. A basic chemical reaction formula associated with power generation is as represented by a formula (1):

$$H_2 + (\tfrac{1}{2})O_2 \rightarrow H_2O \tag{1}$$

In this case, reaction mol per second in a chemical reaction associated with power generation is calculated according to a formula (2):

$$50 \text{ (stages)} \times 169 \text{ (cm}^2\text{)} \times 0.2 \text{ (A/cm}^2\text{)}/(96500 \times 2)$$
$$= 0.0087564 \text{ (mol/sec)} \tag{2}$$

So, the amount of hydrogen required for power generation is calculated according to a formula (3):

$$0.0087564 \text{ (mol/sec)} \times 60 \text{ (sec)} \times 22.4 \text{ (L)}/0.75$$
$$(Uf) = 15.69 \text{ (NL/min)} \tag{3}$$

From this, the supply amount of fuel gas required for power generation is calculated according to formula (4):

$$15.69 \text{ (NL/min)}/0.8 \text{ (hydrogen partial pressure)} = 19.61$$
$$\text{(NL/min)} \tag{4}$$

The amount of oxygen required for power generation is calculated according to a formula (5):

$$(\tfrac{1}{2}) \times 0.0087564 \text{ (mol/sec)} \times 60 \text{ (sec)} \times 22.4 \text{ (L)}/0.5 \text{ (Uo)}$$
$$= 11.76 \text{ (NL/min)} \tag{5}$$

From this, supply amount of air required for power generation is calculated according to a formula (6):

$$11.76 \text{ (NL/min)}/0.2 \text{ (oxygen partial pressure)} = 58.84$$
$$\text{(NL/min)} \tag{6}$$

Meanwhile, supply and exhaust of water are as follows. A saturated steam partial pressure at 64° C. is 179.38 mmHg, and therefore, required humidification amount on the anode side is calculated according to a formula (7):

$$19.61 \text{ (NL/min)} \times (1/(760 \text{ (mmHg)} - 179.38 \text{ (mmHg)}) -$$
$$1) \times (18/22.4 \text{ (L)}) = 4.87 \text{ (g/min)} \tag{7}$$

And, required humidification amount on the cathode side is calculated according to a formula (8):

$$58.84 \text{ (NL/min)} \times (1/(760 \text{ (mmHg)} - 179.38 \text{ (mmHg)}) -$$
$$1) \times (18/22.4 \text{ (L)}) = 14.61 \text{ (g/min)} \tag{8}$$

A theoretical value of the amount of water generated by power generation is calculated according to a formula (9):

$$0.0087564 \text{ (mol/sec)} \times 60 \text{ (sec)} \times 18 = 9.45 \text{ (g/min)} \quad (9)$$

To measure substantial supply and exhaust of water in this polymer electrolyte fuel cell system, the stack was caused to carry out rated-operation under the above operating condition, and water contained in the anode exhaust gas and the cathode exhaust gas exhausted was cooled by icy water and obtained. In this case, the water exhaust amount of the cathode exhaust gas was 20.52 g/min (supplied water amount+5.91 g, 71.5° C. expressed in terms of dew point), and the water exhaust amount of the anode exhaust gas was 7.65 g/min (supplied water amount+2.78 g, dew point 84° C.). And, the amount of water which was incapable of being obtained was calculated according to a formula (10):

$$(4.87 \text{ (g/min)} + 14.61 \text{ (g/min)} + 9.45 \text{ (g/min)}) - (19.52 \text{ (g/min)} + 8.65 \text{ (g/min)}) = 0.76 \text{ (g/min)} \quad (10).$$

That is, the water obtaining ratio was 97%, in this case.

In the polymer electrolyte fuel cell system, it is typically considered that water supplied to the anode side moves in the direction in which hydrogen moves, and the water generated on the cathode side moves or diffuses to the anode side through the electrolytic membrane. In addition, it is considered that in an actual operating condition, complex and dynamic water movement occurs. But, it has been revealed that the amount of water exhausted is not less than the water supplied on the anode side and the cathode side, and hence the generated water is appropriately distributed.

Further, this result shows that the polymer electrolyte fuel cell system is capable of operating independently in terms of the amount of water by obtaining generated water in efficiency of 70% or higher.

Example 3

In order to research a basic characteristic of the total enthalpy heat exchanger, a cathode total enthalpy heat exchanger configured to drive the above 1 kw polymer electrolyte fuel cell system was experimentally manufactured, and a test was carried out as follows. The cathode total enthalpy heat exchanger for use in the example 2 was a membrane type total enthalpy heat exchanger configured to perform total enthalpy heat exchange such that the cathode exhaust gas (primary-side air) exhausted from the stack and the oxidizing gas (secondary-side air) supplied to the stack are separated from each other by a total enthalpy heat exchange membrane (e.g., Gore Select, produced by Japan Goretex: 30 μthick). In the example 2, the total enthalpy heat exchanger was a stack-like three fluid total enthalpy heat exchanger constructed in a way that one-stage temperature adjusting water circuit was equipped on a back surface of each one-stage total enthalpy heat exchanger. A heat exchange area per one-stage of the total enthalpy heat exchanger was 150 cm². By forming a 20-stack (20-stage) total enthalpy heat exchanger, a total enthalpy heat exchange area was 3000 cm². As separators forming passages of the total enthalpy heat exchanger, machined carbon separators (manufactured by Tokai Carbon Co. Ltd) were used, and as a contact membrane medium, carbon-fiber cloth (manufactured by Nippon Carbon. Co. Ltd) rendered hydrophilic with silica gel and having a thickness of 0.4 mm was used.

Using the total enthalpy heat exchanger thus constructed, first, two types of a hot water humidification test and a total enthalpy heat exchange test of the supplied oxidizing gas and fuel gas were carried out. As used herein, the hot water humidification test refers to a test for clarifying a suppliable dew point with the primary side filled with water in the relationship between a flow rate of the secondary-side air and an internal temperature of the total enthalpy heat exchanger, and for verifying a maximum amount of air that can be humidified according to a membrane area of the total enthalpy heat exchanger. Meanwhile, in the total enthalpy heat exchange test, based on a rated flow rate of the above 1 kw polymer electrolyte fuel cell system, the flow rate of air on the secondary side where the water is received (side on which air is supplied to the stack) was set to 58.84 NL, and the flow rate of air on the primary side where water is supplied (i.e., air is exhausted from the stack, flow rate of supply air amount×0.9 when Uo=50) was set to 52.95 NL. Also, as the secondary-side air, dry air was used, and as the primary-side air, air humidified by a temperature-controlled bubbler was used. Temperature-controlled hot water was flowed within an internal hot water circuit included in the total enthalpy heat exchanger at a flow rate of 2 L/min so that the internal temperature of the total enthalpy heat exchanger was controlled. Using the test system so constituted, a test was conducted to clarify the internal temperature of the total enthalpy heat exchanger and the suppliable dew point in the relationship with the dew point on the primary side.

Figure 17:
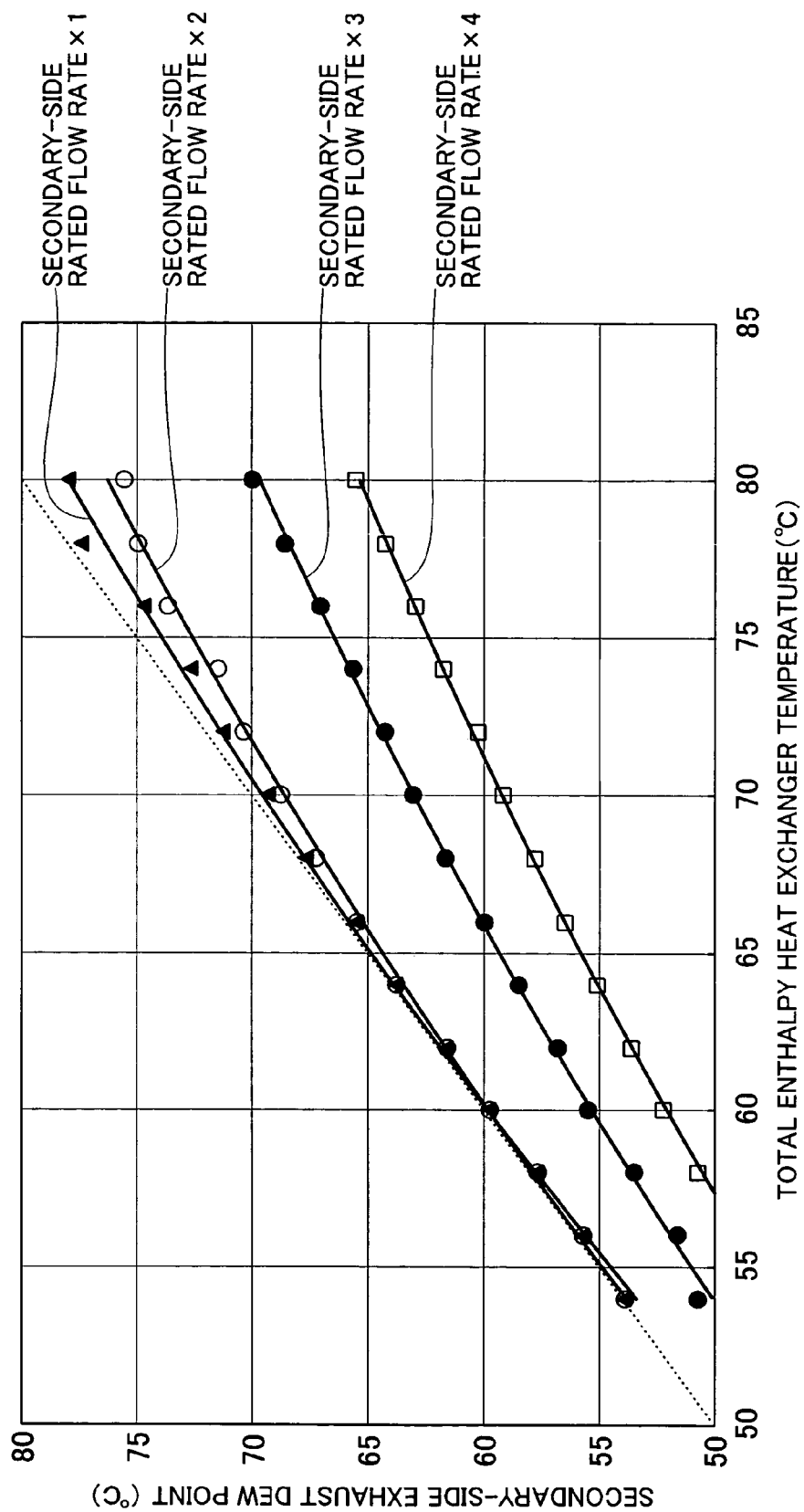
FIG. 17 is a graph showing a test result of a hot water humidification test.
Figure 18:
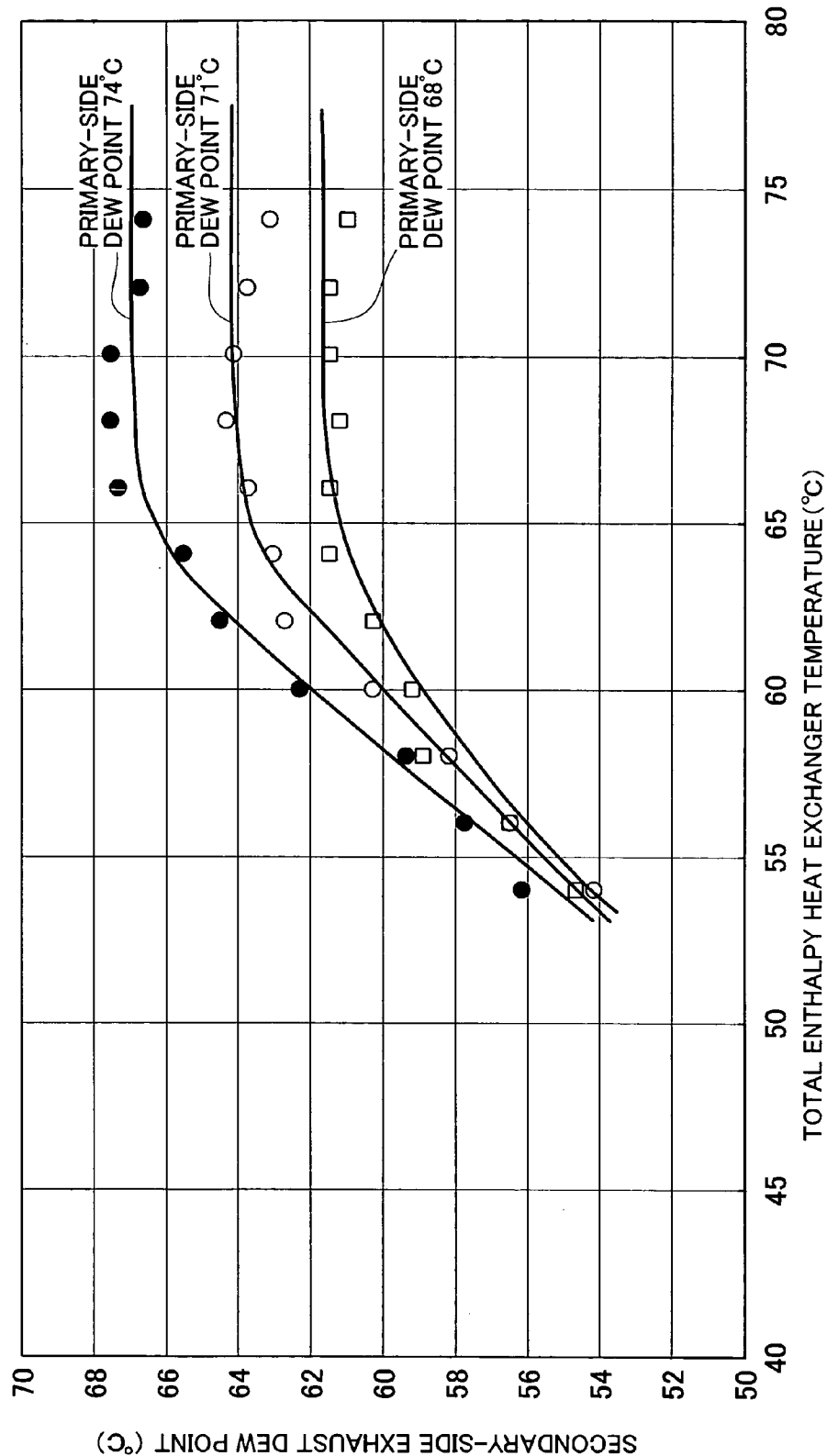
FIG. 18 is a graph showing a test result of a total enthalpy heat exchange test.

FIG. 17 shows a test result of the hot water humidification test. FIG. 18 shows a test result of the total enthalpy heat exchange test. In FIGS. 17 and 18, abscissa axis represents an internal temperature (° C.) of the total enthalpy heat exchanger, and ordinate axis represents secondary-side exhaust dew point (° C.).

As shown in FIG. 17, according to the test result of the hot water humidification test, it was found that a steam having a dew point equal to the internal temperature (hot water temperature) of the total enthalpy heat exchanger can be supplied, below a range of (rated flow rate×2), with the primary-side of the total enthalpy heat exchanger filled with water. On the other hand, it was found that a steam having a dew point equal to the internal temperature of the total enthalpy heat exchanger cannot be supplied above a range of (rated flow rate×3). The reason why the suppliable dew point decreases as the flow rate of the secondary-side air increases may be that latent heat cooling takes place in the heat exchanger and thereby the temperature of the heat exchanger decreases. Also, in this condition, heat compensation with respect to temperature decrease in the heat exchange portion is considered to be insufficient under restriction of heat transfer rate of the separators or other elements. The above are basic characteristic of the total enthalpy heat exchanger in the example 3. It was found that the total enthalpy heat exchanger exhibited performance well at a rated flow rate if the water was supplied to the primary side and heat sufficient to vaporize the water was supplied.

As shown in FIG. 18, according to the test result of the total enthalpy heat exchange, it was found that the secondary-side exhaust dew point is internal-temperature dependent in the region where the internal temperature of the total enthalpy heat exchanger is low, while the secondary-side exhaust dew point takes a constant value according to the primary-side supply dew point in the region where the internal temperature is high. This was considered to be due to the fact that the secondary dew point behaves as in the hot water humidifier because the primary-side steam condenses and remains in the primary-side passage in the region where the internal temperature of the total enthalpy heat exchanger is low, while the secondary dew point is determined uniquely by equilibrium with the supplied steam in the region where the internal temperature is high and steam condensation does not occur.

So, it was found that, with the amount of water of the cathode exhaust gas (71° C. expressed in terms of dew point) shown in the example 2, the dew point of the oxidizing gas supplied to the stack stayed at approximately 64° C. regardless of increase in the internal temperature of the total enthalpy heat exchanger.

Subsequently, a total enthalpy heat exchange test of the supplied oxidizing gas and water-added cathode exhaust gas will be described.

In this total enthalpy heat exchange test, based on the rated flow rate of the above 1 kw polymer electrolyte fuel cell system, an air flow rate on the secondary side where water is received (i.e., side where air is supplied to the stack) was set to 58.84 NL, and an air flow rate on the primary side where water is supplied (i.e., side where air is exhausted from the stack, a flow rate of supply air amount×0.9 when Uo=50) was set to 52.95 NL. As the secondary-side air, dry air was used. As the primary-side air, air which is temperature-controlled to be 70° C., humidified by a bubbler, and supplied with water having a temperature of 60° C. at a flow rate of 10 g/min, was used. Further, within the internal hot water circuit included in the total enthalpy heat exchanger, water was flowed at a flow rate of 2 L/min, thereby controlling the internal temperature of the total enthalpy heat exchanger.

Figure 19:
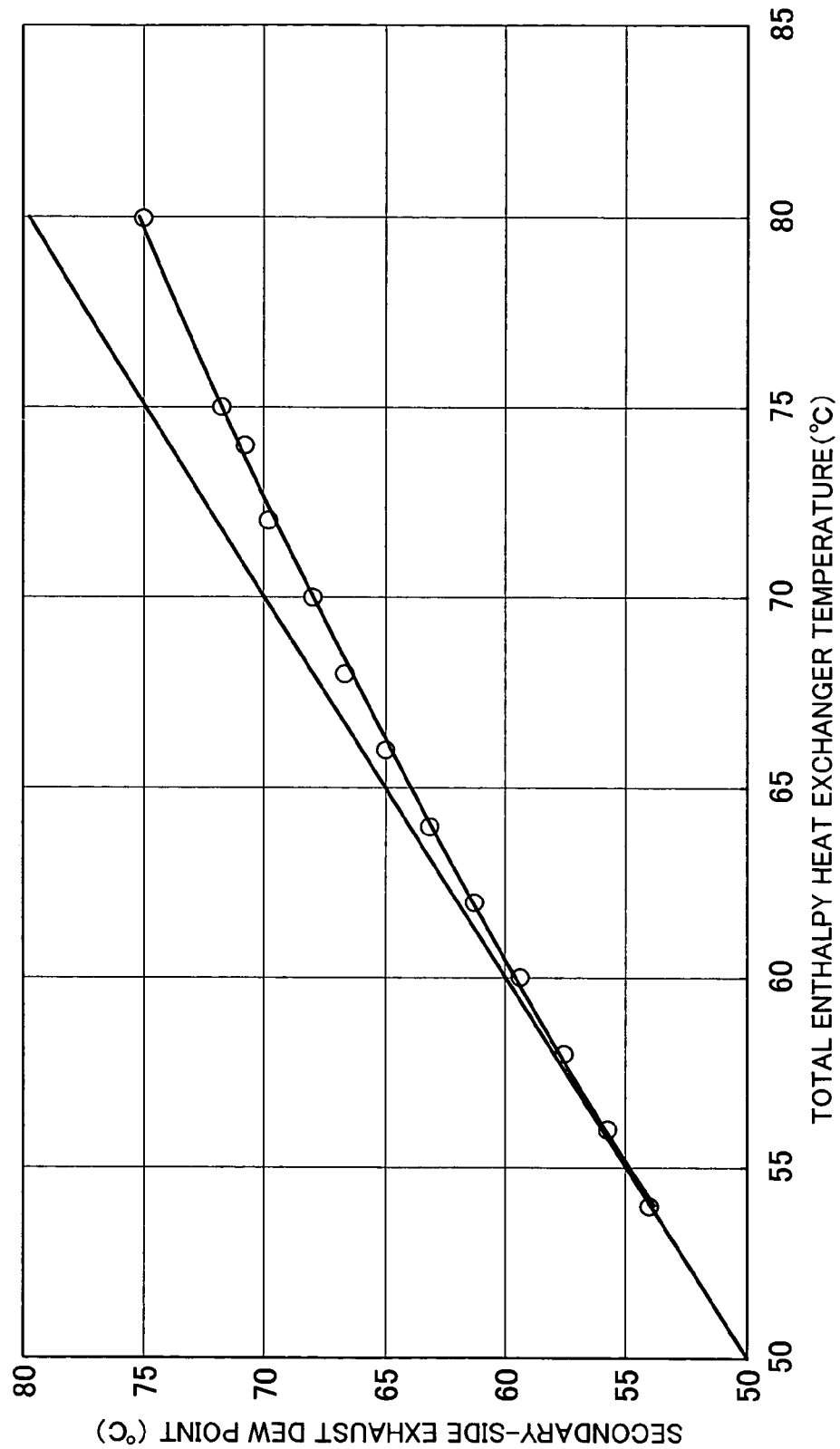
FIG. 19 is a graph showing a test result of a total enthalpy heat exchange test.

FIG. 19 shows a test result of the total enthalpy heat exchange test. In FIG. 19, abscissa axis represents an internal temperature (° C.) of the total enthalpy heat exchanger and ordinate axis represents secondary-side dew point (° C.).

As shown in FIG. 19, it was found that in the total enthalpy heat exchange between the supplied oxidizing gas and the water-added cathode exhaust gas, the dew point of the oxidizing gas exhibited a behavior substantially similar to that in the case where the hot water humidifier is used. In addition, it was found that under the condition in which the internal temperature of the total enthalpy heat exchanger was below 70° C., the dew point of the oxidizing gas roughly matched the internal temperature.

As should be apparent from the above test results, it was found that in the membrane type total enthalpy heat exchanger, if sufficient water is supplied to the primary side, a substantially desired dew point is gained merely by adjusting the internal temperature of the total enthalpy heat exchanger. And, it was also found that, since restriction arose due to equilibrium, with only the water contained in the cathode exhaust gas, performance similar to that of the hot water humidifier exhibited by adding water to the primary side.

Example 4

An anode total enthalpy heat exchanger was experimentally manufactured to drive the above 1 kw polymer electrolyte fuel cell system, and a test was carried out as described below. The anode total enthalpy heat exchanger used in the example 4 was a membrane-type total enthalpy heat exchanger configured to perform total enthalpy heat exchange such that the anode exhaust gas (primary-side off gas) exhausted from the stack and the fuel gas (secondary-side fuel gas) supplied to the stack are separated from each other by a total enthalpy heat exchange membrane (here, Gore Select produced by Japan Goretex: 30 μthick). In the example 4, the total enthalpy heat exchanger was a stack-like three fluid total enthalpy heat exchanger constructed in a way that one-stage temperature adjusting water circuit was equipped on a back surface of each one-stage total enthalpy heat exchanger. A heat exchange area per one stage of the total enthalpy heat exchanger was 150 cm$^2$. By forming a 8-stack (8-stage) total enthalpy heat exchanger, a total enthalpy heat exchange area was 1200 cm$^2$. Other specification of the total enthalpy heat exchanger in the example 4 is similar to that of the example 3.

Using the anode total enthalpy heat exchanger so constructed, the test was conducted as described below. On the secondary side, a simulated fuel gas obtained by mixing hydrogen and carbon dioxide in a ratio of 4:1, and by humidifying the mixture gas by a temperature-controlled bubbler was supplied at 19.6 NL. On the primary side, a two-layer flow simulated anode exhaust gas obtained by mixing hydrogen and carbon dioxide in a ratio of 1:1, by humidifying the mixture gas by a bubbler temperature-controlled to be 80° C., and by cooling down the gas to 64° C. was supplied at 7.8 NL. And, within the internal hot water circuit, temperature-controlled hot water was flowed at a flow rate of 2 L/min so that the internal temperature of the total enthalpy heat exchanger was controlled. The above flow rates of the fuel gas and the anode exhaust gas were desired by the stack when Uf was 75%. And, the bubbler temperature on the primary side was set by subtracting several centigrade degrees from the dew point corresponding to the amount of water contained in the anode exhaust gas obtained in the example 2, considering safety ratio. In the example 4, in the test system so constituted, with the secondary-side supply dew points set to 58° C., 60° C., and 62° C. corresponding to S/C=2.7, 2.9, and 3.1, the secondary-side exhaust dew points were researched.

Figure 20:
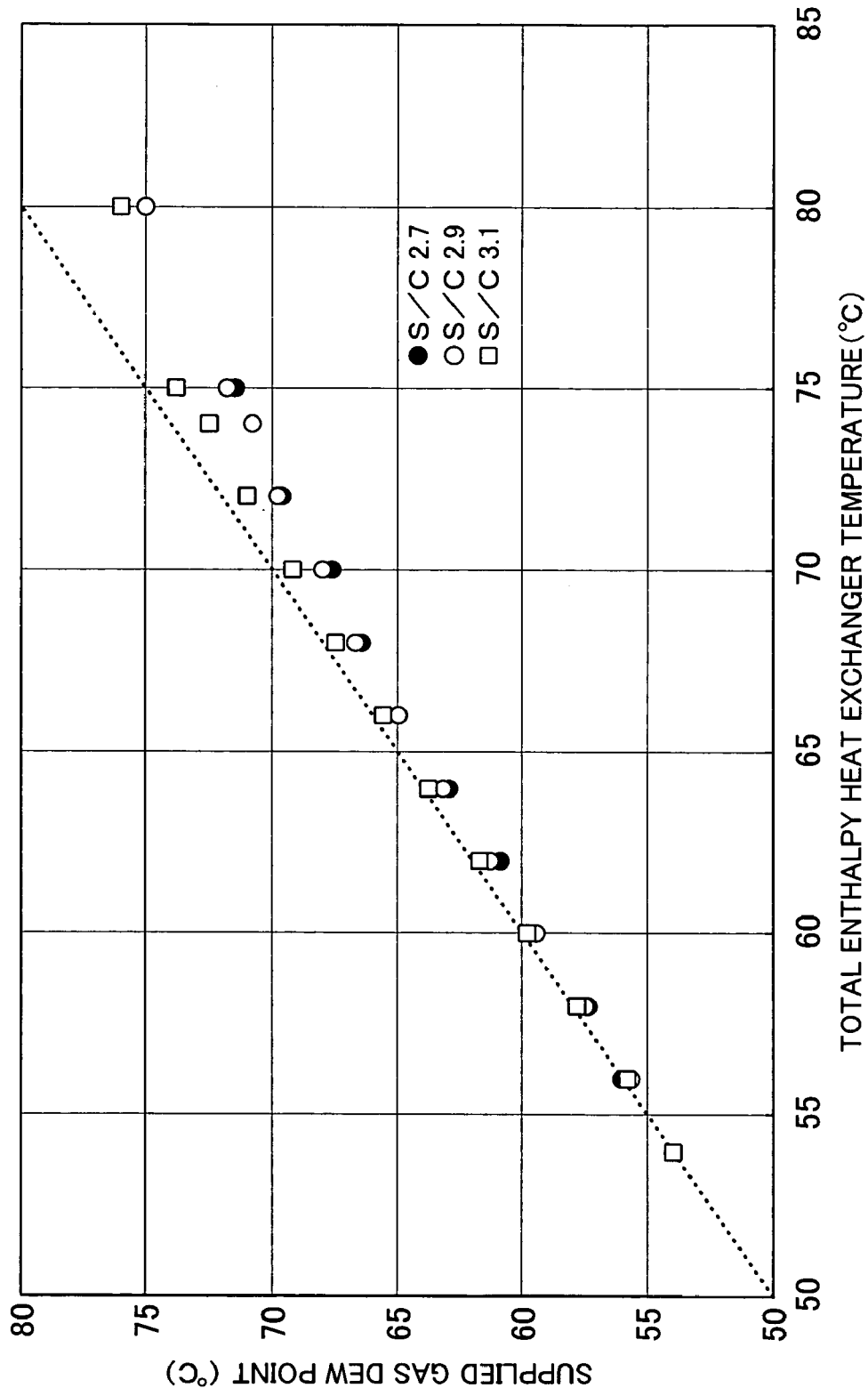
FIG. 20 is a graph showing a test result of a total enthalpy heat exchange test.

FIG. 20 shows a test result of the total enthalpy heat exchanger. In FIG. 20, abscissa axis represents an internal temperature (° C.) of the total enthalpy heat exchanger and ordinate axis represents a dew point (° C.) of the fuel gas supplied to the stack.

As shown in FIG. 20, in test sections corresponding to the above S/C, there was no significant variation in the dew point of the simulated fuel gas exhausted from the anode total enthalpy heat exchanger. And, under the condition in which the internal temperature of the total enthalpy heat exchanger was below 70° C., the dew point of the simulated fuel gas roughly approximated the internal temperature of the total enthalpy heat exchanger. This was considered to be due to the fact that the anode total enthalpy heat exchanger functioned virtually as the hot water humidifier as described in the example 3, because the amount of water contained in the anode exhaust gas was about 7 to 8 g as shown in the example 2, required added humidification amount was 2.3 g when S/C (steam/carbon ratio, i.e., ratio of water to the supplied fuel gas) was 2.7 and the exhaust dew point was 70° C., and therefore, the added humidification amount approximated about ¼ the amount of water contained in the anode exhaust gas.

Example 5

From the test result of the example 1, it has been revealed that, in order to operate the stack stably and properly for a long-time period, both the supplied fuel gas and oxidizing gas are required to have dew points higher than the operating temperature of the predetermined power generation portion in the stack. In an actual polymer electrolyte fuel cell system (1 kw fuel cell cogeneration system), resource of water for the fuel gas and the oxidizing gas is water generated by power generation and exhausted from the stack. The excess water remaining unconsumed after the reaction of total enthalpy heat exchange is liquefied by a condenser and then stored within a water storage tank. Also, the water contained in the anode exhaust gas exhausted from the stack is liquefied by a condenser, and the resulting water is stored and sent to the reformer. In this manner, reforming of the fuel gas precursor and humidification of the reformed fuel gas are concurrently carried out. However, as shown in the example 3, in the method in which the total enthalpy heat exchanger is not equipped with heating means and the water resource is gained only from the steam contained in the cathode exhaust gas, suppliable dew point is restricted, and it is therefore difficult to set the dew point of the oxidizing gas supplied to the stack higher than the operating temperature of the oxidizing gas supply portion in the stack. Also, because of restriction of reforming efficiency in the reformer, it is undesirable to add water more than a predetermined amount to the fuel gas supplied to the stack, and it is therefore impossible to set the dew point of the fuel gas higher than the operating temperature of the fuel gas supply portion in the stack. For example, in the case of a methane reforming reformer, S/C=2.7 is necessary to keep the reforming efficiency at 80% or higher, and in this case, an actually measured value of the dew point of the fuel gas was approximately 58° C. The dew point of this fuel gas is lower than 60 to 80° C. corresponding to the normal operating temperature of the stack, and is therefore lower than dew point required to inhibit reduction life of the cell.

As should be appreciated from the above, the amount of water being generated in continuation of the power generation operation of the stack is sufficient to keep the dew points of the fuel gas and the oxidizing gas being continuously supplied higher than the operating temperature of the predetermined power generation portion in the stack. However, as should be apparent from the results of calculated and actually measured values, in the conventional polymer electrolyte fuel cell system, since condensed water is not re-supplied to the total enthalpy heat exchanger, and the operating temperature of the total enthalpy heat exchanger is low, the water generated by power generation is not well utilized.

Accordingly, for evaluation of various characteristic, a polymer electrolyte fuel cell system having the construction of the block diagram schematically shown in FIG. 1 and configured to heat the total enthalpy heat exchanger using a part of waste heat exhausted from the reformer was experimentally manufactured. In this system, a pipe was welded to a wall of the CO reduction portion in a final stage of the reformer and guided to the heat exchanger, a primary heat medium (suitably, silicon oil) was flowed within the pipe to absorb heat from the wall and to thereby heat water as secondary heat medium in the heat exchanger, and the heated secondary heat medium (hot water) was flowed to heat a heater, thereby heating the temperature of the total enthalpy heat exchanger higher than the operating temperature of the predetermined power generation portion in the stack. In the anode total enthalpy heat exchanger, total enthalpy heat exchange is performed between the anode exhaust gas exhausted from the stack and the fuel gas supplied to the stack. And, the fuel gas, the dew point of which has been increased to be higher than the operating temperature of the predetermined power generation portion in the stack, is guided to the stack. Within the stack, condensation occurs, and the resulting fuel gas is guided to the fuel gas introducing portion. In this case, as shown in the example 4, on the anode side, the amount of water contained in the anode exhaust gas exceeds the amount of water required to humidify the fuel gas. For this reason, the excess water contained in the anode exhaust gas after the total enthalpy heat exchange is obtained by the fuel gas water condenser, and then is stored in the fuel gas water storage tank in a predetermined amount. The excess water is sent to the oxidizing gas water storage tank.

As stated above in the example 3, in the cathode total enthalpy heat exchanger, it is impossible to adjust the oxidizing gas supplied to the stack to have a desired dew point only by the cathode exhaust gas exhausted from the stack. So, water in proper amount according to an operating load condition of the stack is supplied from the oxidizing gas water storage tank and mixed with the cathode exhaust gas, and the oxidizing gas supplied from the air supply device, the dew point of which has been increased in the total enthalpy heat exchanger to be higher than the operating temperature of the predetermined power generation portion in the stack, is guided to the stack, within which condensation occurs, and the resulting oxidizing gas is guided to the oxidizing gas introducing portion within the cell.

In the system schematically shown in FIG. 1, using a total enthalpy heat exchanger composed of 20-stage cathode exhaust gas/supply oxidizing gas total enthalpy heat exchangers and 8-stage cathode exhaust gas/supply fuel gas total enthalpy heat exchangers while properly controlling a primary heat medium flow rate and a secondary heat medium flow rate so that the temperature of the total enthalpy heat exchanger was kept at 70° C., 1 kw stack (66-stages, electrode area: 144 $cm^2$) was driven under the condition in which the fuel gas was supplied from the reformer at a flow rate of 21.3 liters/min, the oxidizing gas was supplied from the air supply device at a flow rate of 100 liters/minute, the MEA current density was 0.18 $A/cm^2$, the air utilization ratio was 40%, the fuel utilization ratio was 75%, and the operating temperature was 65±0.3° C. In this case, the dew point of the oxidizing gas and the dew point of the fuel gas which were supplied from the total enthalpy heat exchanger to the stack were 68.2° C. and 68.0° C., respectively. And, it was confirmed that the fuel gas and the oxidizing having the dew points higher than the operating temperature were cooled down to the operating temperature within the stack, and were supplied to the cell in excessively saturated state. In this case, pressure losses in the total enthalpy heat exchanger was 138 mmAq on the oxidizing gas side and 93 mmAq on the fuel gas side, which were sufficiently lower than the pressure losses of the stack (780 mmAq on the oxidizing gas side and 690 mmAq on the fuel gas side), and stable control and operation were carried out without an excess load applied to the air supply device and the fuel gas supply pump. It was confirmed that when this polymer electrolyte fuel cell system was continuously operated for 10000 hr, average voltage drop rate in each cell was 3.2 mV/1000 hr, which was significantly better than an average voltage drop rate 18 mV/1000 hr in the 1 kw fuel cell cogeneration system having the conventional construction.

Since in the example 5, the total enthalpy heat exchanger was heated by the heat absorbed from the reformer, reforming efficiency in the reformer slightly decreased. Specifically, the reforming efficiency was 80.3% in the conventional example, while the reforming efficiency was 79.4% in the example 5. However, degradation rate of the stack efficiency was 1.2%/1000 hr (18 mV/1480 mV), while the degradation rate was 0.22%/1000 hr (3.2 mV/1480 mV) in the example 5. Therefore, efficiency of the entire system after 1000 hr operation was higher in the example 5 than in the conventional example, and therefore, a great advantage was gained although the reforming efficiency of the reformer decreased.

Example 6

Instead of the construction shown in the example 5, a polymer electrolyte fuel cell system having the construction of the block diagram schematically shown in FIG. 2 was experimentally manufactured. Specifically, in this system, heat for heating the total enthalpy heat exchanger is not obtained from the reformer, but the fuel gas, the fuel gas precursor, or the anode exhaust gas exhausted from the stack was combusted to heat a total enthalpy heat exchanger heating medium, and the heated medium is flowed to heat the total enthalpy heat exchanger to a desired temperature. The advantage of the construction of the example 6 is that an operating state of the total enthalpy heat exchanger is not dependent on the operating state of the reformer in contrast to the example 5. That is, the total enthalpy heat exchanger can be independently controlled even when the reformer is thermally unstable when the system is not performing a rated operation, i.e., starting, stopping, or operating under a load fluctuation. Since the reformed fuel gas is better than unreformed fuel gas precursor, it is advantageous to use the fuel gas precursor to heat the total enthalpy heat exchanger for the purpose of increasing system efficiency. Nonetheless, a limit fuel utilization ratio of the fuel cell is determined based on various factors such as compatibility with system pressure loss, MEA's resistance to carbon monoxide, voltage pressure loss design of the cell, ability to inhibit flooding, ability to deal with load fluctuation, etc. In addition, combustion amount necessary to drive the reformer varies like the load, to ensure conversion rate, CO reducing ability, and the like. From these view points, for the purpose of optimized energy balance, it is necessary to preferentially use the fuel gas precursor during rated operation, and to preferentially use the anode exhaust gas when the anode exhaust gas becomes excess due to load fluctuation or the like. In the example 6, considering this, switching between the use of the fuel gas precursor and the use of the anode exhaust gas was performed.

In an accelerated test, the system of the example 5 and the system of the example 6 were operated in intermittent operation mode in such a manner that the systems were operated for 8 hr and stopped for 4 h. As a result, average degradation rates of the systems for operation time 5000 hr were 8.7 mV/1000 hr in the example 5, and 4.5 mV/1000 hr in the example 6. In a comparison test, the systems of the examples 5 and 6 were operated in load fluctuation operation mode in such a manner that the systems were operated for 2 hr under rated operation load (MEA current density: 0.2 A/cm$^2$), then, the systems were operated for 2 hr under 25% of the rated load (MEA current density: 0.05 A/cm$^2$), and then the systems were re-operated under the rated load. As a result, average degradation rates of the systems for operation time 6000 hr (1500 cycles) were 7.5 mV/1000 hr in the example 5, and 3.9 mV/1000 hr in the example 6. From these results, it became clear that dry-state operation of the stack that occurs when the reformer is in thermally non-balanced state when the system was operated intermittently or under fluctuating load in the example 5 was improved in the example 6.

Example 7

Instead of the construction shown in the example 6, a polymer electrolyte fuel cell system having the construction of the block diagram schematically shown in FIG. 3 was experimentally manufactured. In the example 7 instead of heating in which the fuel gas, or the anode exhaust gas exhausted from the stack is combusted outside the total enthalpy heat exchanger to heat the total enthalpy heat exchanger heating medium, and the heated medium is flowed to heat the total enthalpy heat exchanger to a desired temperature (indirect heating), the fuel gas or the exhausted anode exhaust gas and the oxidizing gas or the cathode exhaust gas are catalytically combusted within the total enthalpy heat exchanger to heat the total enthalpy heat exchanger to a desired temperature (direct heating).

The anode exhaust gas (hydrogen) can be catalytically combusted at a temperature not lower than 60° C., and therefore, the temperature thereof can be adjusted with good controllability in a temperature range desired by the total enthalpy heat exchanger. In addition, the total enthalpy heat exchanger can be heated simply and efficiently, without special thermal design, measures for radiating heat, and safety design, in contrast to high-temperature combustion using a burner or the like.

A great difference between the example 7 and the indirect heating shown in FIG. 1 is that the polymer electrolyte fuel cell system in the example 7 has a heat emitter formed of ceramic cloth with catalyst carried thereon. In this construction, a mixture gas containing the supplied fuel gas or the exhausted anode exhaust gas and the oxidizing gas is catalytically combusted within the ceramic-cloth heat emitter to directly heat gas passages on a back surface thereof. Thereby, sufficient water is transferred from the anode exhaust gas and the cathode exhaust gas to the supplied fuel gas and oxidizing gas.

The advantage of the direct heating in the example 7 over the indirect heating is that catalytic combustion occurs on the gas passage back surface of the heat exchange separator which has a large surface area and small thickness, and the resulting heat is directly transferred to the anode exhaust gas and the cathode exhaust gas without loss. In addition, less loss is generated in the burner in direct heating than in indirect heating, and there is no thermal or dynamic loss caused by cooling medium pipes and a circulating pump required in indirect heating. Moreover, energy loss for achieving the above object is small.

In the example 7, dinitrodiamine platinum aqueous solution was blended with silica sol aqueous solution (Snowtex 0 silica 20 Wt/Vol produced by Nissan Chemical Co. Ltd) such that platinum-silica ratio was 2:100, and then ceramic cloth (Nextel 0.6t produced by Sumitomo 3M Co. Ltd) was immersed in a catalyst slurry solution obtained by diluting the aqueous solution 30 times with water and annealed in air at 500° C. for 5 hr, thereby producing a ceramic cloth heat emitter with platinum catalyst carried thereon in a coating weight of 0.3 mg/cm$^2$. Then, the ceramic cloth heat emitter with platinum catalyst carried thereon was provided on a temperature adjusting surface provided with the conventional temperature adjusting water circuit, thus manufacturing direct heating type total enthalpy heat exchanger composed of 20-stage cathode exhaust gas/supply oxidizing gas total enthalpy heat exchangers and 8-stage anode exhaust gas/supply fuel gas total enthalpy heat exchangers. As a material for total enthalpy heat exchanger separator, a press forming separator (experimentally manufactured by Nisshinbo Industries. InC) containing carbon fillers (70% in composition) and resin component (30% in composition) was used. As the material for the separator, it is desirable to use a material having high heat resistance, high heat conductivity, and high heat transfer rate, among the materials shown in the example 1. And, as a resin product, it is desirable to use carbon fillers rather than glass fillers, and the separator containing higher content of carbon fillers can advantageously have higher heat conductivity and higher heat transfer ability. Considering this, super engineering plastic containing a large quantity of carbon fillers may be selected. Using injection-molding product made of PPS alloy (experimentally produced by Dainippon Ink & Chemicals Inc.) containing 70% short-fiber carbon fillers, the above total enthalpy heat exchanger was assembled, and a test was conducted to confirm the operation as in the case of the examples 3 and 4. It was confirmed that problems did not substantially arise.

Thereafter, the total enthalpy heat exchanger was connected to the stack, the reformer, etc, thereby constructing the polymer electrolyte fuel cell system, which was employed in the following characteristic evaluation.

More specifically, another 1 kw polymer electrolyte fuel cell system having the same specification as that of the example 2 was used. The specification of the polymer electrolyte fuel cell system used in the example 7 was such that an electrode area was 169 cm$^2$, the number of stages of stacked cells was 50, a rated current density was 0.2 A/cm$^2$. In addition, as basic operating conditions, hydrogen generated by the steam reforming process and containing 20% carbon dioxide was used as the fuel gas, and air was used as the oxidizing gas. In this case, the fuel utilization ratio was 75% and the air utilization ratio was 50%. And, the reformer was operated at S/C=2.7, and its dew point was 58° C.

The temperature of the stack was kept by temperature adjusting water (cooling water) supplied at a flow rate of 10 L/min. The temperature of the supplied water was 64° C. and the temperature of the exhausted water was 67° C. Accordingly, based on the total enthalpy heat exchanger basic characteristic views shown in the examples 3 and 4, the stack was operated while controlling the amount of the anode exhaust gas supplied to the total enthalpy heat exchanger to allow the internal temperature of the total enthalpy heat exchanger to become 69° C. so that the dew points of the fuel gas and the oxidizing gas supplied to the anode side and the cathode side became 67° C. or higher. In this case, the anode exhaust gas or the like was supplied at a flow rate of 3.3 L/min. Here, based on 3.05 kcal/L of combustion energy of hydrogen, 3.3 L of combustion energy of the anode exhaust gas (containing hydrogen of 1.65 L) was calculated and 5.03 kcal was obtained. Also, based on 0.54 kcal/g evaporation latent heat of water, added humidification in the total enthalpy heat exchanger in this system was calculated and 9.31 g/min was obtained.

Theoretical supply and exhaust in the polymer electrolyte fuel cell system thus constructed is as follows. Specifically, a basic chemical reaction formula associated with power generation is given by a formula (11):

$$H_2 + (\tfrac{1}{2})O_2 \rightarrow H_2O \quad (11)$$

In this case, reaction mol per second in a chemical reaction associated with power generation is calculated according to a formula (12):

$$50 \text{ (stages)} \times 169 \text{ (cm}^2\text{)} \times 0.2 \text{ (A/cm}^2\text{)}/(96500 \times 2)$$
$$= 0.0087564 \text{ (mol/sec)} \quad (12)$$

So, the amount of hydrogen required for power generation is calculated according to a formula (13):

$$0.0087564 \text{ (mol/sec)} \times 60 \text{ (sec)} \times 22.4 \text{ (L)}/0.75$$
$$\text{(Uf)} = 15.69 \text{ (NL/min)} \quad (13)$$

From this, the supply amount of fuel gas required for power generation is calculated according to formula (14):

$$15.69 \text{ (NL/min)}/0.8 \text{ (hydrogen partial pressure)} = 19.61 \text{ (NL/min)} \quad (14)$$

The amount of oxygen required for power generation is calculated according to a formula (15):

$$(\tfrac{1}{2}) \times 0.0087564 \text{ (mol/sec)} \times 60 \text{ (sec)} \times 22.4 \text{ (L)}/0.5 \text{ (Uo)}$$
$$= 11.76 \text{ (NL/min)} \quad (15)$$

From this, supply amount of air required for power generation is calculated according to a formula (16):

$$11.76 \text{ (NL/min)}/0.2 \text{ (oxygen partial pressure)} = 58.84 \text{ (NL/min)} \quad (16)$$

Meanwhile, supply and exhaust of water are as follows. A saturated steam partial pressure at 67° C. is 205.05 mmHg, and therefore, required humidification amount on the anode side is calculated according to a formula (17):

$$19.61 \text{ (NL/min)} \times (1/(760 \text{ (mmHg)} - 179.38 \text{ (mmHg)}) - 1) \times (18/22.4 \text{ (L)}) = 4.87 \text{ (g/min)} \quad (17)$$

And, required humidification amount on the cathode side is calculated according to a formula (18):

$$58.84 \text{ (NL/min)} \times (1/(760 \text{ (mmHg)} - 179.38 \text{ (mmHg)}) - 1) \times (18/22.4 \text{ (L)}) = 14.61 \text{ (g/min)} \quad (18)$$

As described above, in the example 7, the reformer is operated at S/C=2.7 and its dew point is 58° C. The saturated steam pressure at 58° C. is 136.15 mmHg, and therefore, the amount of water contained in the fuel gas is calculated according to a formula (19):

$$19.61 \text{ (NL/min)} \times (1/(760 \text{ (mmHg)} - 136.15 \text{ (mmHg)}) - 1) \times (18/22.4 \text{ (L)}) = 3.43 \text{ (g/min)} \quad (19)$$

The added humidification amount on the anode side was obtained by subtracting the amount of water contained in the fuel gas from the required humidification amount on the anode side. So, the added humidification amount was 5.82 g/min−3.43 g/min=2.39 g/min. The added humidification amount was 9.31 g/min−2.39 g/min=6.90 g/min. The humidification amount in simple total enthalpy heat exchange in the case where heating and re-supply of condensed water were not performed was 10.56 g/min obtained by subtracting 6.90 g/min from 17.46 g/min of required humidification amount on the cathode side, and given by approximately 58° C. in terms of dew point. That is, the dew point 58° C. obtained in the simple total enthalpy heat exchange on the cathode side and the reformer dew point 58° C. on the anode side were respectively raised up to 67° C. in the humidifying system of the example 7. The polymer electrolyte fuel cell system according to the example 7 had a good life characteristic similar to that described in the example 6.

The advantage of the direct heating over the indirect heating is short start time. Specifically, in the indirect heating, the burner heated the heat medium and the heated medium was flowed to keep the temperature of the total enthalpy heat exchanger. So, approximately 15 minutes were necessary although this depends on heat capacity of the burner and the heat medium. On the other hand, in the example 7, this time was reduced to about ½0. Further, as should be apparent from the above calculation, the amount of energy required for humidifying the fuel gas and the oxidizing gas is directly proportional to the amount of fuel gas and the oxidizing gas introduced into the stack, and is also directly proportional to a load placed on the stack unless the fuel utilization ratio and the air utilization ratio vary. Likewise, the amount of the anode exhaust gas is also directly proportional to the load placed on the stack. Therefore, humidifying the fuel gas and the oxidizing gas efficiently using the anode exhaust gas exhausted from the stack means that the humidified state varies according to the load fluctuation substantially automatically without time lag with respect to the load fluctuation, i.e., at a high speed. In addition, such a system becomes rational, because control of the burner or the pump according to the load becomes unnecessary.

Example 8

In the stack shown in the example 2, the dew points of the fuel gas and the oxidizing gas supplied to the stack were 64° C., while the dew point of the cathode exhaust gas was 71.5° C. and the dew point of the anode exhaust gas was 84° C.

Therefore, in a parallel flow layout in which the fuel gas passage, the oxidizing gas passage, and the cooling water passage are running in the same direction within the cell, and the cooling water is supplied to the vicinity of the fuel gas supply hole and the oxidizing gas supply hole, and is exhausted from the fuel gas exhaust hole and the oxidizing gas exhaust hole, the interior of the cell is kept steam-saturated so long as the supplied cooling water is below 64° C. and the exhausted cooling water is below 71.5° C., for the reason described in the example 1.

Accordingly, a polymer electrolyte fuel cell system having the construction of the block diagram in FIG. 4 was constructed, and a stack provided with the above passages, and having an electrode area of 169 cm$^2$, and 50 stages of stacked cells was operated. As basic operating conditions, a rated current density was 0.2 A/cm$^2$, hydrogen generated by the steam reforming process and containing 20% carbon dioxide was used as the fuel gas, and air was used as the oxidizing gas. In this case, the fuel utilization ratio was 75% and the air utilization ratio was 50%. As the total enthalpy heat exchanger, the total enthalpy heat exchanger composed of 20-stage cathode exhaust gas/supply oxidizing gas total enthalpy heat exchangers provided with internal temperature adjusting water circuits and 8-stage cathode exhaust gas/supply fuel gas total enthalpy heat exchangers was employed. Further, the reformer was operated at S/C=2.7.

In the polymer electrolyte fuel cell system so constructed, the flow rate of the external temperature adjusting water circuit was controlled so that the temperature of the cooling water supplied to the stack became 60° C. and the temperature of the cooling water heated by heat generation in the stack and exhausted from the stack became 69° C. Also, the cooling water was flowed in such a manner that the cooling water exhausted from the stack was guided to the internal temperature adjusting water circuit of the total enthalpy heat exchanger to heat the total enthalpy heat exchanger, then retuned to the water storage tank and cooled down to 60° C. therein, and thereafter re-supplied to the stack. In this case, the stack was able to carry out operation under the above described temperature condition by reducing the flow rate of the cooling water to 2 L/min in rated operation. In this case, the cooling water having a temperature of 68.5° C. was supplied to the total enthalpy heat exchanger, but the temperature of the cooling water exhausted from the total enthalpy heat exchanger was 66° C. So, 2000×2.5=5.0 kcal was consumed to heat the total enthalpy heat exchanger. The added humidification amount was 9.25 g/min which is obtained by dividing 5.0 kcal by 0.54 kcal/g of evaporation latent heat value. This calculated value roughly matched the experimental value in the direct heating described in the example 7. Also, the internal temperature of the total enthalpy heat exchanger measured by a thermocouple was 67.5° C. at the center value, and it was presumed that in accordance with the basic characteristic of the total enthalpy heat exchange, the fuel gas and the oxidizing gas having dew points of approximately 66° C. were supplied from the total enthalpy heat exchanger to the stack. Further, the polymer electrolyte fuel cell system according to the example 8 had a good life characteristic as in the example 6.

Example 9

In the example 8, the temperature of the cooling water exhausted from the stack was 69° C. and the temperature of the cooling water supplied to the total enthalpy heat exchanger was 68.5° C. In other words, the temperature of the cooling water decreased 0.5° C. while flowing from the stack to the total enthalpy heat exchanger. Such temperature decrease in the flowing cooling water is due to heat radiation from pipes.

In addition to the rated operation, the polymer electrolyte fuel cell system carries out power generation operation in which the stack is generating small amount of heat, such as weak operation or load-fluctuating operation. And, under the operating conditions in which the stack is thus generating small amount of heat, it is strongly desirable to keep a good relationship between the dew points of the fuel gas and the oxidizing gas and the internal temperature of the stack.

Considering this, the rational layout is such that the total enthalpy heat exchanger and the stack are connected in contact with or close to each other by means of a short pipe, and these are entirely thermally insulated. With such a construction, since the stack is connected to the total enthalpy heat exchanger by means of the shortest pipe, it is possible to satisfy the good relationship without executing special control. In the polymer electrolyte fuel cell system in which the total enthalpy heat exchanger and the stack were connected in contact with or close to each other and these are entirely thermally insulated, when the flow rate of the cooling water was 0.7 L/min under 30% load (heat generation amount: 300 W), the temperature of the cooling water supplied to the stack was 59° C. and the temperature of the cooling water exhausted from the stack was 67° C. And, the cooling water having a temperature of approximately 67° C. was supplied to the total enthalpy heat exchanger without substantial heat loss. The cooling water supplied to the total enthalpy heat exchanger lost 1.6 kcal in the total enthalpy heat exchanger and thereby decreased its temperature by 2° C. The resulting cooling water was returned to the water storage tank. At this time, the internal temperature of the total enthalpy heat exchanger was 66° C., and therefore, it was presumed that the fuel gas and the oxidizing gas having dew points of approximately 65° C. were supplied to the stack. This dew point was 5° C. higher than the temperature of the fuel gas supply portion and the oxidizing gas supply portion in the stack. That is, it has been revealed that the polymer electrolyte fuel cell system of the example 9 had a good life characteristic as in the example 6.

Example 10

Instead of the constructions shown in the examples 5 to 8, a polymer electrolyte fuel cell system having the construction schematically shown in the block diagrams in FIGS. 5 to 7 was experimentally manufactured. In the example 10, instead of the construction for generating the fuel gas by reforming the fuel precursor, the polymer electrolyte fuel cell system is equipped with a fuel gas supply means such as hydrogen tank. An example of such a polymer electrolyte fuel cell system is a polymer electrolyte fuel cell system for automobile use equipped with the hydrogen tank.

In the polymer electrolyte fuel cell system equipped with the fuel gas supply means such as the hydrogen tank, the fuel gas in a completely dry state is supplied to the stack, differently from the case where the fuel gas containing a certain amount of water generated in the steam reforming process in the examples 5 to 8. For this reason, it is impossible to humidify the fuel gas to a desired dew point with the use of only the water contained in the anode exhaust gas. Accordingly, in the example 10, water obtained by the fuel gas water condenser was sent to the oxidizing gas water storage tank, and using the water stored within the oxidizing gas water storage tank, both the fuel gas and the oxidizing gas were humidified.

In the example 10, a direct heating type polymer electrolyte fuel cell system having the construction in FIG. 6 will be described below.

In the example 10, the polymer electrolyte fuel cell system having specification identical to that of the example 6 was employed. The specification of the polymer electrolyte fuel cell system used in the example 10 was such that an electrode area was 169 cm$^2$, the number of stages of stacked cells was 50, a maximum current load was 0.8 A/cm$^2$, and a maximum output power was 4.5 kW. In addition, as basic operating conditions, pure hydrogen supplied by the hydrogen tank was used as the fuel gas and air was used as the oxidizing gas. Further, the fuel utilization ratio was 85% and the air utilization ratio was 50%.

The temperature of the stack was suitably adjusted by controlling the external temperature adjusting water circuit so that the temperature of the cooling water exhausted from the stack became 67° C. when the temperature of the cooling water supplied to the stack was 64° C.

As the total enthalpy heat exchanger, the total enthalpy heat exchanger composed of 80-stage cathode exhaust gas/supply oxidizing gas total enthalpy heat exchangers and 32-stage anode exhaust gas/supply fuel gas total enthalpy heat exchangers was employed. And, based on the basic characteristic view of the total enthalpy heat exchanger shown in the examples 3 and 4, the system was operated while controlling the amount of the anode exhaust gas for heating the total enthalpy heat exchanger to allow the internal temperature of the total enthalpy heat exchanger to become 69° C. so that the dew points of the fuel gas and the oxidizing gas supplied to the stack on the anode side and the cathode side respectively became 67° C. or higher.

As described later, allowable water loss in the example 10 is 31%. For this reason, it is necessary for the anode water condenser and the cathode water condenser to respectively cool down the anode exhaust gas and the cathode exhaust gas exhausted from the stack until saturated steam becomes at least 205 mmHg×0.31=63 mmHg or lower. The temperature that meets such cooling condition is approximately 43° C. according to a saturated steam curve. So, in the example 10, the anode water condenser and the cathode water condenser were respectively provided with large-volume heat radiators, and the anode exhaust gas and the cathode exhaust gas were air-cooled by using fan.

Theoretical supply and exhaust per current load 0.1 A/cm$^2$ in the polymer electrolyte fuel cell system so constructed is as follows. A basic chemical reaction associated with power generation is given by a formula (20):

$$H_2 + (½)O_2 \rightarrow H_2O \quad (20)$$

In this case, reaction mol per second in a chemical reaction associated with power generation is calculated according to a formula (21):

50 (stages)×169 (cm$^2$)×0.1 (A/cm$^2$)/(96500×2)
=0.0043782 (mol/sec)　　　(21)

So, the amount of hydrogen required for power generation is calculated according to a formula (22):

0.0043782 (mol/sec)×60 (sec)×22.4 (L)/0.85
(Uf)=6.92 (NL/min)　　　(22).

From this, the supply amount of fuel gas required for power generation is calculated according to a formula (23):

6.92 (NL/min)/0.8 (hydrogen partial pressure)=8.65
(NL/min)　　　(23)

The amount of oxygen required for power generation is calculated according to a formula (24):

(½)×0.0043782 (mol/sec)×60 (sec)×22.4 (L)/0.5 (Uo)
=5.88 (NL/min)　　　(24).

From this, the amount of air supply required for power generation is calculated according to a formula (25):

5.88 (NL/min)/0.2 (oxygen partial pressure)=29.42
(NL/min)　　　(25)

The amount of hydrogen exhausted from the stack is calculated according to a formula (26):

6.92 (NL/min)×0.15=1.038 (NL)　　　(26)

Meanwhile, supply and exhaust of water are as follows. The amount of water generated by power generation is calculated according to a formula (27):

0.0043782 (mol/sec)×60 (sec)×18=4.72 (g/min)　　　(27).

A saturated steam partial pressure at 67° C. is 205.05 mmHg, and therefore, required humidification amount on the anode side is calculated according to a formula (28):

6.92 (NL/min)×(1/(760 (mmHg)−205.05 (mmHg))−
1)×(18/22.4 (L))=2.05 (g/min)　　　(28).

And, required humidification amount on the cathode side is calculated according to a formula (29):

29.42 (NL/min)×(1/(760 (mmHg)−205.05 (mmHg))−
1)×(18/22.4 (L))=8.73 (g/min)　　　(29).

From the above, obtaining ratio of water required for independently operating the polymer electrolyte fuel cell system of the example 10 is calculated according to a formula (30):

(2.05 (g/min)+8.73 (g/min))/(4.72 (g/min)+2.05
(g/min)+8.73 (g/min))=69%　　　(30).

When this polymer electrolyte fuel cell system was independently operated, the anode exhaust gas was exhausted from the stack at approximately 1 NL per 0.1 A current density. And, when substantially all of the anode exhaust gas was used to heat the total enthalpy heat exchanger, the temperature of the total enthalpy heat exchanger became approximately 69° C. and the dew points of the fuel gas and the oxidizing gas supplied to the stack became 67° C. The relationship between the temperature of the total enthalpy heat exchanger and the dew points of these gases was fixed when the current density increased or decreased. That is, it was possible to humidify the fuel gas and the oxidizing gas such that the humidified state of these gases varied according to the load fluctuation at a high speed with respect to the load fluctuation.

Also, combustion energy of hydrogen was 3.05 kcal/L, and based on this, combustion energy of the anode exhaust gas per 1 NL was obtained and approximately 3 kcal was obtained. By dividing 3 kcal by 0.54 kcal/g of evaporation latent heat value of water, added humidification amount per minute was calculated and approximately 5.5 g was obtained.

According to the result in the example 7, simple total enthalpy heat exchange efficiency on the cathode side is about 60%. From this, the added humidification amount on the cathode side is roughly estimated to be 8.73×0.4=3.49 g/min. And, a numeric value obtained by addition of 2.05 g/min of required humidification amount on the anode side to 3.49 g/min of added humidification amount on the cathode side roughly matches the above described added humidification amount (about 5.5 g). From this result, it was considered that the stack and the total enthalpy heat exchanger were operating satisfactorily in the polymer electrolyte fuel cell system of the example 10. It is considered that a part of the required humidification amount on the anode side corresponds to the amount of the simple total enthalpy heat exchange by the anode exhaust gas, but the anode exhaust gas is less contributive to humidification on the anode side than the cathode exhaust gas on the cathode side, because the flow rate of the anode exhaust gas is less than the flow rate of the fuel gas supplied to the stack. In conclusion, it has been revealed that the polymer electrolyte fuel cell system in the example 10 had a good life characteristic similar to that of the system of the example 6.

While the polymer electrolyte fuel cell system has been described so far in the above embodiments and examples, the present invention is applicable to other types of fuel cell systems.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A polymer electrolyte fuel cell system comprising:
    a fuel cell having a predetermined power generation portion configured to operate at a predetermined temperature to generate an electric power using a fuel gas supplied to a fuel gas passage and an oxidizing gas supplied to an oxidizing gas passage;
    an anode humidifying circuit configured to humidify the fuel gas;
    a cathode humidifying circuit configured to humidify the oxidizing gas; and
    a heater configured to heat said anode humidifying circuit and said cathode humidifying circuit,
    wherein said anode humidifying circuit and said cathode humidifying circuit form a total enthalpy heat exchanger,
    wherein said total enthalpy heat exchanger is equipped with said heater and is heated by said heater,
    wherein said anode humidifying circuit has a fuel gas introducing region connected to an inlet of said fuel gas passage, an anode exhaust gas introducing region connected to an outlet of said fuel gas passage, and an anode total enthalpy heat exchange membrane separating the fuel gas introducing region from the anode exhaust gas introducing region,
    wherein said cathode humidifying circuit has an oxidizing gas introducing region connected to an inlet of said oxidizing gas passage, a cathode exhaust gas introducing region connected to an outlet of said oxidizing gas passage, and a cathode total enthalpy heat exchange membrane separating the oxidizing gas introducing region from the cathode exhaust gas introducing region, and
    wherein said anode humidifying circuit and said cathode humidifying circuit which are heated by said heater are configured to humidify the fuel gas and the oxidizing gas, respectively, such that the fuel gas and the oxidizing gas have dew points higher than the predetermined temperature, the humidified fuel gas and humidified oxidizing gas having the dew points higher than the predetermined temperature being supplied to said fuel cell.

2. The polymer electrolyte fuel cell system according to claim 1, wherein the predetermined power generation portion is a portion where the fuel gas and the oxidizing gas supplied to said fuel cell are first consumed in an electrochemical reaction for generating the electric power.

3. The polymer electrolyte fuel cell system according to claim 1, wherein a range of the dew points is determined by an upper limit dew point that does not cause flooding in said fuel cell and a lower limit dew point of the predetermined temperature.

4. The polymer electrolyte fuel cell system according to claim 1, wherein a range of the dew points is not lower than 50° C. and not higher than 70° C.

5. The polymer electrolyte fuel cell system according to claim 1, wherein said anode humidifying circuit and said cathode humidifying circuit are configured to humidify the fuel gas and the oxidizing gas using a substance exhausted from said fuel cell such that the fuel gas and the oxidizing gas have the dew points higher than the predetermined temperature.

6. The polymer electrolyte fuel cell system according to claim 1, wherein said anode humidifying circuit and said cathode humidifying circuit are configured to humidify the fuel gas and the oxidizing gas using a mixture containing a substance exhausted from said fuel cell and water such that the fuel gas and the oxidizing gas have the dew points higher than the predetermined temperature.

7. The polymer electrolyte fuel cell system according to claim 5, wherein
    the substance exhausted from said fuel cell is at least one of the fuel gas and the oxidizing gas exhausted from said fuel cell.

8. The polymer electrolyte fuel cell system according to claim 6, wherein
    the substance exhausted from said fuel cell is at least one of the fuel gas and the oxidizing gas exhausted from said fuel cell.

9. The polymer electrolyte fuel cell system according to claim 6, further comprising:
    a water condenser configured to perform condensation of the fuel gas and the oxidizing gas exhausted from said fuel cell to obtain water, wherein
    the water obtained by said water condenser is used as the water of the mixture.

10. The polymer electrolyte fuel cell system according to claim 5, wherein the substance and the fuel gas and the oxidizing gas being supplied to said total enthalpy heat exchanger and subjected to total enthalpy heat exchange between the substance and the fuel gas and the oxidizing gas, and said total enthalpy heat exchanger being heated by said heater such that the fuel gas and the oxidizing gas to be humidified have the dew points higher than the predetermined temperature.

11. The polymer electrolyte fuel cell system according to claim 6, wherein the mixture and the fuel gas and the oxidizing gas being supplied to said total enthalpy heat exchanger and subjected to total enthalpy heat exchange between the mixture and the fuel gas and the oxidizing gas, and said total enthalpy heat exchanger being heated by said heater such that the fuel gas and the oxidizing gas to be humidified have the dew points higher than the predetermined temperature.

12. The polymer electrolyte fuel cell system according to claim 10, wherein said heater is configured to heat said total enthalpy heat exchanger using heat generated by combusting the fuel gas or fuel gas exhausted from said fuel cell.

13. The polymer electrolyte fuel cell system according to claim 11, wherein said heater is configured to heat said total enthalpy heat exchanger using heat generated by combusting the fuel gas or fuel gas exhausted from said fuel cell.

14. The polymer electrolyte fuel cell system according to claim 10, wherein said heater is configured to heat said total enthalpy heat exchanger using heat generated by catalytically combusting the fuel gas or fuel gas exhausted from said fuel cell and the oxidizing gas or oxidizing gas exhausted from said fuel cell.

15. The polymer electrolyte fuel cell system according to claim 11, wherein said heater is configured to heat said total enthalpy heat exchanger using heat generated by catalytically combusting the fuel gas or fuel gas exhausted from said fuel cell and the oxidizing gas or oxidizing gas exhausted from said fuel cell.

16. The polymer electrolyte fuel cell system according to claim 10, wherein said fuel cell is configured to operate at the predetermined temperature obtained by flowing a heat medium within said fuel cell to generate the electric power, and said heater is configured to heat said total enthalpy heat exchanger using heat of heat medium exhausted from said fuel cell.

17. The polymer electrolyte fuel cell system according to claim 11, wherein said fuel cell is configured to operate at the predetermined temperature obtained by flowing a heat medium within said fuel cell to generate the electric power and said heater is configured to heat said total enthalpy heat exchanger using heat of heat medium exhausted from said fuel cell.

18. The polymer electrolyte fuel cell system according to claim 10, further comprising:
a reformer configured to generate the fuel gas from a precursor of the fuel gas, wherein said heater is configured to heat said total enthalpy heat exchanger using heat generated by combusting the precursor.

19. The polymer electrolyte fuel cell system according to claim 11, further comprising:
a reformer configured to generate the fuel gas from a precursor of the fuel gas, wherein said heater is configured to heat said total enthalpy heat exchanger using heat generated by combusting the precursor.

20. The polymer electrolyte fuel cell system according to claim 10, further comprising:
a reformer configured to generate the fuel gas from a precursor of the fuel gas, wherein said heater is configured to heat said total enthalpy heat exchanger using waste heat exhausted from said reformer.

21. The polymer electrolyte fuel cell system according to claim 11, further comprising:
a reformer configured to generate the fuel gas from a precursor of the fuel gas, wherein said heater is configured to heat said total enthalpy heat exchanger using waste heat exhausted from said reformer.

22. The polymer electrolyte fuel cell system according to claim 10, wherein said heater is configured to directly heat said total enthalpy heat exchanger.

23. The polymer electrolyte fuel cell system according to claim 11, wherein said heater is configured to directly heat said total enthalpy heat exchanger.

24. The polymer electrolyte fuel cell system according to claim 10, wherein said heater is configured to indirectly heat said total enthalpy heat exchanger.

25. The polymer electrolyte fuel cell system according to claim 11, wherein said heater is configured to indirectly heat said total enthalpy heat exchanger.

26. The polymer electrolyte fuel cell system according to claim 1, wherein said fuel cell and said anode and cathode humidifying circuits are integrated, and said integrated fuel cell and anode and cathode humidifying circuits are entirely thermally insulated.

* * * * *